US008876495B2

(12) United States Patent
Galloway et al.

(10) Patent No.: US 8,876,495 B2
(45) Date of Patent: Nov. 4, 2014

(54) CASE FLOW AUGMENTING ARRANGEMENT FOR COOLING VARIABLE SPEED ELECTRIC MOTOR-PUMPS

(75) Inventors: Phillip Wayne Galloway, Madision, MS (US); Jeffrey David Skinner, Madison, MS (US); Kelly Dale Valtr, Roanoke, TX (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 13/996,872

(22) PCT Filed: Dec. 15, 2011

(86) PCT No.: PCT/US2011/065164

§ 371 (c)(1),
(2), (4) Date: Aug. 28, 2013

(87) PCT Pub. No.: WO2012/091942

PCT Pub. Date: Jul. 5, 2012

(65) Prior Publication Data

US 2013/0336802 A1 Dec. 19, 2013

Related U.S. Application Data

(60) Provisional application No. 61/428,184, filed on Dec. 29, 2010, provisional application No. 61/427,904, filed on Dec. 29, 2010, provisional application No. 61/487,530, filed on May 18, 2011, provisional application No. 61/503,409, filed on Jun. 30, 2011, provisional application No. 61/503,429, filed on Jun. 30, 2011.

(51) Int. Cl.

| | |
|---|---|
| ***F04B 17/03*** | (2006.01) |
| ***F04B 23/10*** | (2006.01) |
| ***F16D 31/02*** | (2006.01) |
| ***F04C 14/02*** | (2006.01) |
| ***F04B 1/04*** | (2006.01) |
| ***F15B 21/04*** | (2006.01) |

(52) U.S. Cl.

CPC ........... *F04C 14/02* (2013.01); *F15B 2211/611* (2013.01); *F15B 2211/214* (2013.01); *F04B 1/0421* (2013.01); *F15B 21/042* (2013.01); *F15B 2211/20507* (2013.01); *F04B 17/03* (2013.01); *F15B 2211/20576* (2013.01); *F15B 2211/20515* (2013.01)

USPC ............ 417/382; 417/199.1; 60/455; 60/456; 244/78.1

(58) Field of Classification Search

USPC ......... 417/199.1, 382; 60/455, 456, 419, 486; 244/78.1

See application file for complete search history.

(56) References Cited

U.S. PATENT DOCUMENTS

| | | | |
|---|---|---|---|
| 2,255,785 | A | 9/1941 | Kendrick |
| 2,357,334 | A | 9/1944 | Kendrick et al. |

(Continued)

FOREIGN PATENT DOCUMENTS

| | | | |
|---|---|---|---|
| EP | 2 050 970 | A1 | 4/2009 |
| EP | 2 131 073 | A1 | 12/2009 |

(Continued)

OTHER PUBLICATIONS

International Search Report for corresponding International Patent Application No. PCT/US2011/065164 mailed Mar. 30, 2012.

*Primary Examiner* — Charles Freay

(74) *Attorney, Agent, or Firm* — Merchant & Gould P.C.

(57) ABSTRACT

Example fluid circuits (e.g., within aircrafts) include first and second pump assemblies. The first pump assembly has an electric motor and a first fluid pump. The first fluid pump is coupled to the electric motor and has a case drain port that is in fluid communication with a case drain region of the first fluid pump. The second pump assembly is powered by hydraulic pressure from the first fluid outlet of the first fluid pump and functions to augment flow through the case drain region of the first fluid pump.

25 Claims, 37 Drawing Sheets

(56) References Cited

U.S. PATENT DOCUMENTS

| | | | | |
|---|---|---|---|---|
| 2,786,422 | A | 3/1957 | Rosaen et al. | |
| 2,924,178 | A | 2/1960 | Hogan | |
| 2,988,888 | A | 6/1961 | Lauck | |
| 3,182,596 | A | 5/1965 | Prijatel | |
| 3,291,067 | A * | 12/1966 | North | 417/206 |
| 3,420,180 | A | 1/1969 | Behrends et al. | |
| 3,936,246 | A | 2/1976 | Beitzel | |
| 3,964,261 | A | 6/1976 | Zukauskas | |
| 4,093,407 | A | 6/1978 | Miles | |
| 4,183,723 | A | 1/1980 | Hansen et al. | |
| 4,259,044 | A | 3/1981 | Drutchas et al. | |
| 4,412,795 | A | 11/1983 | Adams | |
| 4,516,918 | A | 5/1985 | Drutchas et al. | |
| 4,529,361 | A | 7/1985 | Sundberg | |
| 4,790,454 | A | 12/1988 | Clark et al. | |
| 4,867,658 | A | 9/1989 | Sugita et al. | |
| 4,890,988 | A | 1/1990 | Kramer et al. | |
| 4,972,762 | A | 11/1990 | Kubik | |
| 5,109,672 | A * | 5/1992 | Chenoweth et al. | 60/456 |
| 5,395,519 | A | 3/1995 | Miller | |
| 5,419,130 | A | 5/1995 | Ruckgauer et al. | |
| 5,493,860 | A * | 2/1996 | Bjerke et al. | 60/327 |
| 5,873,548 | A | 2/1999 | Huling | |
| 6,132,196 | A | 10/2000 | Harrison | |
| 6,241,497 | B1 | 6/2001 | Mallen | |
| 6,286,308 | B1 | 9/2001 | Yoshida et al. | |
| 6,397,593 | B1 | 6/2002 | Duckinghaus | |
| 6,416,303 | B1 | 7/2002 | Van Der Sluis et al. | |
| 6,973,782 | B2 * | 12/2005 | Rose | 60/414 |
| 7,040,872 | B2 | 5/2006 | Endoh et al. | |
| 7,070,399 | B2 | 7/2006 | Konishi et al. | |
| 7,094,042 | B1 | 8/2006 | Borgetti et al. | |
| 7,107,767 | B2 * | 9/2006 | Frazer et al. | 60/414 |
| 7,207,173 | B2 * | 4/2007 | Nakata et al. | 60/329 |
| 7,395,948 | B2 | 7/2008 | Kogan | |
| 7,597,145 | B2 | 10/2009 | Allard et al. | |
| 7,614,861 | B2 | 11/2009 | Nagler | |
| 8,024,924 | B2 * | 9/2011 | Mueller et al. | 60/414 |
| 2008/0047617 | A1 | 2/2008 | Hirano | |
| 2010/0095664 | A1 | 4/2010 | Hyodo et al. | |
| 2010/0097038 | A1 * | 4/2010 | Boisvert et al. | 322/34 |

FOREIGN PATENT DOCUMENTS

| | | | |
|---|---|---|---|
| FR | 2 862 724 | A1 | 5/2005 |
| GB | 2 062 187 | A | 5/1981 |
| JP | 53-119404 | A | 10/1978 |
| JP | 6-285941 | A | 10/1994 |
| JP | 9-058327 | A | 3/1997 |
| JP | 11-230307 | A | 8/1999 |
| JP | 2003-130011 | | 5/2003 |
| JP | 2010-270856 | A | 12/2010 |

* cited by examiner

CASE FLOW AUGMENTING ARRANGEMENT FOR COOLING VARIABLE SPEED ELECTRIC MOTOR-PUMPS

This application is a National Stage Application of PCT/US2011/065164, filed 15 Dec. 2011, which claims benefit of U.S. Patent Application Ser. No. 61/427,904 filed on 29 Dec. 2010, U.S. Patent Application Ser. No. 61/428,184 filed on 29 Dec. 2010, U.S. Patent Application Ser. No. 61/487,530 filed on 18 May 2011, U.S. Patent Application Ser. No. 61/503,409 filed on 30 Jun. 2011, and U.S. Patent Application Ser. No. 61/503,429 filed on 30 Jun. 2011, and which applications are incorporated herein by reference. To the extent appropriate, a claim of priority is made to each of the above disclosed applications.

BACKGROUND

Historically, electric motor pumps used to power aircraft components have case drain circuits that carry away heat associated with pump and electric motor losses as well as heat associated with pressure drop in the system. Typically, forced hydraulic fluid cooling is used to keep the electric motor pumps cool. For example, relatively small gerotor pumps can be built onto the motor pump shafts to provide this positive cooling flow. With motor pumps operating in a constant electrical frequency system (typically 400 hertz), gerotor pumps, operating at constant shaft speeds are able to provide sufficient flow to provide the necessary cooling.

SUMMARY

One aspect of the present disclosure relates to a fluid circuit that has a first pump assembly. The first pump assembly has an electric motor and a first fluid pump. The first fluid pump is coupled to the electric motor and has a first fluid inlet, a first fluid outlet, and a case drain port that is in fluid communication with a case drain region of the first fluid pump. The fluid circuit also has a second pump assembly in fluid communication with the first pump assembly. The second pump assembly is powered by hydraulic pressure from the first fluid outlet of the first fluid pump and functions to augment flow through the case drain region of the first fluid pump.

Another aspect of the present disclosure relates to an aircraft. The aircraft includes a first pump assembly and a cooling circuit in fluid communication with the first pump assembly. The cooling circuit includes a second pump assembly powered by hydraulic pressure output from the first pump assembly. The second pump assembly also augments flow through a case drain region of the first pump assembly.

In some implementations, an example second pump assembly includes a fluid motor and a second fluid pump coupled to the fluid motor. A fluid inlet of the motor is in fluid communication with the outlet of the first fluid pump so that fluid output from the first fluid pump powers the motor. An inlet of the second fluid pump is in fluid communication with the case drain port of the first fluid pump so that the second fluid pump pumps fluid from the case drain region of the first fluid pump when powered by the motor.

In other implementations, another example second pump assembly includes a pilot stage valve assembly and a main stage valve assembly in fluid communication with the pilot stage valve assembly. The pilot stage valve assembly has a fluid inlet passage in fluid communication with a first fluid outlet of the first fluid pump. The main stage valve assembly has a fluid inlet passage in fluid communication with the case drain port of the first fluid pump so that the second fluid pump assembly pumps fluid from the case drain region of the first fluid pump.

In other implementations, another example second pump assembly includes a vane pump having a drive port in fluid communication with the outlet of the first pump assembly, an intake port in fluid communication with the case drain port of the first pump assembly, and an output port in fluid communication with a cooling circuit. The vane pump includes a rotor that rotates within a cam structure having a cam surface. The rotor defines radial slots in which vanes are slidably mounted. The vane pump also includes a chamber defined between the cam surface and the rotor. Fluid from the case drain port is drawn into the chamber and mixes with pressurized fluid from the first fluid outlet as the rotor rotates, and the mixture is pumped out of the vane pump through the output port.

In other implementations, another example second pump assembly includes at least three spool valves. At least one of the spool valves is coupled to a piston head within a piston chamber. Operation of the spool valves is coordinated to reciprocate the piston head within the piston chamber. The spools of the spool valves are moved back and forth between first and second positions using positive hydraulic pressure accessed from the first fluid outlet of the first fluid pump.

In other implementations, another example second pump assembly includes a sequencing valve and a main valve. The main valve includes a piston head that is reciprocated within a piston cylinder having first and second cylinder ports positioned on opposite sides of the piston head. The main valve and the sequencing valve are moved via hydraulic drive pressure accessed from the first fluid outlet of the first fluid pump. The sequencing valve includes a sequencing spool movable between a first position and a second position. When the sequencing spool is in the first position, the first cylinder port is in fluid communication with a first inlet port and the second cylinder port is in fluid communication with an outlet port. When the sequencing spool is in the second position, the first cylinder port is in fluid communication with the outlet port and the second cylinder port is in fluid communication with a second inlet port. The first and second inlet ports are in fluid communication with the case drain region of the first fluid pump.

A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the embodiments disclosed herein are based.

DRAWINGS

FIG. 1 schematically depicts an aircraft having a fluid circuit in accordance with the principles of the present disclosure;

DETAILED DESCRIPTION

Figure 1:
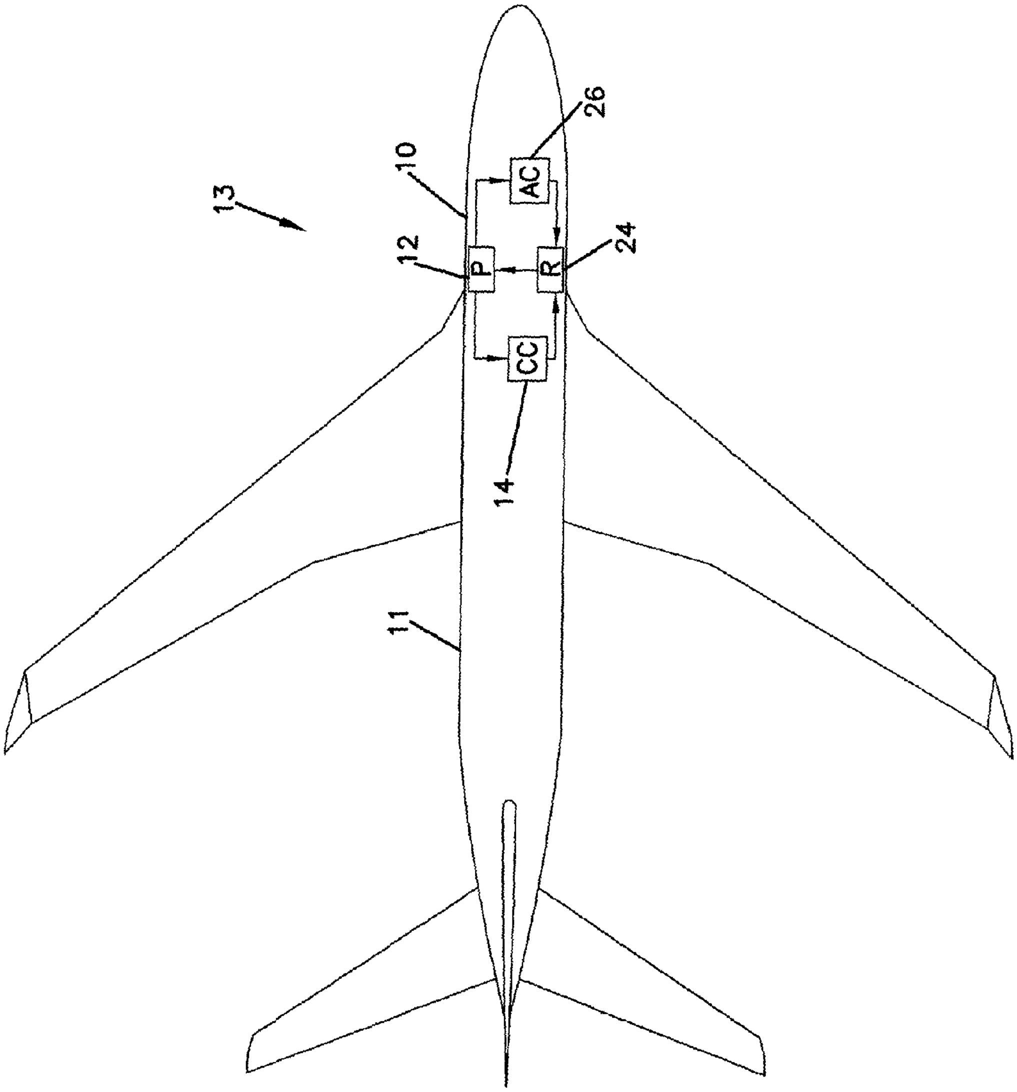

Reference will now be made in detail to the exemplary aspects of the present disclosure that are illustrated in the accompanying drawings. Wherever possible, the same reference numbers will be used throughout the drawings to refer to the same or like structure.

With the advent of electronically controlled motors for aircraft electric motor pumps, electric motor pumps can be operated at varying speeds ranging from maximum speed to near zero. Therefore, for many applications, cooling flow can no longer depend on gerotor pumps that are mechanically driven by the motor shafts of electric motor pumps. The present disclosure relates to techniques for providing adequate levels of cooling flow without mechanically coupling to the motor shaft of the motor pump to provide power for a supplemental pump used to augment cooling flow. Instead, a portion of the hydraulic fluid output from the aircraft motor pump can be used to hydraulically power a flow augmenting device that draws case drain fluid from a case drain region of the motor pump and pumps the case drain fluid through a cooling circuit.

The present disclosure also relates to a system that taps (i.e., accesses, uses, diverts, etc.) a relatively small amount of hydraulic fluid flow from a high pressure flow source (i.e., a driving flow source, a command flow source) and converts such flow into a driven hydraulic fluid flow (i.e., a resultant flow, an augmented flow, a reduced pressure flow, a de-intensified pressure flow, etc.) having a substantially higher flow rate and a substantially lower pressure than the tapped high pressure flow. In certain embodiments, the driving flow source can be the flow of hydraulic fluid output from a variable speed electric motor-pump, and the driven flow can be used to augment the flow of hydraulic fluid through the case drain of the variable speed electric motor-pump. The augmented case drain flow can be routed through a cooling circuit to provide cooling of the case drain fluid, cooling of the variable speed electric motor-pump, and cooling of relatively high power electronics used to control the variable speed electric motor-pump.

Another aspect of the present disclosure relates to a system including a first hydraulic fluid flow and a second hydraulic fluid flow. The second flow is depressurized as compared to the first flow. A portion of the first flow (i.e., a diverted flow portion, a command flow portion, a drive flow portion) is diverted from the first flow and used to power (i.e., drive) a flow augmenter (e.g., a pump) that generates the second flow. The hydraulic fluid flow generated by (i.e., outputted from) the flow augmenter has a lower pressure and a higher flow rate than the diverted flow portion of the first flow.

In some embodiments, the first flow is the output from a variable speed electric motor-pump, and the flow augmenter is used to augment hydraulic fluid flow through a case drain region of the variable speed electric motor-pump. The augmented case drain flow can be routed through a cooling circuit to provide cooling of the case drain fluid, cooling of the variable speed electric motor-pump, and cooling of relatively high power electronics used to control the variable speed electric motor-pump.

In certain embodiments, the flow augmenter can be designed such that the augmented flow has a pressure less than or equal to one-fifth the pressure of the diverted flow portion and the augmented flow has a flow rate greater than or equal to at least five times the flow rate of the diverted flow portion. In other embodiments, the flow augmenter can be designed such that augmented flow has a pressure less than or equal to one-tenth the pressure of the diverted flow portion and the augmented flow has a flow rate greater than or equal to at least ten times the flow rate of the diverted flow portion. In still other embodiments, the flow augmenter can be designed such that the augmented flow has a pressure less than or equal to one-fifteenth the pressure of the diverted flow portion and the augmented flow has flow rate greater than or equal to at least fifteen times the flow rate of the diverted flow portion.

Referring now to FIG. 1, a hydraulic fluid circuit 10 is shown located within the body 11 of an aircraft 13. The fluid circuit 10 includes a first fluid pump assembly 12 and a cooling circuit 14 that is in fluid communication with the first fluid pump assembly 12. The first pump assembly 12 can be used to drive active downstream components 26 (e.g., actuators, cylinders, steering units, motors, valves, etc.) of the aircraft 13 using hydraulic fluid obtained from a fluid reservoir 24. While the fluid circuit 10 is preferred for use in aircraft applications, it will be appreciated that the fluid circuit 10 can be used for other applications as well.

Figure 2:
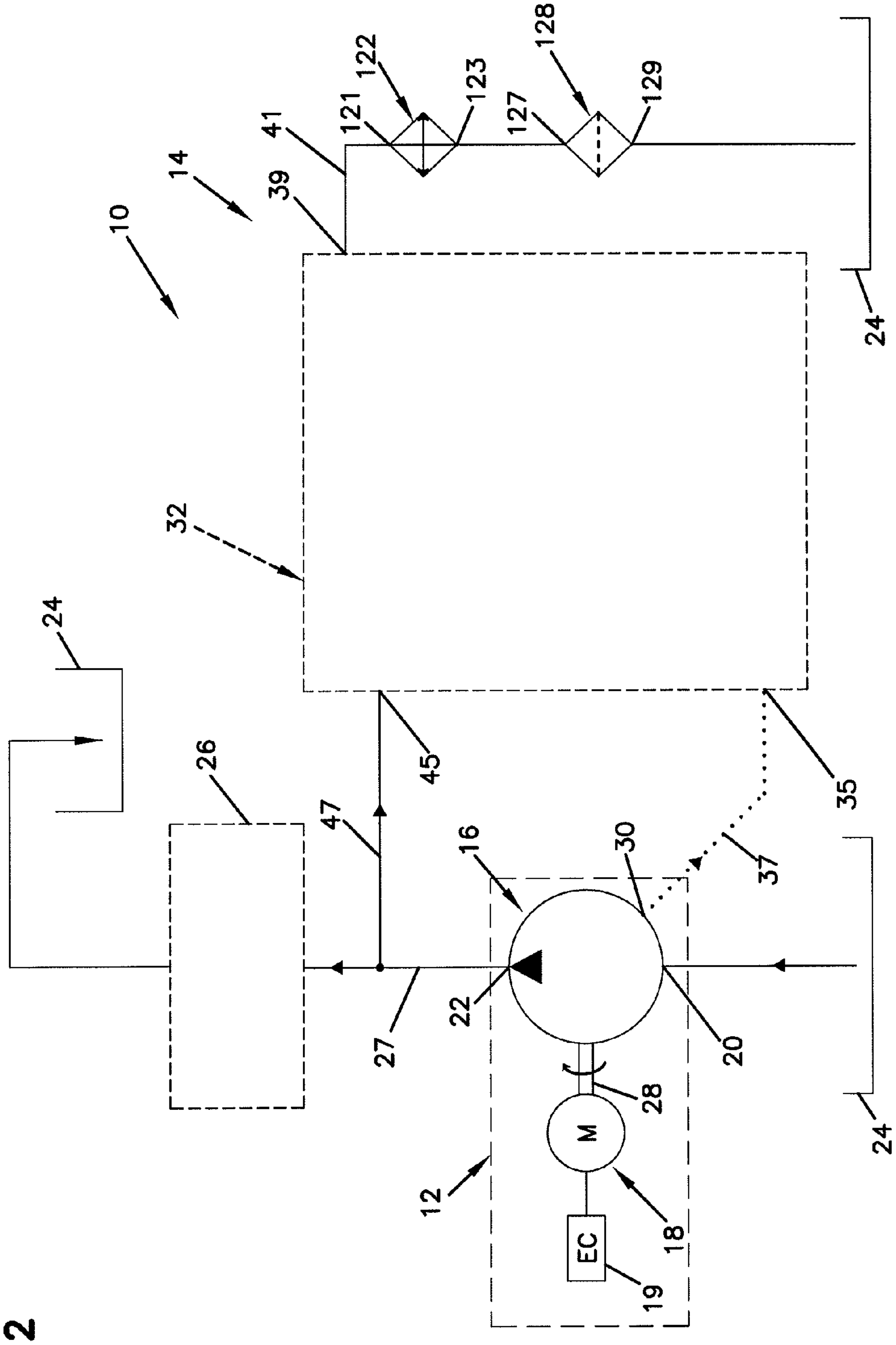
FIG. 2 is a schematic representation of one example of the fluid circuit of FIG. 1; the fluid circuit includes an electronically controlled, variable speed electric motor-pump and a cooling circuit.

Referring to FIG. 2, the first fluid pump assembly 12 of the fluid circuit 10 includes a first fluid pump 16 driven by a motor 18. The first fluid pump 16 includes first fluid inlet 20 and a first fluid outlet 22. The first fluid inlet 20 is in fluid communication with the fluid reservoir 24. The first fluid outlet 22 is in fluid communication with the one or more downstream components 26. In use, hydraulic fluid pumped from the first fluid outlet 22 is used to power the downstream components 26. A main output fluid line 27 provides fluid communication between the first fluid outlet 22 and the downstream components 26. After being used to power/actuate the downstream components 26, the hydraulic fluid pumped from the first fluid pump 16 can be returned to the reservoir 24.

In the depicted embodiment, the motor 18 of the first fluid pump assembly 12 is a variable speed electric motor that is electronically controlled by electronic control circuitry 19 (e.g., an electronic controller, an electronic control module, an electronic control board or boards, etc.) so as to be operable at a variety of speeds ranging from near zero to a maximum speed. The motor 18 has a shaft 28 that is coupled to the first fluid pump 16 so that when the shaft 28 of the motor 18 rotates, a pumping kit of the first fluid pump 16 is actuated. As the pumping kit of the first fluid pump 16 is actuated, fluid is communicated from the first fluid inlet 20 to the first fluid outlet 22 of the first fluid pump 16. The first fluid pump 16 and the motor 18 can be integrated together with the electronic control circuitry 19 such that the first fluid pump assembly 12 forms a variable speed electric motor-pump unit (i.e., a motor-pump module, a motor-pump assembly, a motor-pump module, etc.).

The first fluid pump 16 of the first fluid pump assembly 12 further includes a case drain port 30. The case drain port 30 is in fluid communication with a case drain region in the first fluid pump 16. During normal operation of the first fluid pump 16, there is an amount of pressurized fluid that leaks from the pumping kit of the first fluid pump 16 to the case drain region. The fluid in the case drain region can be drained through the case drain port 30.

Referring still to FIG. 2, the cooling circuit 14 of the fluid circuit 10 includes a flow augmenting device in the form of a second fluid pump assembly 32 that functions to augment the flow of hydraulic fluid through the case drain region of the first fluid pump 16. For example, an intake port 35 of the second fluid pump assembly 32 is shown connected to the case drain port 30 by a case drain fluid line 37 (e.g., a hose, conduit, or other passage defining structure). In use, case drain fluid from the case drain region of the first fluid pump 16 is drawn through the case drain fluid line 37 into the second fluid pump assembly 32. The second fluid pump assembly 32 also includes an outlet port 39 from which the case drain fluid is outputted from (i.e., pumped out from) the second fluid pump assembly 32.

In a preferred embodiment, the case drain fluid outputted through the outlet port 39 is pumped through a cooling circuit line 41 for cooling the case drain fluid. The cooling circuit line 41 is in fluid communication with the outlet port 39 and extends to the reservoir 24. In the depicted embodiment, the cooling circuit line 41 includes a discrete heat exchanger 122 for enhancing cooling of case drain fluid pumped through the cooling circuit line 41. The heat exchanger 122 pulls heat out of the fluid passing through the cooling circuit line 41. In other embodiments, the length of hose or conduit defining the cooling circuit line 41 may have sufficient length and heat exchange properties to provide adequate cooling of the case drain fluid. In such embodiments, a separate discrete heat exchanger 122 is not needed. Instead, the length of hose or conduit itself functions as a heat exchanger. In certain embodiments, a fluid filter 128 can be used to filter the fluid passing through the cooling circuit line 41 to reservoir 24.

In the depicted embodiment, the second fluid pump assembly 32 is not mechanically driven/powered by the shaft 28 of the motor 18. Instead, power for driving the second pump assembly 32 is derived from relatively high pressure hydraulic fluid flow accessed from the fluid output from the first fluid pump 16. For example, as shown at FIG. 2, a drive port 45 of the second pump assembly 32 is fluidly connected to the main output flow line 27 by a drive line 47. The drive line 47 taps into the main output flow line 27 at a location downstream of the first fluid outlet 22. The drive line 47 preferable diverts (e.g., accesses, splits off) a portion of the relatively high pressure flow output by the first fluid pump 16 through the first fluid outlet 22 and carries the diverted flow to the drive port 45 such that the diverted portion of the relatively high pressure flow can be used to drive the second pump assembly 32. In one embodiment, a flow divider is used to split some the fluid from the main output flow line 27 into the drive line 47.

In a preferred embodiment, the second fluid pump assembly 32 is designed to use a relatively small amount of high pressure flow from the main output flow line 27 to provide power for generating cooling flow, which has a substantially lower pressure and a substantially higher flow rate than the pressure and flow rate of the flow diverted from the main output flow line 27. For example, in certain embodiments, the cooling circuit 14 can have a hydraulic fluid flow rate that is at least 5, 10, or 15 times as large as the flow rate of the diverted flow; and the output from the second fluid pump assembly 32 can have a hydraulic pressure less than or equal to $1/5$, $1/10$, or $1/15$ the hydraulic pressure of the hydraulic fluid output from the first fluid pump 16. In one example embodiment, the pressure of the fluid carried through the drive line 47 is about 3000 pounds per square inch (psi), the flow rate in the drive line 47 is about 0.1 gallons per minute, the pressure of the casing drain fluid output from the second pump assembly 32 is less than about 200 (psi), and the flow rate through the cooling line 41 is about 1.5 gallons per minute.

Figure 3:
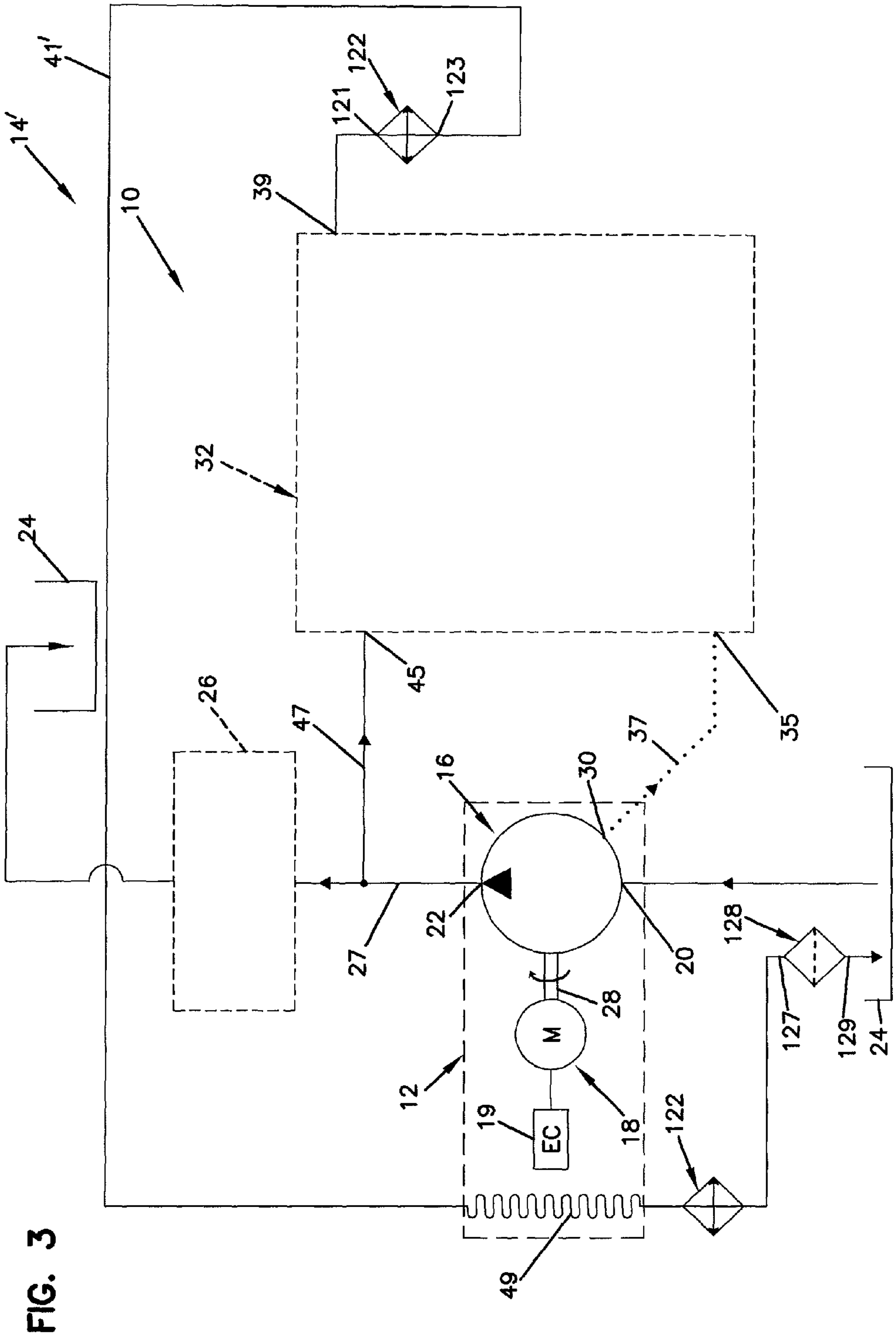
FIG. 3 is a schematic representation of another embodiment of the fluid circuit of FIG. 1; the fluid circuit includes the electronically controlled, variable speed electric motor-pump and an alternative cooling circuit.

It will be appreciated that the motor 18 and electronic control circuitry 19 of the first fluid pumping assembly 12 can generate a substantial amount of heat. To cool the first fluid pumping assembly 12, cooling flow can be directed across, through or along portions of the first fluid pumping assembly 12. For example, FIG. 3 shows a modified cooling circuit 14' where a cooling line 41' includes a heat exchanger 49 (e.g., a cooling sheath, cooling conduits, cooling passages, etc.) that carries heat away from the first fluid pumping assembly 12. For example, cooling fluid passing through the heat exchanger 49 can carry away heat from the electronic control circuitry 19, the motor 18, and/or the first fluid pump 16. Additional heat exchangers 122 can be provided along the cooling line 41' to transfer heat out of the system, thereby cooling the fluid carried through the cooling line 41'. In other embodiments, the conduits/hoses forming the cooling line 41' function as heat exchangers that transfer heat out of the system, thereby eliminating the need for discrete heat exchangers.

Figure 4:
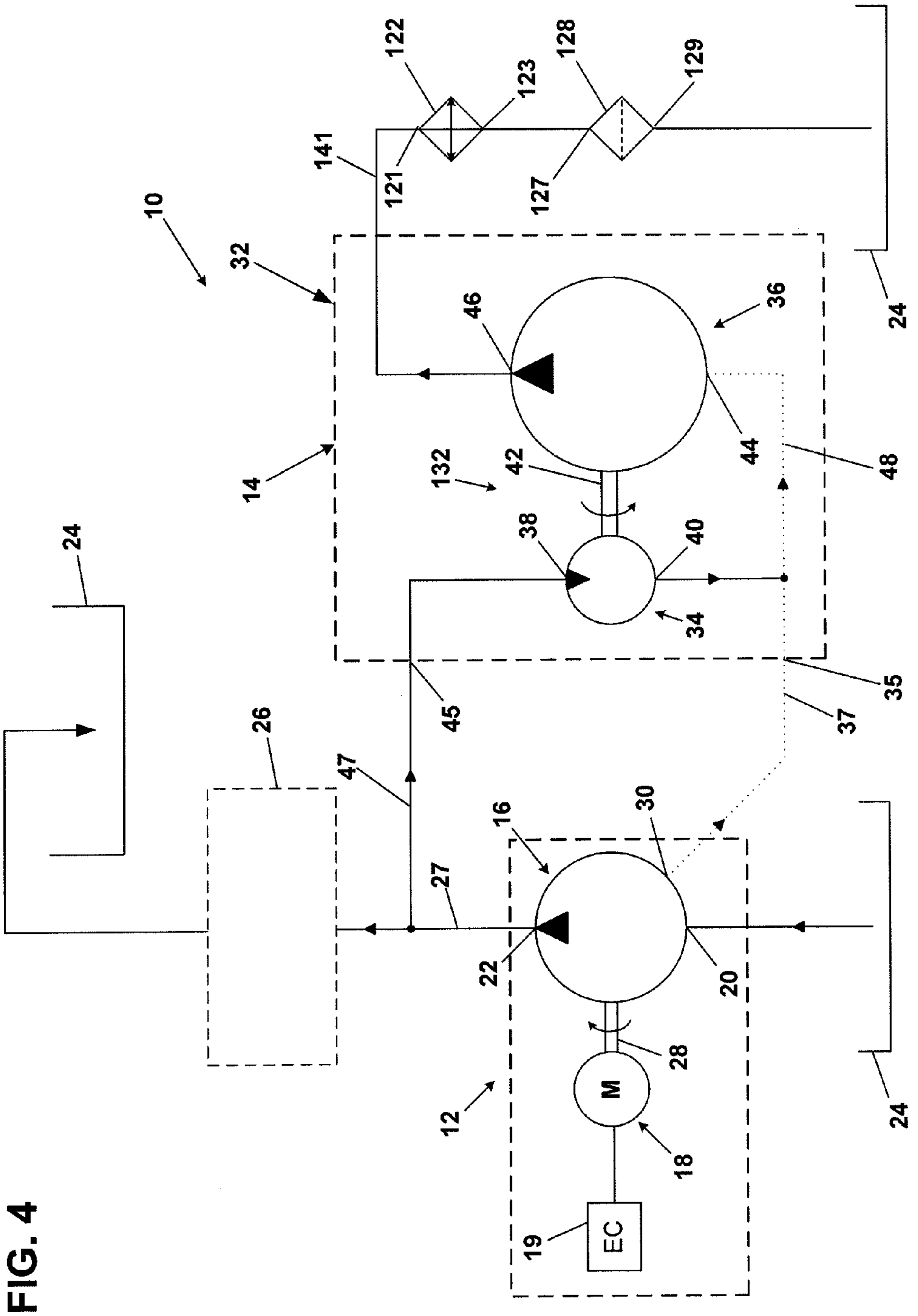
FIGS. 4 and 5 illustrate a first example implementation of a second fluid pump assembly and a method of using the same.
Figure 5:
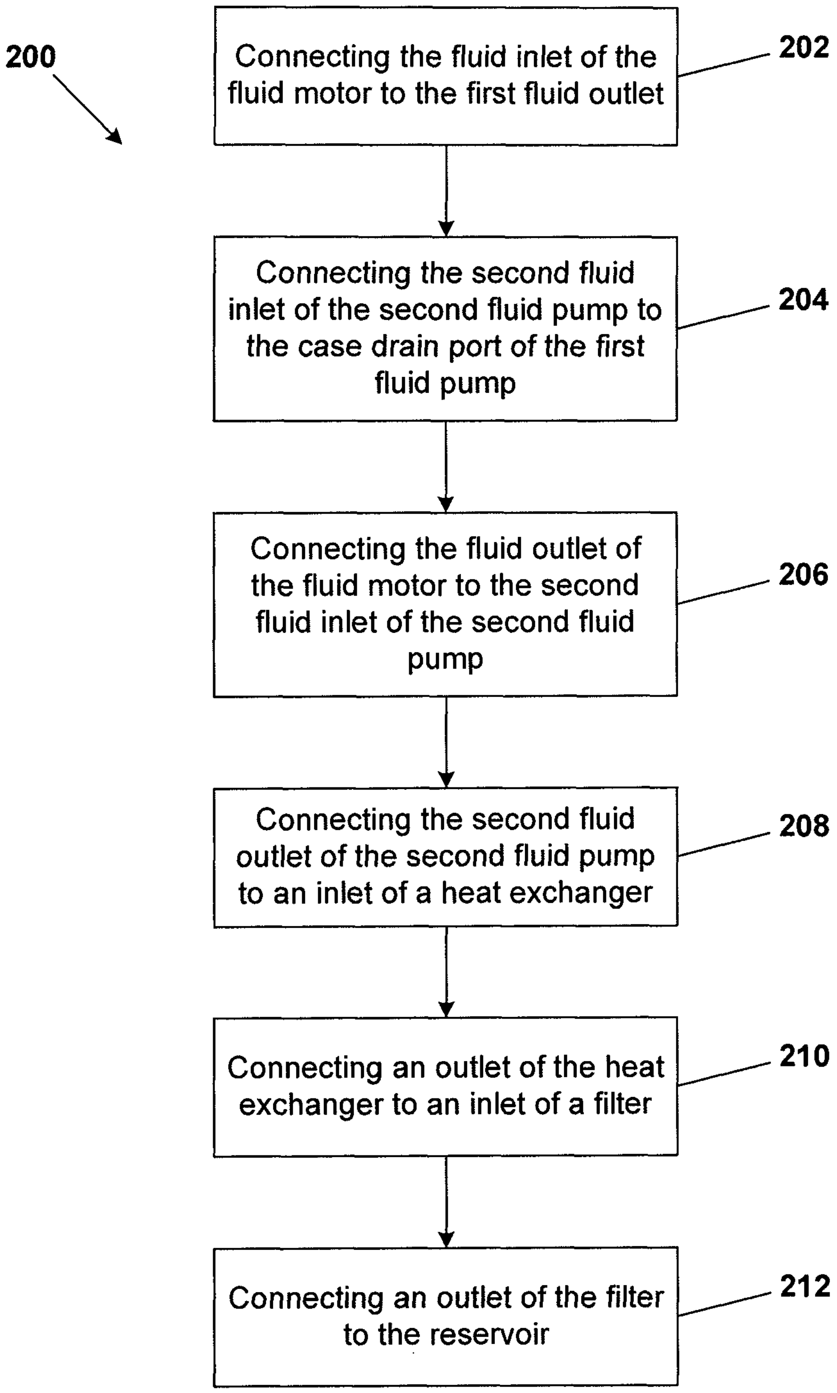
Figure 6:
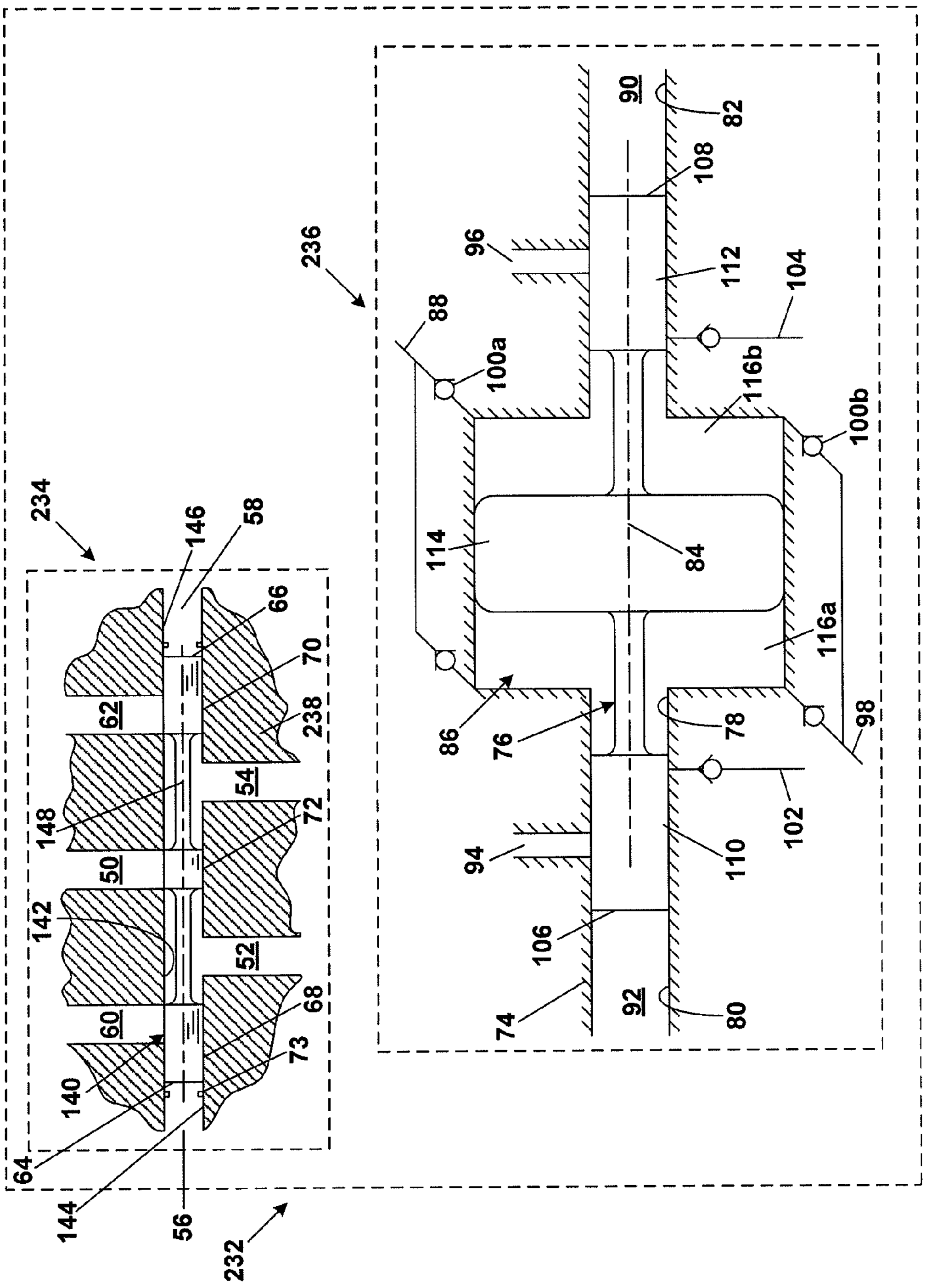
FIGS. 6-10 illustrate a second example implementation of a second fluid pump assembly and a method of using the same.
Figure 7:
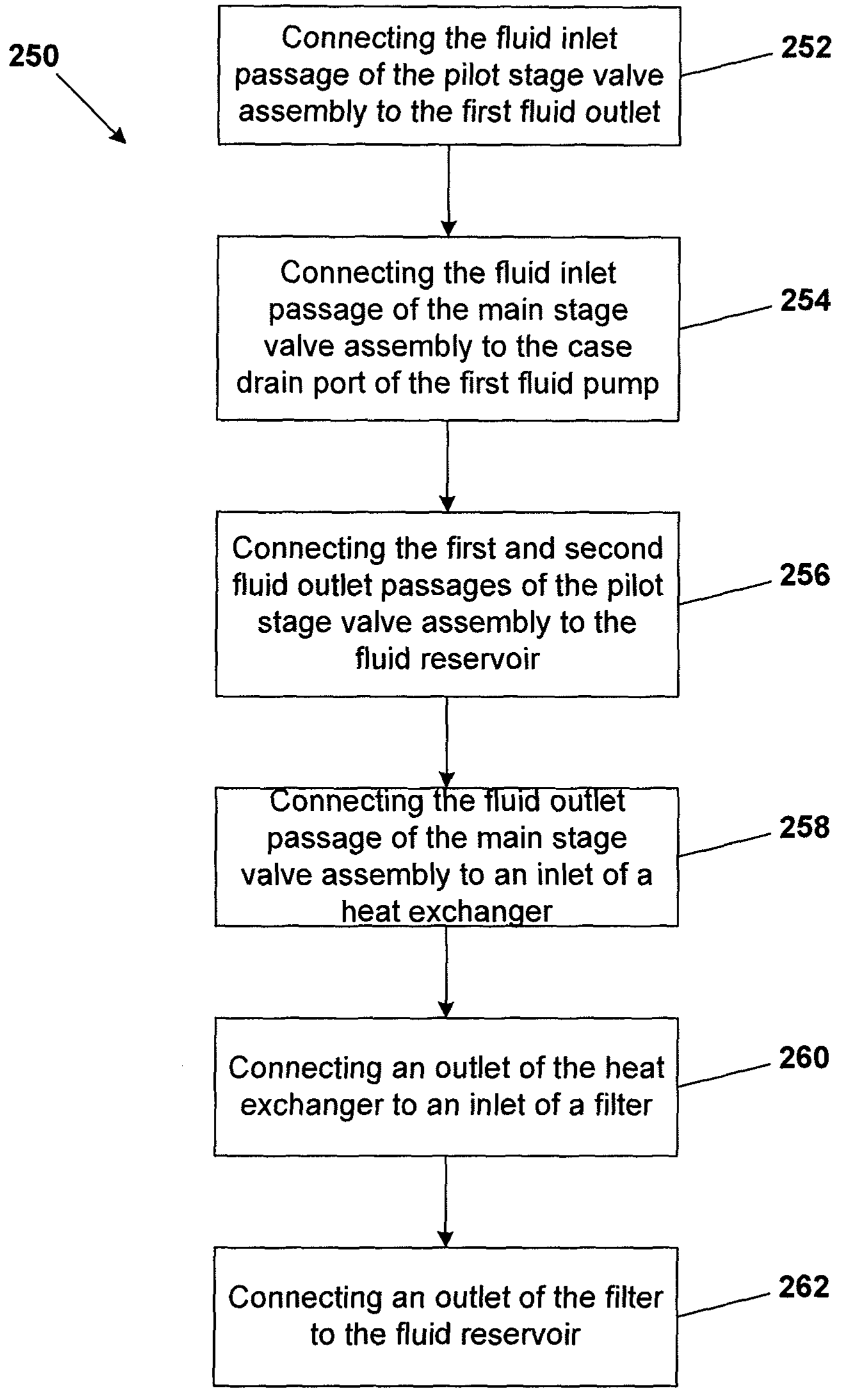
Figure 11:
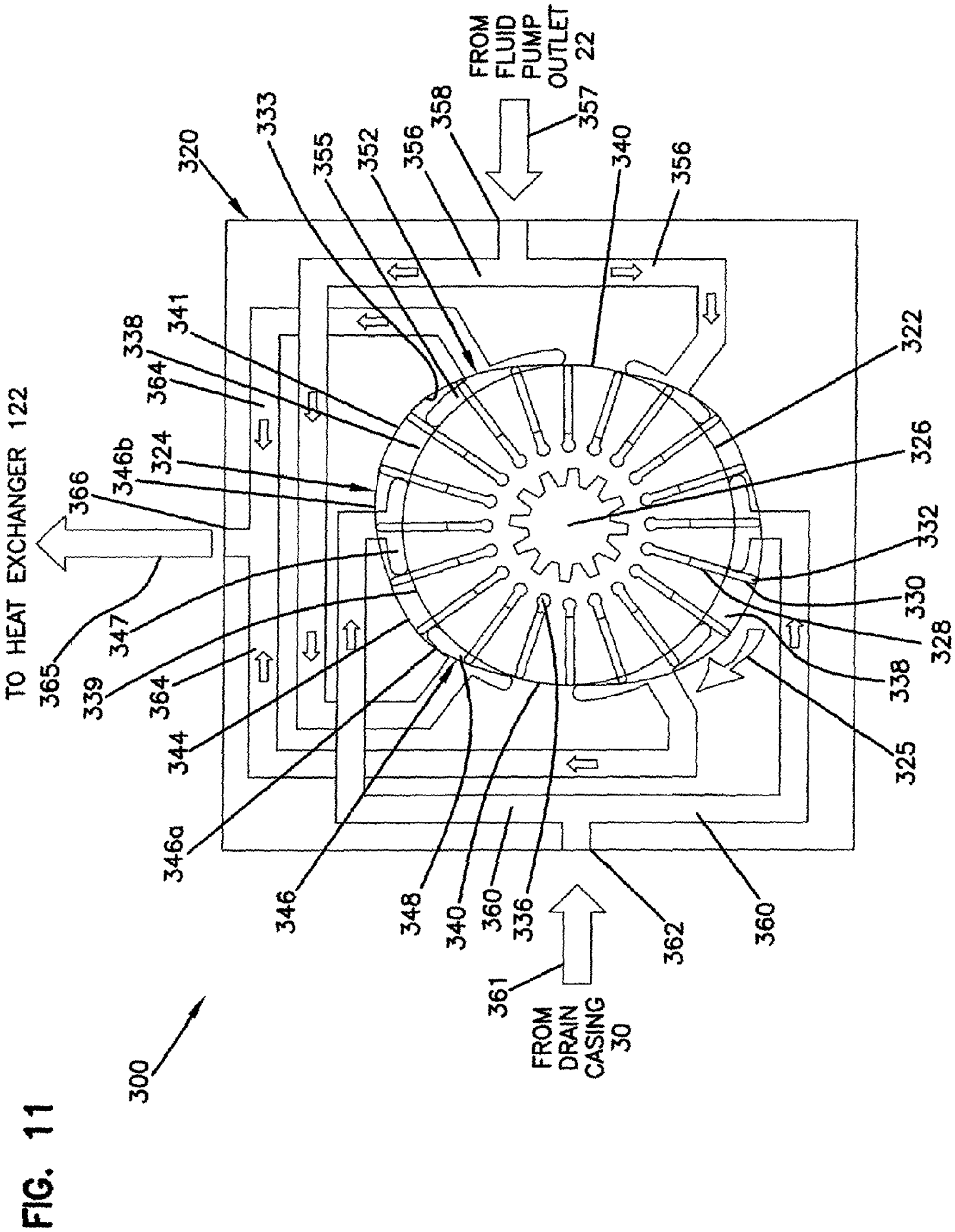
FIGS. 11 and 12 illustrate a third example implementation of a second fluid pump assembly.
Figure 12:
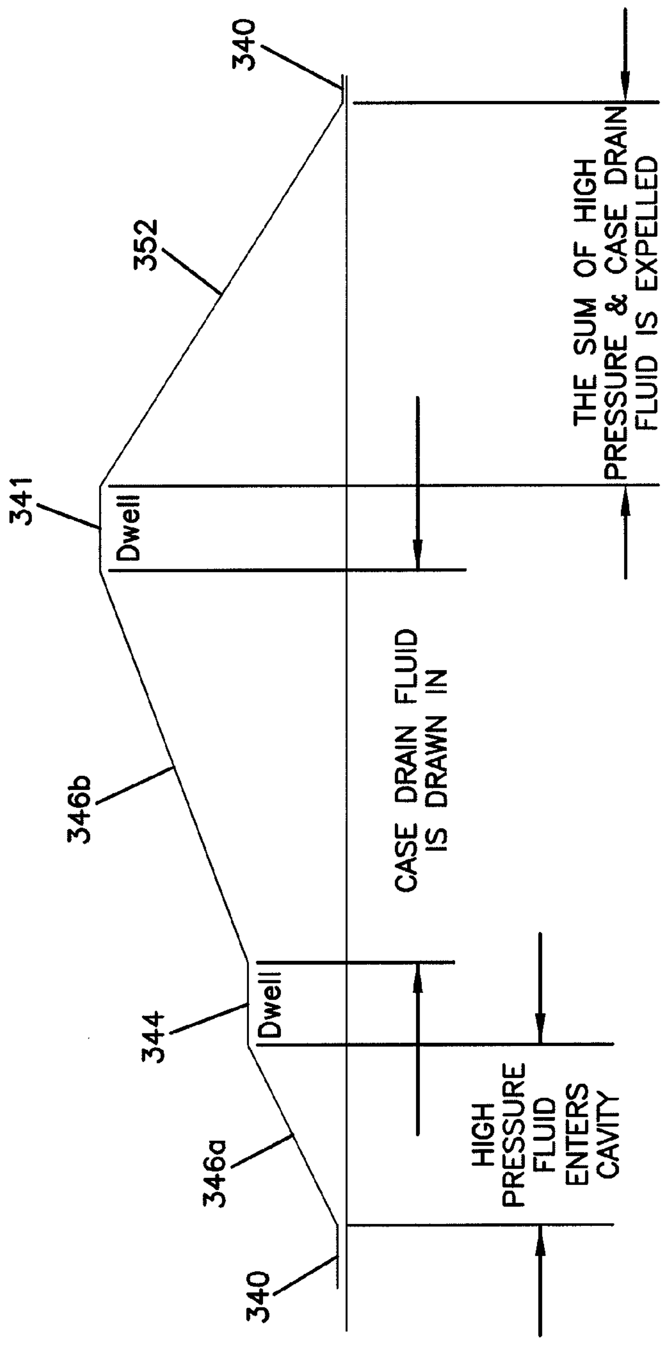
Figure 13:
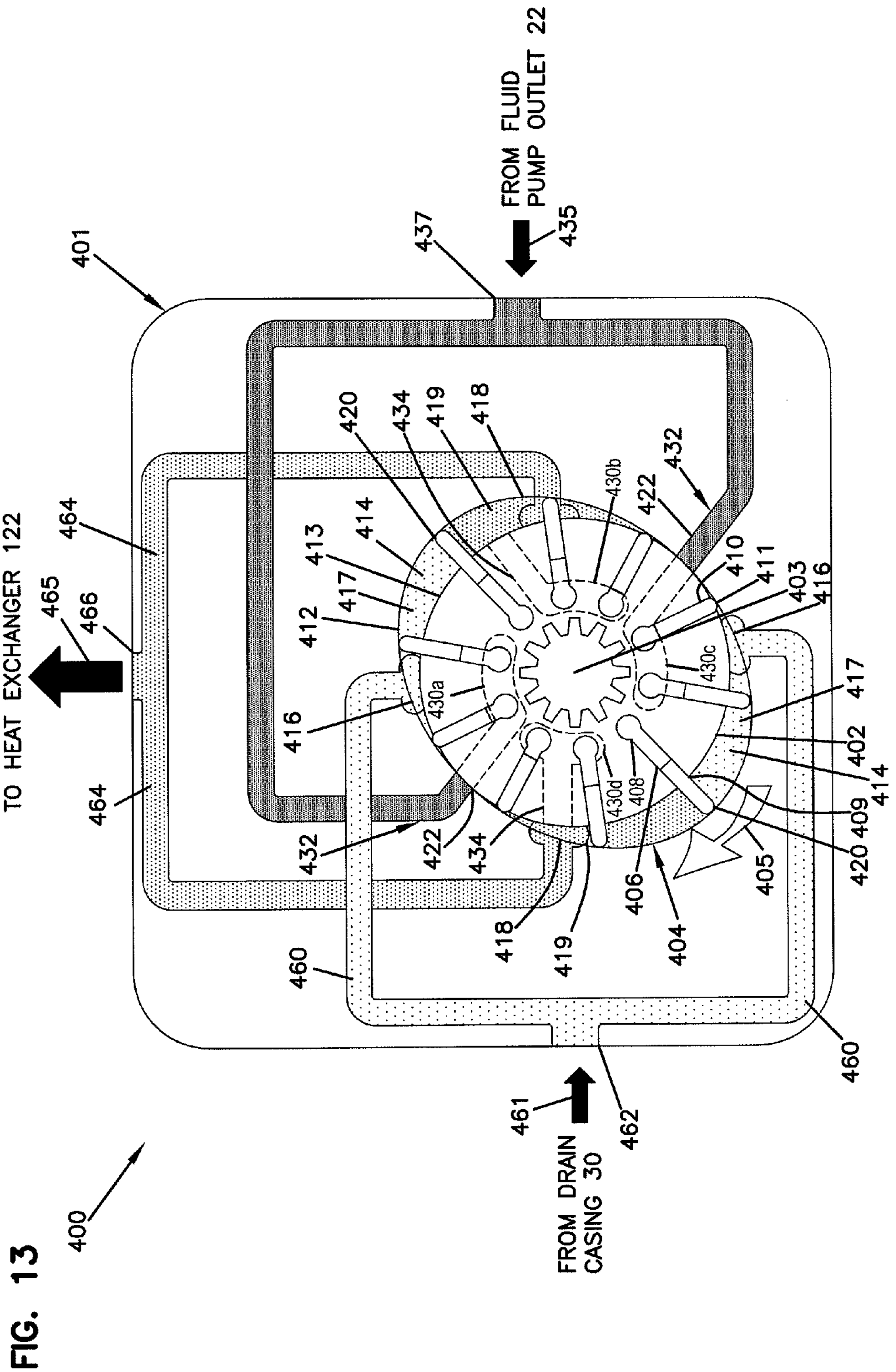
FIGS. 13 and 14 illustrate a fourth example implementation of a second fluid pump assembly.
Figure 14:
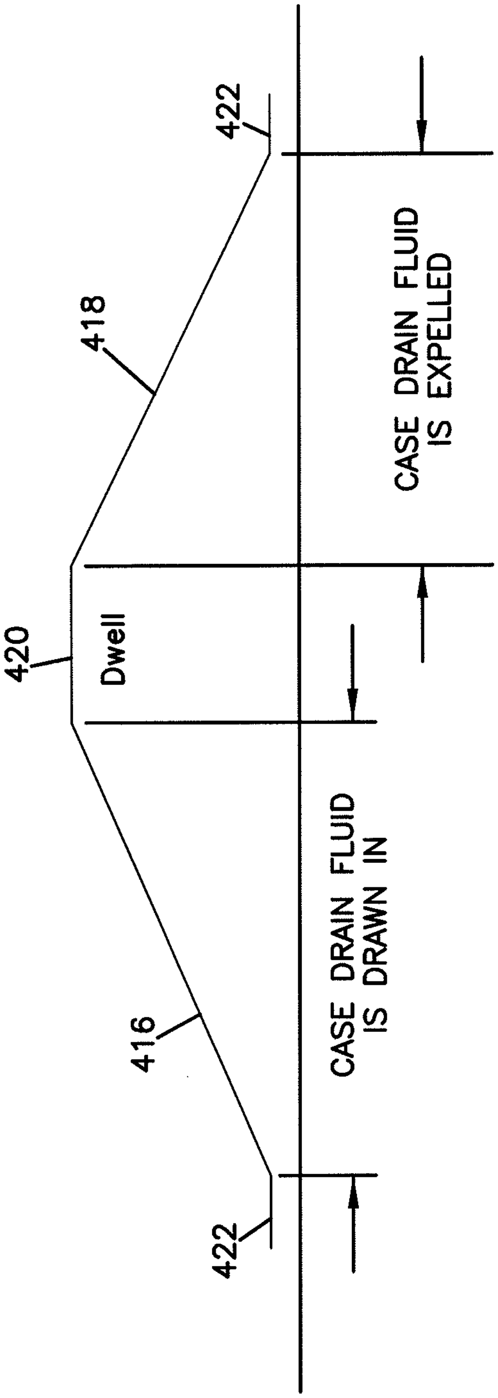

FIGS. 4-37 illustrate various example implementations of second fluid pump assemblies 32 suitable for use in the cooling circuits of FIGS. 2 and 3. FIGS. 4 and 5 illustrate a first example implementation 132 of a second fluid pump assembly 32 and a method of using the same. FIGS. 6-10 illustrate a second example implementation 332 of a second fluid pump assembly 32. FIGS. 11 and 12 illustrate a third example implementation 300 of a second fluid pump assembly 32. FIGS. 13 and 14 illustrate a fourth example implementation 400 of a second fluid pump assembly 32. FIGS. 15-30 illustrate a fifth example implementation 500 of a second fluid pump assembly 32. FIGS. 31-37 illustrate a sixth example implementation 600 of a second fluid pump assembly 32.

As shown in FIG. 4, the first example second fluid pump assembly 132 includes a fluid motor 34 and a second fluid pump 36 to output case drain fluid to a cooling circuit 141. The fluid motor 34 can be one of various types of fluid motors including a gerotor motor, a vane motor, an axial piston motor, a radial piston motor, a cam lobe motor, a reciprocating piston motor, etc. In the depicted embodiment, the fluid motor 34 is a fixed displacement motor. The displacement of the fluid motor 34 is based on a power requirement to pump fluid from the case drain region of the first fluid pump 16. In an alternate embodiment, the fluid motor 34 is a variable displacement motor.

The fluid motor 34 includes a fluid inlet 38 and a fluid outlet 40. The fluid inlet 38 of the fluid motor 34 is in fluid communication with the drive port 45 of the second fluid pump assembly 132, which is in fluid communication with the first fluid outlet 22 of the first fluid pump 16 via drive line 47. Only a first portion of the fluid from the first fluid outlet 22 of the first fluid pump 16 is communicated to the drive port 45 and, hence, to the fluid inlet 38 of the fluid motor 34. A second portion (e.g., the remaining portion) of the fluid from the first fluid outlet 22 of the first fluid pump 16 is communicated to the downstream components 26. In one embodiment, a flow divider is used to split the fluid from the first fluid outlet 22 of the first fluid pump 16 into the first and second portions.

The fluid motor 34 further includes an output shaft 42. As fluid passes from the fluid inlet 38 to the fluid outlet 40 of the fluid motor 34, the output shaft 42 rotates. The output shaft 42 of the fluid motor 34 is coupled to the second fluid pump 36. The second fluid pump 36 includes a second fluid inlet 44 and a second fluid outlet 46. The second fluid pump 36 also includes a pumping element. The pumping element can be one of various types of pumping elements including a gerotor-type, a vane-type, an axial piston-type, a radial piston-type, a reciprocating piston type, etc. As the second fluid pump 36 is coupled to the fluid motor 34, rotation of the output shaft 42 causes fluid to be communicated (i.e., pumped) from the second fluid inlet 44 of the second fluid pump 36 to the second fluid outlet 46 of the second fluid pump 36.

The second fluid inlet 44 of the second fluid pump 36 is in fluid communication with the case drain port 30 of the first fluid pump 16 along a fluid conduit 48 (e.g., hose, tubing, etc.). The fluid conduit 48 provides a passage through which fluid is communicated from the case drain port 30 of the first fluid pump 16 to the second fluid inlet 44 of the second fluid pump 36. In certain implementations, the second fluid inlet 44 of the second fluid pump 36 is in direct communication with the case drain port 30 of the first fluid pump 16. In the depicted embodiment, the fluid conduit 48 includes case drain fluid line 37.

Fluid from the case drain region of the first fluid pump 16 is communicated to the second fluid inlet 44 of the second fluid pump 36 through the case drain port 30 of the first fluid pump 16 and the fluid conduit 48 as the output shaft 42 of the fluid motor 34 rotates. In the depicted embodiment, fluid from the fluid outlet 40 of the fluid motor 34 is in fluid communication with the second fluid inlet 44 of the second fluid pump 36. In the depicted embodiment, fluid from the fluid outlet 40 of the fluid motor 34 is in fluid communication with the fluid conduit 48.

Fluid from the case drain region of the first fluid pump 16 is pumped to the fluid reservoir 24 through the second fluid outlet 46 of the second fluid pump 36. In the depicted embodiment, the fluid passes through a heat exchanger 122 and a fluid filter 128 before reaching the reservoir 24. The heat exchanger 122 is adapted to draw heat from the fluid. The fluid filter 128 is adapted to filter contaminants of a particular particle size from the fluid before the fluid enters the fluid reservoir 24. Additional heat exchangers 122 can be provided along the cooling line 141 to transfer heat out of the system, thereby cooling the fluid carried through the cooling line 141. In an alternate embodiment, the filter 128 is disposed between the fluid reservoir 24 and the first fluid inlet 20 of the first fluid pump 16. In certain implementations, the fluid is passed through a heat exchanger 49 (e.g., see FIG. 3) to carry away heat from the electronic control circuitry 19, the motor 18, and/or the first fluid pump 16.

Referring now to FIG. 5, a method 200 for assembling the fluid circuit 141 will be described. The fluid inlet 38 of the fluid motor 34 is connected to the first fluid outlet 22 of the first fluid pump 16 in step 202. In one embodiment, the fluid inlet 38 of the fluid motor 34 is connected to the first fluid outlet 22 through a plurality of fluid conduits (e.g., hoses, tubes, pipes, etc.). In another embodiment, a flow divider provides the connection between the first fluid outlet 22 of the first fluid pump 16 and the fluid inlet 38 of the fluid motor 34.

In step 204, the second fluid inlet 44 of the second fluid pump 36 is connected to the case drain port 30 of the first fluid pump 16. As the fluid motor 34 is coupled to the second fluid pump 36, actuation of the fluid motor 34 causes fluid in the case drain region of the first fluid pump 16 to be pumped out of the first fluid pump 16 by the second fluid pump 36. In the depicted embodiment, the fluid motor 34 is coupled to the second fluid pump 36 by the output shaft 42. In the depicted embodiment, the second fluid pump 36 is connected to the case drain port 30 by the fluid conduit 48.

In step 206, the fluid outlet 40 of the fluid motor 34 is in fluid communication with the second fluid inlet 44 of the second fluid pump 36. In the depicted embodiment, the fluid outlet 40 of the fluid motor 34 is coupled to the fluid conduit 48. In step 208, the second fluid outlet 46 of the second fluid pump 36 is connected to an inlet 121 of the heat exchanger 122. In one embodiment a conduit (e.g., hose, tube, pipe, etc.) provides the connection between the second fluid outlet 46 and the inlet 122.

In step 210, an outlet 123 of the heat exchanger 122 is connected to an inlet 127 of the filter 128. In one embodiment a conduit (e.g., hose, tube, pipe, etc.) provides the connection between the outlet 123 and the inlet 127. In step 212, an outlet 129 of the filter 128 is connected to the reservoir 24.

Referring now to FIGS. 6-10, a second example implementation 232 of the second fluid pump assembly 32 suitable for use with the cooling circuit 14 of FIG. 2, the cooling circuit 14' of FIG. 3, or another cooling circuit will be described. The second fluid pump assembly 232 includes a pilot stage valve assembly 234 and a main stage valve assembly 236. In the depicted embodiment, the pilot stage valve assembly 234 includes a first valve housing 238 (e.g., a valve block) and a pilot stage valve 140 disposed in the first valve housing 238. The first valve housing 238 defines a first spool bore 142 in which the pilot stage valve 140 is slidably disposed. The first spool bore 142 includes a first axial end 144 and an oppositely disposed second axial end 146. The first spool bore 142 defines a central longitudinal axis 148 that extends between the first and second axial ends 144, 146.

The first valve housing 238 further defines a fluid inlet passage 50 that is in fluid communication with the first spool bore 142, a first control passage 52, a second control passage 54, a first pilot passage 56 that is in fluid communication with the first axial end 144 of the first spool bore 142, and a second pilot passage 58 that is in fluid communication with the second axial end 146 of the first spool bore 142. In the depicted embodiment, the fluid inlet passage 50 has an opening at the first spool bore 142 that is between spool bore openings for the first and second control passages 52, 54. In the depicted embodiment, the opening for the first control passage 52 is disposed between the first axial end 144 of the first spool bore 142 and the opening for the fluid inlet passage 50. The opening for the second control passage 54 is disposed between the second axial end 146 of the first spool bore 142 and the opening for the fluid inlet passage 50.

In the depicted embodiment, the first valve housing 238 further includes a first fluid outlet passage 60 and a second fluid outlet passage 62. The first and second fluid outlet passages 60, 62 are in fluid communication with the fluid reservoir 24. An opening at the first spool bore 142 for the first fluid outlet passage 60 is disposed between the first axial end 144 of the first spool bore 142 and the opening for the first control passage 52. An opening at the first spool bore 142 for the second fluid outlet passage 62 is disposed between the second axial end 146 of the first spool bore 142 and the opening for the second control passage 54.

The pilot stage valve 140 is generally cylindrical in shape and is adapted to slide within the first spool bore 142 in an axial direction along the central longitudinal axis 148. The pilot stage valve 140 includes a first end 64 and an oppositely disposed second end 66. The pilot stage valve 140 includes a first land 68 disposed adjacent the first end 64, a second land 70 disposed adjacent the second end 66, and a third land 72 disposed between the first and second lands 68, 70. The first and third lands 68, 72 are adapted to provide selective fluid communication between the first control passage 52 and one of the fluid inlet passage 50 and the first fluid outlet passage 60. The second and third lands 70, 72 are adapted to provide selective fluid communication between the second control passage 54 and one of the fluid inlet passage 50 and the second fluid outlet passage 62.

Figure 8:
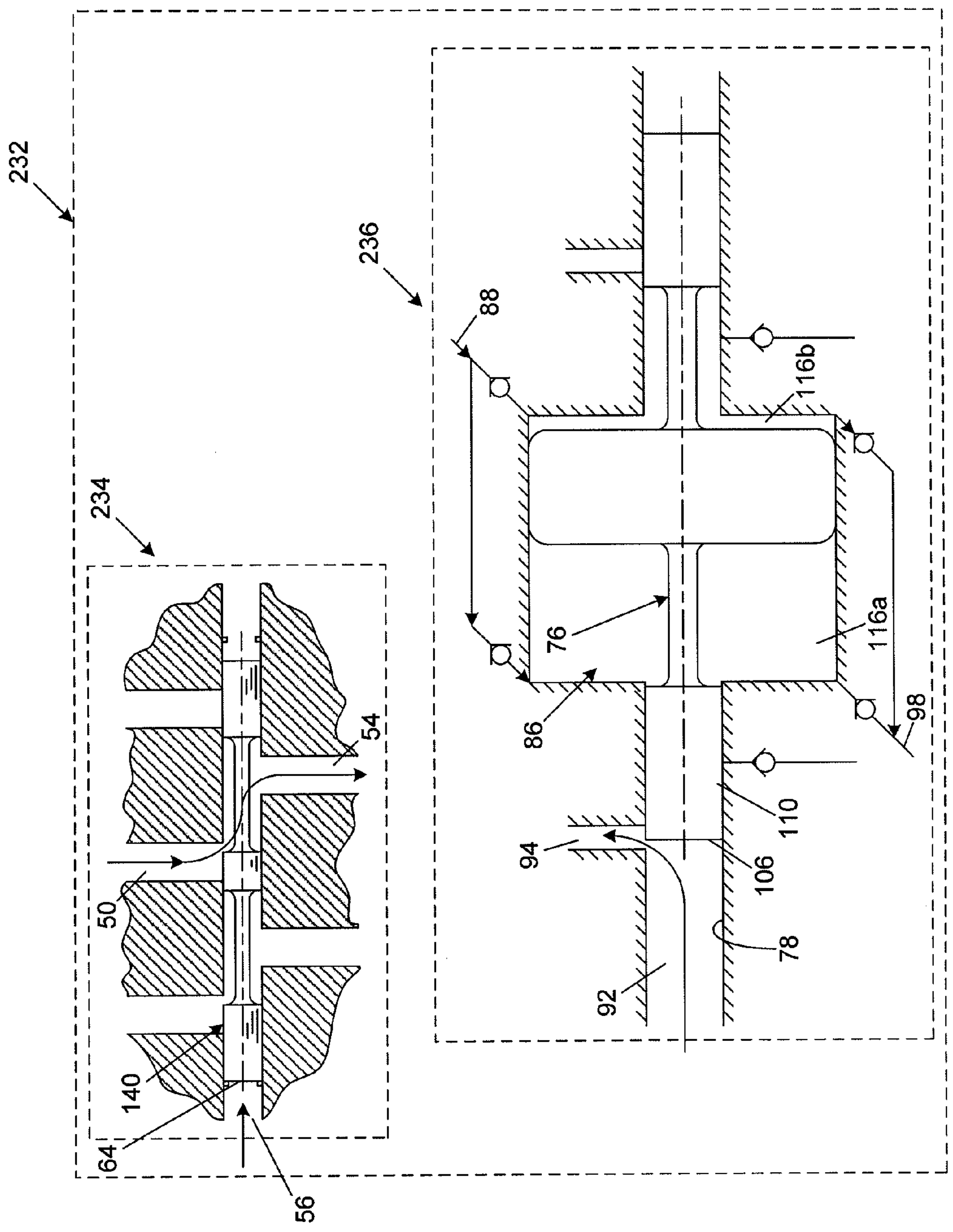
Figure 9:
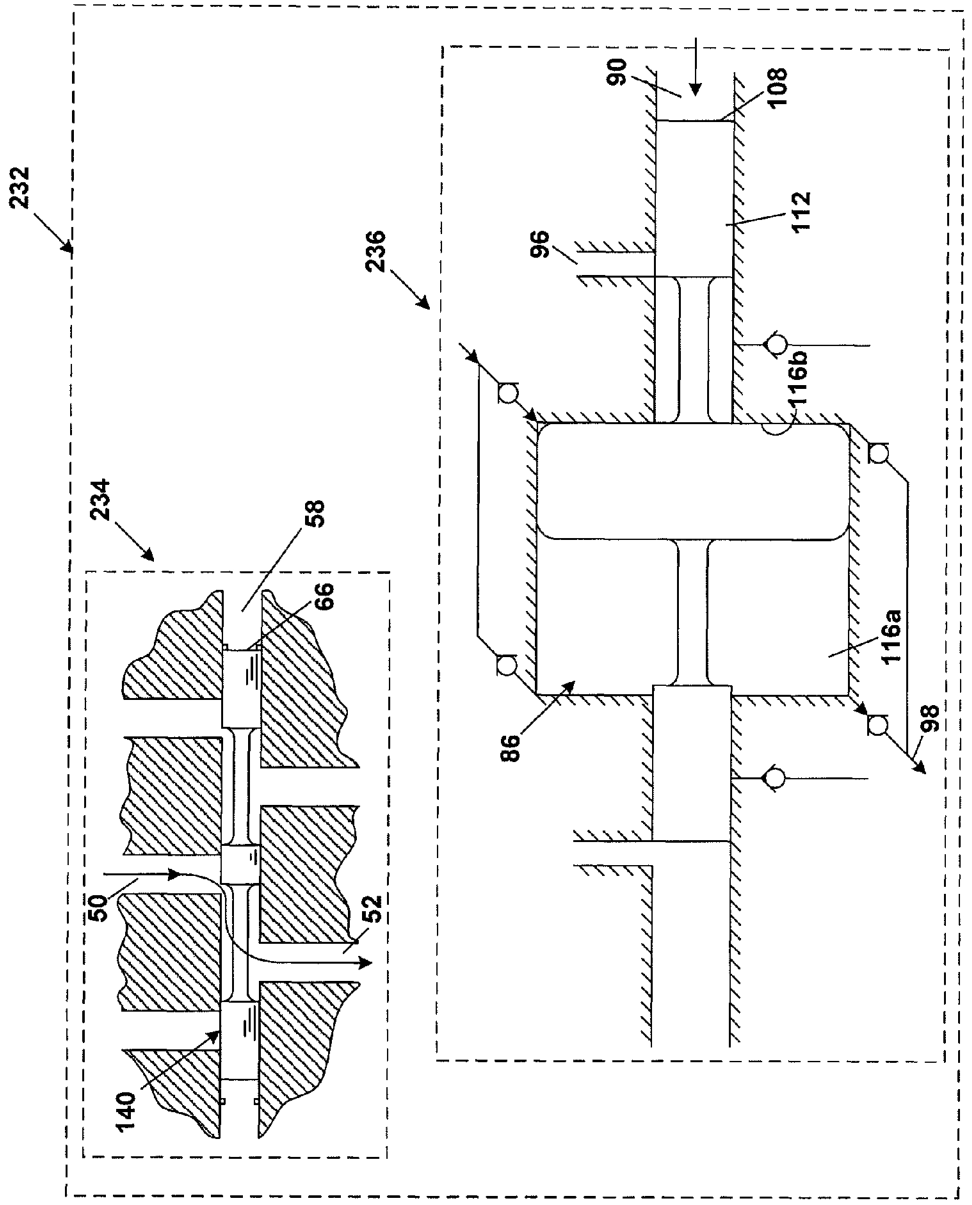

The pilot stage valve 140 is adapted to move between a first position (shown in FIG. 8) and a second position (shown in FIG. 9). In the first position, fluid from the fluid inlet passage 50 is in fluid communication with the first control passage 52. In the second position, fluid from the fluid inlet passage 50 is in fluid communication with the second control passage 54. The pilot stage valve 140 is actuated from the first position to the second position by fluid from the first pilot passage 56 acting against the first end 64 of the pilot stage valve 140. The pilot stage valve 140 is actuated from the second position to the first position by fluid from the second pilot passage 58 acting against the second end 66 of the pilot stage valve 140. In the depicted embodiment, stops 73 are disposed in the first spool bore 142 at the first axial end 144 and the second axial end 146. The stops 73 are adapted to stop the axial movement of the pilot stage valve 140.

The main stage valve assembly 236 includes a second valve housing 74 and a main stage valve 76 disposed in the second valve housing 74. In one embodiment, the first valve housing 238 of the pilot stage valve assembly 234 and the second valve housing 74 of the main stage valve assembly 236 are a single unitary housing such as a valve block. In another embodiment, the first valve housing 238 of the pilot stage valve assembly 234 and the second valve housing 74 of the main stage valve assembly 236 are separate valve housings that are connected together via hoses, tubes, or pipes. In another embodiment, the first and second valve housings 238, 74 are directly connected together by fasteners (e.g., bolts, screws, welds, etc.).

The second valve housing 74 defines a second spool bore 78 in which the main stage valve 76 is slidably disposed. The second spool bore 78 includes a first axial end 80 and an oppositely disposed second axial end 82. The second spool bore 78 defines a central longitudinal axis 84 that extends between the first and second axial ends 80, 82. In the depicted embodiment, the second spool bore 78 includes a pumping chamber 86. The pumping chamber 86 of the second spool bore 78 is disposed between the first and second axial ends 80, 82. In the depicted embodiment, an inner diameter of the pumping chamber 86 is greater than an inner diameter of the first axial end 80 and an inner diameter of the second axial end 82.

The second valve housing 74 further defines a fluid inlet passage 88 that is in fluid communication with the pumping chamber 86 of the second spool bore 78, a first control passage 90 that is in fluid communication with the second axial end 82 of the second spool bore 78, a second control passage 92 that is in fluid communication with the first axial end 80 of the second spool bore 78, a first pilot passage 94, and a second pilot passage 96. The second valve housing 74 further includes a fluid outlet passage 98 that is in fluid communication with the pumping chamber 86 of the second spool bore 78. The fluid outlet passage 98 is in fluid communication with the fluid reservoir 24.

In the depicted embodiment, a first check valve 100*a* is disposed in the fluid inlet passage 88 and a second check valve 100*b* is disposed in the fluid outlet passage 98. The first and second check valves 100*a*, 100*b* are adapted to allow fluid to flow through the fluid inlet passages 88 and the fluid outlet passages 98 in only one direction.

The second valve housing 74 further defines a first fluid outlet passage 102 and a second fluid outlet passage 104. The first fluid outlet passage 102 is disposed between the pumping chamber 86 and the first pilot passage 94. The second fluid outlet passage 104 is disposed between the pumping chamber 86 and the second pilot passage 96. The first and second fluid outlet passages 102, 104 are in fluid communication with the fluid reservoir 24. In one embodiment, check valves are disposed in the first and second outlet passages 102, 104.

The first control passage 90 of the main stage valve assembly 236 is in fluid communication with the first control passage 52 of the pilot stage valve assembly 234. The second control passage 92 of the main stage valve assembly 236 is in fluid communication with the second control passage 54 of the pilot stage valve assembly 234. The first and second pilot passages 94, 96 of the main stage valve assembly 236 are in fluid communication with the first and second pilot passages 56, 58, respectively, of the pilot stage valve assembly 234.

The main stage valve 76 is generally cylindrical in shape and is adapted to slide within the second spool bore 74 in an axial direction along the central longitudinal axis 84. The main stage valve 76 includes a first end 106 and an oppositely disposed second end 108. The main stage valve 76 includes a first land 110 disposed adjacent the first end 106, a second land 112 disposed adjacent the second end 108, and a piston 114 disposed between the first and second lands 110, 112.

The first land 110 is adapted to provide selective fluid communication between the first pilot passage 94 and one of the second control passage 92 and the first fluid outlet passage 102. The second land 112 is adapted to provide selective fluid communication between the second pilot passage 96 and one of the first control passage 90 and the second fluid outlet passage 104. The piston 114 is disposed in the pumping chamber 86 of the second spool bore 74. The piston 114 separates the pumping chamber 86 into a first volume chamber 116*a* and a second volume chamber 116*b*. The first and second volume chambers 116*a*, 116*b* expand and contract as the main stage valve 76 moves axially in the second spool bore 78.

The main stage valve 76 is adapted to move between a first position (shown in FIG. 8) and a second position (shown in FIG. 9). As the main stage valve 76 is actuated to the first position, fluid from the fluid inlet passage 88 enters the second volume chamber 116*b* of the pumping chamber 86 while fluid in the first volume chamber 116*a* is expelled to the fluid outlet passage 98. The main stage valve 76 is actuated from the second position to the first position by fluid from the first control passage 52 of the pilot stage valve assembly 234, which is in fluid communication with the first control passage 90 of the main stage valve assembly 236, acting against the second end 108 of the main stage valve 76.

As the main stage valve 76 is actuated to the second position, fluid from the fluid inlet passage 88 enters the first volume chamber 116*a* of the pumping chamber 86 while fluid in the second volume chamber 116*b* is expelled to the fluid outlet passage 98. The main stage valve 76 is actuated from the first position to the second position by fluid from the second control passage 54 of the pilot stage valve assembly 234, which is in fluid communication with the second control passage 92 of the main stage valve assembly 236, acting against the first end 106 of the main stage valve 76.

Referring now to FIGS. 2, 3, 6, and 7, a method 250 for assembling the second fluid pump assembly 232 to the first fluid pump assembly 12 of either FIG. 2 or 3 will be described. The fluid inlet passage 50 of the pilot stage valve assembly 234 is connected to the first fluid outlet 22 of the first fluid pump 16 in step 252. In one embodiment, the fluid inlet passage 50 of the pilot stage valve assembly 234 is connected to the first fluid outlet 22 through a plurality of fluid conduits (e.g., hoses, tubes, pipes, etc.). In another embodiment, a flow divider provides the connection between the first fluid outlet 22 of the first fluid pump 16 and the fluid inlet passage 50 of the pilot stage valve assembly 234.

In step 254, the fluid inlet passage 88 of the main stage valve assembly 236 is connected to the case drain port 30 of the first fluid pump 16. Actuation of the piston 114 causes fluid in the case drain region of the first fluid pump 16 to be pumped out of the first fluid pump 16 by the main stage valve assembly 236. In the depicted embodiment, the main stage valve assembly 236 is connected to the case drain port 30 by a fluid conduit 118 (e.g., a hose, tube, etc.). In step 256, the first and second fluid outlet passages 60, 62 of the pilot stage valve assembly 234 are connected to the fluid reservoir 24.

In step 258, the fluid outlet passage 98 of the main stage valve assembly 236 is connected to an inlet 121 of the heat exchanger 122. In one embodiment a conduit (e.g., hose, tube, pipe, etc.) provides the connection between the fluid outlet passage 98 and the inlet 121. In step 260, an outlet 123 of the heat exchanger 122 is connected to an inlet 127 of a filter 128. In one embodiment a conduit (e.g., hose, tube, pipe, etc.) provides the connection between the outlet 123 and the inlet 127. In step 262, an outlet 129 of the filter 128 is connected to the reservoir 24.

Figure 10:
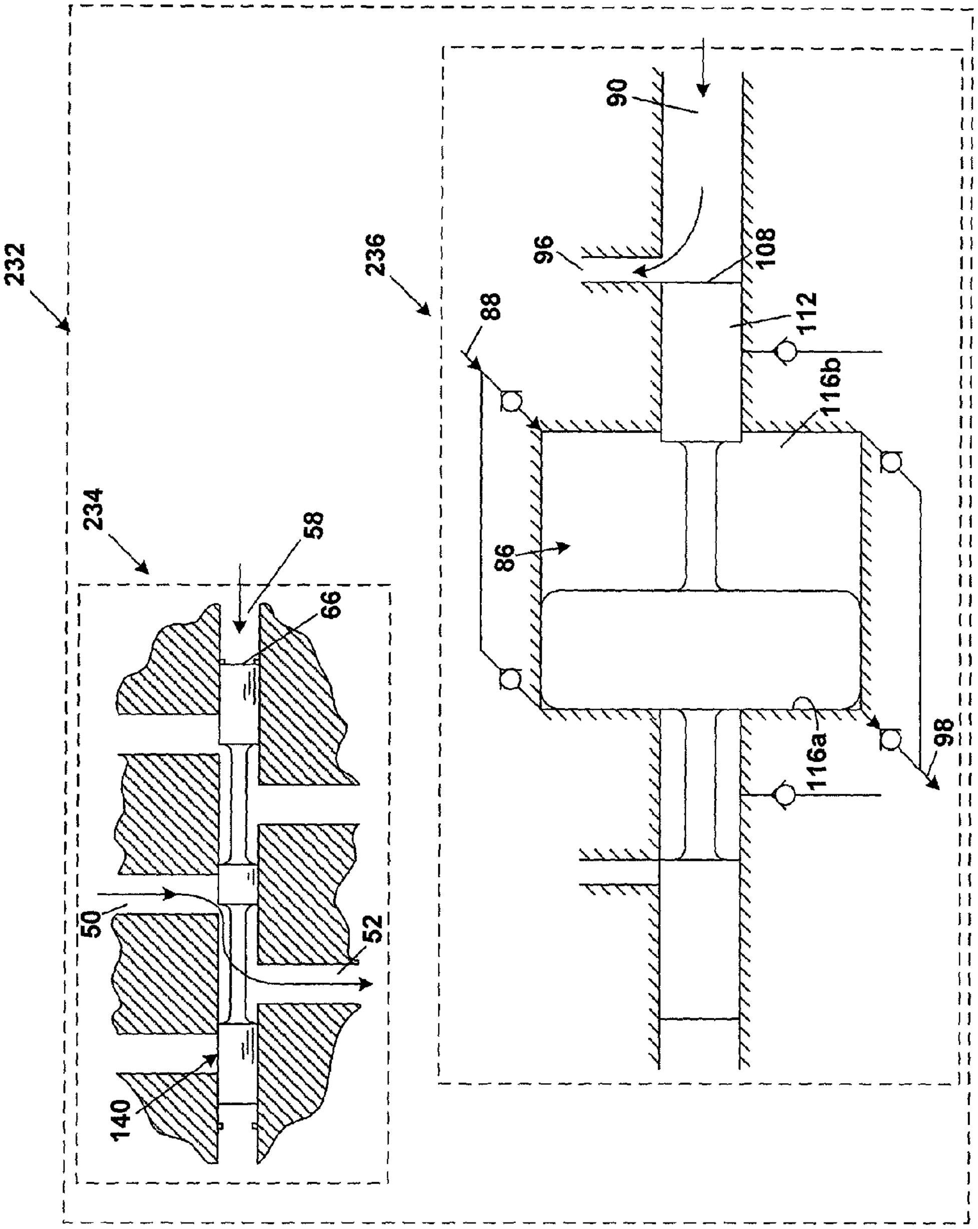

Referring now to FIGS. 8-10, the operation of the second fluid pump assembly 232 will be described. In the depicted embodiment, the main stage valve 76 of the main stage valve assembly 236 reciprocates in response to pressurized fluid in the first and second control passages 90, 92. As the main stage valve 76 reciprocates, fluid is pumped from the case drain region of the first fluid pump assembly 16 to the fluid reservoir 24 (e.g., see FIGS. 2 and 3).

A first portion of the fluid from first fluid outlet 22 of the first fluid pump 16 enters the fluid inlet passage 50 of the pilot stage valve assembly 234. With the pilot stage valve 140 in the first position (e.g., as shown in FIG. 8), fluid from the fluid inlet passage 50 enters the second control passage 54 of the pilot stage valve assembly 234 and is communicated to the second control passage 92 of the main stage valve assembly 236. The fluid in the second control passage 92 of the main stage valve assembly 236 acts against the first end 106 of the main stage valve 76 causing the main stage valve 76 to move in an axial direction from the first position to the second position.

As the main stage valve 76 moves toward the second position from the first position, the first volume chamber 116*a* of the pumping chamber 86 expands while the second volume chamber 116*b* contracts. As the first volume chamber 116*a* expands, fluid from the case drain port 30 of the first fluid pump assembly 16 enters the first volume chamber 116*a* of the pumping chamber 86 of the main stage valve assembly 236 through the fluid inlet passage 88. As the second volume chamber 116*b* contracts, fluid in the second volume chamber 116*b* is expelled through the fluid outlet passage 98.

When the first land 110 of the main stage valve 76 uncovers an opening to the first pilot passage 94 of the main stage valve assembly 236, fluid is communicated from the second control passage 92 of the main stage valve assembly 236 to the first pilot passage 56 of the pilot stage valve assembly 234. The fluid from the first pilot passage 56 acts against the first end 64 of the pilot stage valve 140 so that the pilot stage valve 140 moves in an axial direction toward the second position.

Referring now to FIGS. 9 and 10, fluid from the fluid inlet passage 50 of the pilot stage valve assembly 234 is communicated to the first control passage 52, which is communicated to the first control passage 90 when the pilot stage valve 140 is in the second position. The fluid from the first control passage 90 of the main stage valve assembly 236 acts against the second end 108 of the main stage valve 76 so that the main stage valve 76 moves in an axial direction toward the first position from the second position.

As the main stage valve 76 moves toward the first position from the second position, the second volume chamber 116*b* of the pumping chamber 86 expands while the first volume chamber 116*a* contracts. As the second volume chamber 116*b* expands, fluid from the case drain port 30 of the first fluid pump assembly 16 enters the second volume chamber 116*b* of the pumping chamber 86 of the main stage valve assembly 236 through the fluid inlet passage 88. As the first volume chamber 116*a* contracts, fluid in the first volume chamber 116*a* is expelled through the fluid outlet passage 98.

When the second land 112 of the main stage valve 76 uncovers an opening to the second pilot passage 96 of the main stage valve assembly 236, fluid is communicated from the first control passage 90 of the main stage valve assembly 236 to the second pilot passage 58 of the pilot stage valve assembly 234. The fluid from the second pilot passage 58 acts against the second end 66 of the pilot stage valve 140 so that the pilot stage valve 140 moves in an axial direction toward the first position.

Referring now to FIGS. 11 and 12, a third example implementation 300 of the second fluid pump assembly 32 suitable for use with the cooling circuit 14 of FIG. 2, the cooling circuit 14' of FIG. 3, or another cooling circuit will be described. The fluid pump assembly 300 is depicted as a vane pump 320 that concurrently provides a motor function and a pump function. The vane pump 320 includes a rotor 322 rotationally mounted within a cam ring structure 324. The rotor 322 rotates within the cam ring structure 324 in a clockwise direction 325 about a central axis of rotation 326. The rotor 322 defines a plurality of radial slots 328 that extend radially outwardly from the central axis of rotation 326. Vanes 330 are mounted within the radial slots 328. The vanes 330 can slide radially within the radial slots 328 such that outer ends 332 of the vanes 330 can remain in contact with a cam surface 334 of the cam ring structure 324. The outer ends 332 can remain in contact with the cam surface 334 by centrifugal force generated when the rotor 322 is rotated about the axis of rotation 326. Alternatively inner portions 336 of the radial slots 328 can be pressurized so as to force the vanes 330 radially outwardly against the cam surface 334.

The cam ring structure 324 is configured for allowing the vane pump 320 to concurrently function as both a pump and a motor. In a preferred embodiment, motive force for turning the rotor 322 in the clockwise direction 325 within the cam ring structure 324 is provided by using hydraulic pressure from the first fluid outlet 22 of the first fluid pump 16 (FIGS. 2 and 3). For example, a portion of the relatively high pressure fluid dispensed from the first fluid outlet 22 of the first fluid pump 16 can be used to power rotation of the rotor 322. Rotation of the rotor 322 in the clockwise direction 325 within the cam ring structure 324 causes fluid to be drawn from the case drain port 30 of the first fluid pump 16.

The fluid drawn from the case drain port 30 as well as the fluid from the first fluid outlet 22 used to drive the rotor 322 are combined within the vane pump 320 and then pumped outwardly from the vane pump 320 to the heat exchanger 122 where the fluid is cooled. Thereafter, the fluid flows through the filter 52 back to the reservoir 24 of the fluid circuit 10. It will be appreciated that the reservoir 24 is in fluid communication with the first fluid pump 16 and the heat exchanger 122 (FIGS. 2 and 3) with the reservoir 24 being upstream from the first fluid pump 16 and downstream from the heat exchanger 122.

Referring still to FIG. 11, the vane pump 320 includes two identical, oppositely disposed motor/pump chambers 338

(i.e., lobes). The motor/pump chambers 338 are defined between an outer cylindrical surface 339 of the rotor 322 and a cam surface 333 of the cam ring structure 324. The outer cylindrical surface 339 faces away from the axis of rotation 326 and the cam surface 333 faces toward the axis of rotation 326. The motor/pump chambers 338 are separated from one another by minor dwell surfaces 340 (i.e., minor diameters). Each of the motor/pump chambers 338 is defined by an ascending portion 346 of the cam surface 334 and a descending portion 352 of the cam surface 334. The ascending portion 346 and the descending portion 352 of the cam surface 334 of each motor/pump chamber 338 are separated by a major dwell surface 341 (i.e., a major diameter). The ascending and descending portions 346, 352 of the cam surface 334 extend from the major dwell surfaces 341 to the minor dwell surfaces 340. The ascending portions 346 of the cam surface 334 each include a first ascending portion **346*a* separated from a second ascending portion 346*b* by an intermediate dwell surface 344** (i.e., an intermediate diameter).

Motor regions 348 of the motor/pump chambers 338 coincide with the first ascending portions **346*a*, fluid intake regions 347 of the motor/pump chambers 338 coincide with the second ascending portions 346*b*, and output regions 355 of the motor/pump chambers 338 coincide with the descending portions 352. The ascending portions 346*a*, 346*b* of the cam surface 333 transition gradually away from (i.e., further from) the axis of rotation 326 as the ascending portions 346*a*, 346*b* extend in the clockwise direction 325 about the axis of rotation 326. The descending portions 352 of the cam surface 333 transition gradually toward (i.e., closer to) the axis of rotation 326 as the descending portions 352 extend in the clockwise direction 325 about the axis of rotation 326**.

The dwell surfaces 341 are defined by constant radii swung about the axis of rotation 326 and therefore maintain a constant spacing from the axis of rotation 326 as the dwell surfaces extend in the clockwise direction 325 about the axis of rotation 326. The radii of the intermediate dwell surfaces 344 are larger than the radii of the minor dwell surfaces 340, and the radii of the major dwell surfaces 341 are larger than the radii of the intermediate dwell surfaces 344. A cam profile for the cam surface 334 of one of the two identical motor/pump chambers 338 is shown at FIG. 12.

The cam ring structure 324 includes high pressure passages 356 that are connected in fluid communication with the first fluid outlet 22 of the first fluid pump 16 (FIGS. 2 and 3) by a fluid line 357 that extends from the flow diverter 27 to a high pressure port 358 (i.e., a drive port) of the vane pump 320. The cam ring structure 324 also includes intake passages 360 that are connected in fluid communication with the case drain port 30 of the first fluid pump 16 (FIGS. 2 and 3) by a fluid line 361 that extends from the case drain port 30 to an intake port 362 of the vane pump 320.

The cam ring structure 324 further includes output passages 364 connected in fluid communication with the heat exchanger 122 of the cooling circuit by a fluid line 365 that extends from the heat exchanger 122 of the cooling circuit 14, 14' to an output port 366 of the vane pump 320. The high pressure passages 356 provide fluid communication between the motor regions 348 of the motor/pump chambers 338 and the high pressure port 358 of the vane pump 320. The intake passages 360 provide fluid communication between the intake regions 347 of the motor/pump chambers 338 and the intake port 362 of the vane pump 320. The output passages 364 provide fluid communication between the output regions 355 of the motor/pump chambers 338 and the output port 366 of the vane pump 320.

In use of the vane pump 320, a portion of the high pressure fluid from the first fluid outlet 22 of the first fluid pump 16 (e.g., in one embodiment fluid at a pressure of about 3,000 pounds per square inch (psi)) is directed through a diverter to the fluid line 357. The fluid line 357 carries the high pressure fluid to the high pressure port 358 of the vane pump 320. From the high pressure port 358, the high pressure fluid travels through the high pressure passages 356 to the motor regions 348 of the motor/pump chambers 338. The high pressure fluid directed into the motor regions 348 through the high pressure passages 356 acts upon the vanes 330 at the motor regions 348 of the motor/pump chambers 338. This pressure applied against the vanes 330 at the motor regions 348 of the motor/pump chambers 338 provides the motive force necessary to rotate the rotor 322 in the clockwise direction 325 about the axis of rotation 326.

Rotation of the rotor 322 in the clockwise direction causes lower pressure fluid from the case drain port 30 of the first fluid pump 16 (e.g., in one embodiment fluid at about 50 psi) to be drawn from the intake passages 360 into the intake regions 347 of the motor/pump chambers 338. At the intake regions 347 of the motor/pump chambers 338, the high pressure fluid from the first fluid outlet 22 mixes with the lower pressure fluid from the case drain port 30. As the rotor 322 continues to rotate about the axis of rotation 326, the mixture of high pressure fluid and lower pressure fluid is compressed to an intermediate pressure (e.g., in one embodiment about 200 psi) in the output regions 355 of the motor/pump chambers 338 and forced out the output passages 364 to the heat exchanger 50 where the fluid is cooled. Upon exiting the heat exchanger 122, the fluid flows through the filter 128 back to the reservoir 24 (see FIGS. 2 and 3).

FIG. 13 shows a fourth example implementation 400 of a second fluid pump assembly 32 suitable for use with cooling circuit 14 of FIG. 2, cooling circuit 14' of FIG. 3, or another cooling circuit. Similar to the third example assembly 300 shown in FIG. 11, the fluid pump assembly 400 is a vane pump 401 that concurrently functions as both a motor and a pump. The vane pump 401 includes a rotor 402 that rotates within a cam ring structure 404 in a clockwise direction 405 about a central rotation axis 403. The vane pump 401 uses hydraulic pressure from the first fluid outlet 22 of the first fluid pump 16 (FIGS. 2 and 3) to provide the motive force for driving/turning the rotor 402. The rotor 402 defines a plurality of radial slots 406 having inner ends 408 and outer ends 409. Vanes 410 are mounted within the radial slots 406. The vanes 410 can slide radially within the radial slots 406 relative to the central axis of rotation 403 of the rotor 402 such that outer ends 411 of the vanes 410 remain in contact with the cam ring structure 404 as the rotor 402 rotates about the rotation axis 403.

The cam ring structure 404 includes a cam surface 412 that surrounds the rotor 402 and opposes an outer circumferential surface 413 of the rotor 402. The vane pump 401 defines two oppositely positioned pump chambers 414. The pump chambers 414 are defined between the cam surface 412 of the cam ring structure 404 and the outer circumferential surface 413 of the rotor 402. The cam surface 412 includes two oppositely disposed ascending portions 416 and two oppositely disposed descending portions 418. The ascending and descending portions 416, 418 of each of the pump chambers 414 are separated by a major dwell surface 420. Minor dwell surfaces 422 separate the two pump chambers 414 from one another. A cam profile for one of the chambers 414 is provided at FIG. 14.

Intake regions 417 of the pump chambers 414 coincide with the ascending portions 416 and output regions 419 of the pump chambers 414 coincide with the descending portions 418. The cam ring structure 404 includes intake passages 460 that are connected in fluid communication with the case drain port 30 of the first fluid pump 16 (FIGS. 2 and 3) by a fluid line 461 that extends from the case drain port 30 to an intake port 462 of the vane pump 401. The cam ring structure 404 further includes output passages 464 connected in fluid communication with the heat exchanger 122 of the cooling circuit 14, 14' (FIGS. 2 and 3) by a fluid line 465 that extends from the heat exchanger 122 of the cooling circuit to an output port 466 of the vane pump 401. The intake passages 460 provide fluid communication between the intake regions 417 of the pump chambers 414 and the intake port 462 of the vane pump 401. The output passages 464 provide fluid communication between the output regions 419 of the pump chambers 414 and the output port 466 of the vane pump 401.

The cam ring structure 404 defines a manifold including a first quadrant 430*a*, a second quadrant 430*b*, third quadrant 430*c* and a fourth quadrant 430*d*. The first and third quadrants 430*a*, 430*c* define a higher pressure passage structure 432 (e.g., a passage, passages or other defined volume) having portions that are in fluid communication with the inner ends 408 of the radial slots 406 and that radially align with the ascending portions 416 of the cam surface 412. The higher pressure passage structure 432 is also in fluid communication with a drive port 437 of the vane pump 401. The second and fourth quadrants 430*b*, 430*d* include a lower pressure passage structure 434 having portions that are in fluid communication with the inner ends 408 of the radial slots 406 and that radially align with the descending portions 418 of the cam surface 412. The higher pressure passage structure 432 is in fluid communication with the fluid outlet 22 of the first fluid pump 16 (e.g. via a flow line 435 that extends from the drive port 437 of the vane pump 401 to a flow divider in fluid line 27 of FIGS. 2 and 3). The lower pressure passage structure 434 is in fluid communication with the output regions 419 of the pump chambers 414. The pressure of the fluid provided from the first fluid outlet 22 of the first fluid pump 16 (FIGS. 2 and 3) is substantially higher than the pressure of the fluid in the output regions 419 of the motor/pump chambers. This difference in pressure provides the motive force utilized to rotate the rotor in a clockwise direction about the rotation axis 403.

In use of the vane pump 401, the inner ends 408 of the radial slots 406 are alternatingly brought into fluid communication with the higher pressure passage structure 432 and the lower pressure passage structure 434 as the rotor 402 rotates in the clockwise direction 405 about the rotation axis 403. The higher relative fluid pressure provided by the higher pressure passage structure 432 as compared to the lower pressure passage structure 434 causes the vanes 410 to be forced against the ascending portions 416 of the cam surface 412 at a higher force than the vanes 410 are forced against the descending portions 418 of the cam surface 412. The ascending portions 416 are angled relative to the vanes 410 such that when the outer ends 411 of the vanes 410 are driven against the ascending portions 416, a motive force (e.g., a clockwise torque) is applied to the rotor 402. The descending portions 418 are angled relative to the vanes 410 such that when the outer ends 411 are driven against the descending portions 418, a counterclockwise torque is applied to the rotor 402.

Because the vanes 410 are forced against the ascending portions 416 at a higher relative force than the vanes 410 are forced against the descending portions 418, a net clockwise torque is applied to the rotor 402 which causes clockwise rotation of the rotor 402. As the rotor 402 rotates in the clockwise direction 405, fluid from the case drain port 30 (FIGS. 2 and 3) is drawn into the pump 401 through the intake port 462 and flows through the intake passages 460 to the intake regions 417 of the pump chambers 414. The fluid from the case drain port 30 is then carried by the vanes 410 to the output regions 419 of the pump chambers 414 where the fluid is pressurized and forced through the output passages 464 to the output port 466. From the output port 466, the fluid flows though the line 465 to the heat exchanger 122. After being cooled at the heat exchanger 122, the fluid flows through filter 128 back to the reservoir 24 (FIGS. 2 and 3).

Figure 15:
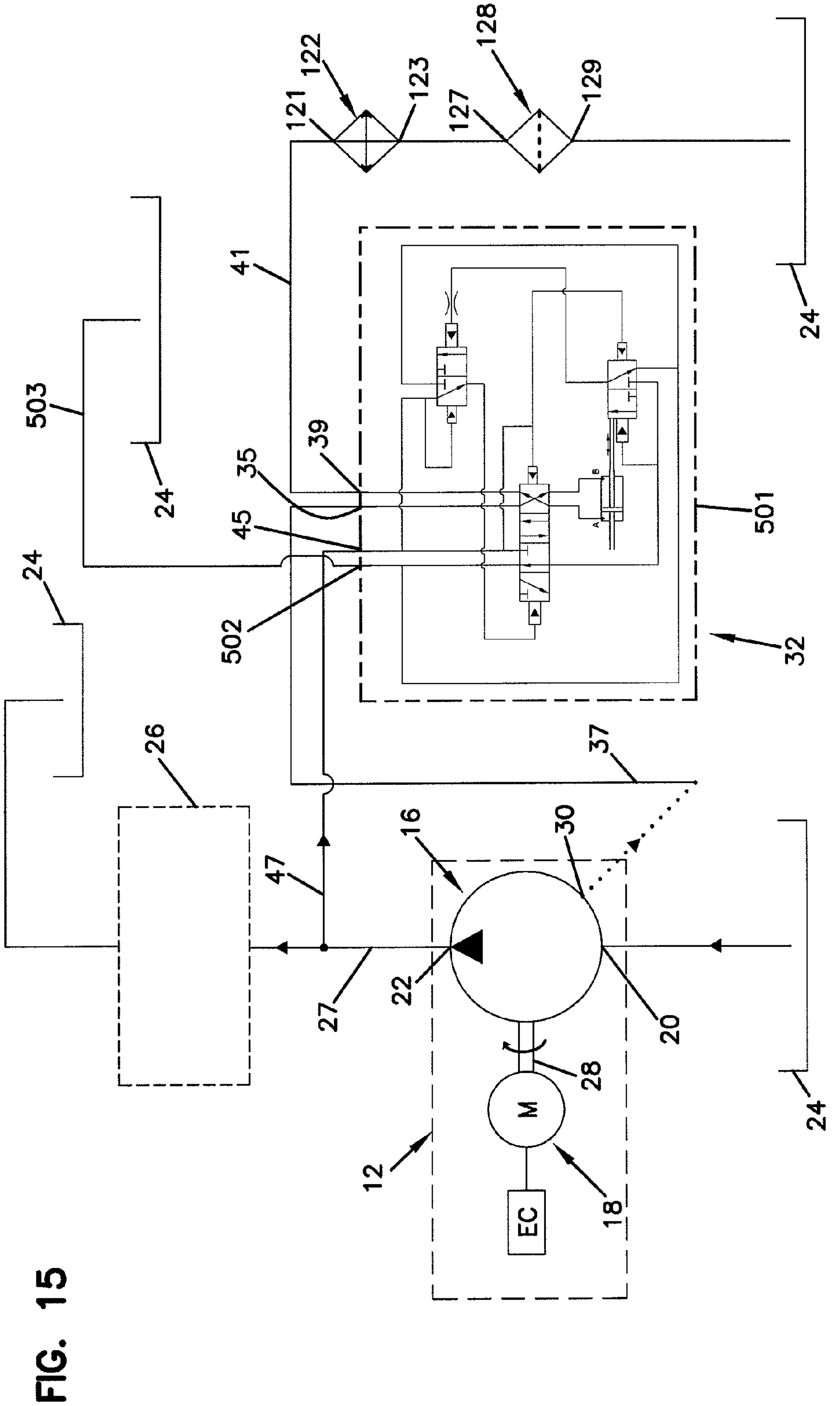
FIGS. 15-30 illustrate a fifth example implementation of a second fluid pump assembly.

Referring now to FIGS. 15-30, a fifth example implementation 500 of the second fluid pump assembly 32 suitable for use with the cooling circuit 14 of FIG. 2, the cooling circuit 14' of FIG. 3, or another cooling circuit will be described. As shown at FIG. 15, the fifth example assembly 500 includes a valve body 501 defining the intake port 35, the outlet port 39, the drive port 45, and a reservoir return port 502. The drive line 47 fluidly connects the drive port 45 of the second fluid pump assembly 500 to the main output flow line 27 of the first fluid pump 16. The case drain fluid line 37 fluidly connects the intake port 35 of the second fluid pump assembly 500 to the case drain port 30 of the first fluid pump 16.

In some implementations, the cooling circuit line 41 fluidly connects to the outlet port 39 of the fifth assembly 500. The cooling circuit line 41 transfers heat out of the system/circuit before returning flow back to the reservoir 24 of the fluid circuit. In other implementations, the cooling circuit line 41' can also be used to carry further heat away from the control electronics of the variable speed motor-pump unit 12 as shown at FIG. 3. A return line 503 fluidly connects the return port 502 of the fifth assembly 500 to the reservoir 24.

Figure 16:
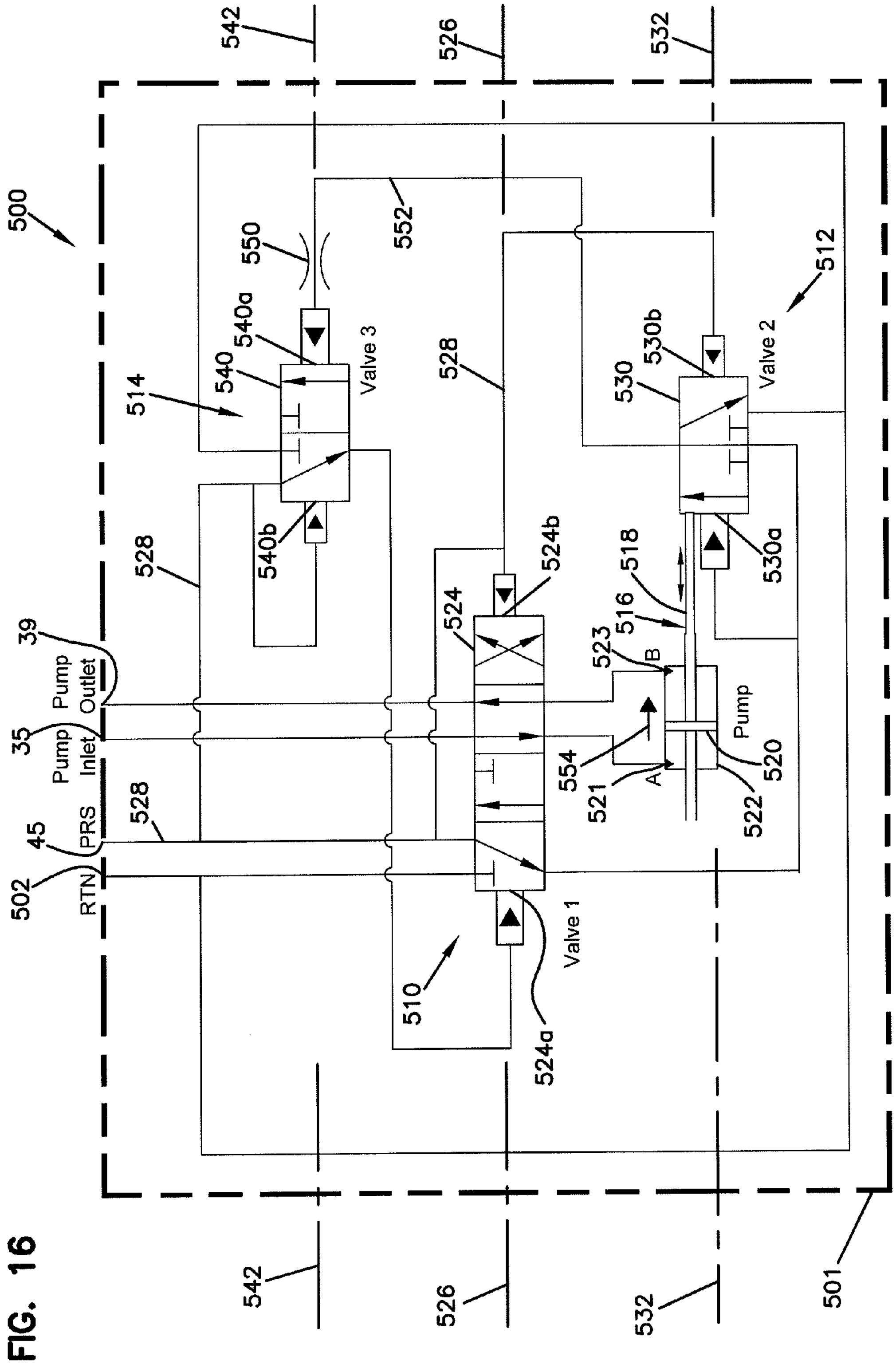

Referring to FIG. 16, the fifth assembly 500 includes a plurality of spool valves that are cycled through a sequence of positions (see FIGS. 16-21) to generate a pumping action that draws case drain fluid into the intake port 35 (i.e., pump inlet) and subsequently pumps the case drain fluid out the outlet port 39 (i.e., pump outlet). The spool valves include a first spool valve 510, a second spool valve 512 and a third spool valve 514. The second spool valve 512 is mechanically coupled to a piston 516 including a piston rod 518 and a piston head 520. Selective activation of the second spool valve 512 causes the piston head 520 to linearly reciprocate back and forth within a piston cylinder 522. The linear reciprocal movement of the piston head 520 within the piston cylinder 522 generates a pumping action that causes the case drain fluid to be drawn into the fifth assembly 500 through the intake port 35 and also causes the case drain fluid to be pumped out of the second fluid pump assembly through the outlet port 39 (see FIG. 15). The piston cylinder 522 defines fluid ports 521, 523 positioned on opposite sides of piston head 520. In a preferred embodiment, the fluid port 521 is positioned adjacent one end of the piston cylinder 522 and the fluid port 523 is positioned adjacent at an opposite end of the piston cylinder 522.

The first spool valve 510, the second spool valve 512, and the third spool valve 514 each preferably include an unbalanced spool. The spools are unbalanced by providing piloting surfaces having different sized pilot areas at opposite ends of the spools (e.g., major and minor pilot areas). The valve arrangement incorporates positive sequencing to control the reciprocating action of the piston 516 while eliminating the need for inertial loading to maintain operation of the spool valves. For example, each spool position is preferably attained through an axial force originating from hydraulic pressure accessed from the first fluid pump 16 (FIG. 15) and does not rely on any inertial loading to attain a particular position. The depicted valves include spools that reciprocate between first and second positions. As used herein, the "first"

position is the axial position of the spool when the major pilot area of the spool controls (i.e., when the major pilot area is exposed to drive pressure) and the "second" position of the spool is the axial position of the spool when the minor pilot area of the spool controls (i.e., when only the minor pilot area is exposed to drive pressure).

Figure 19:
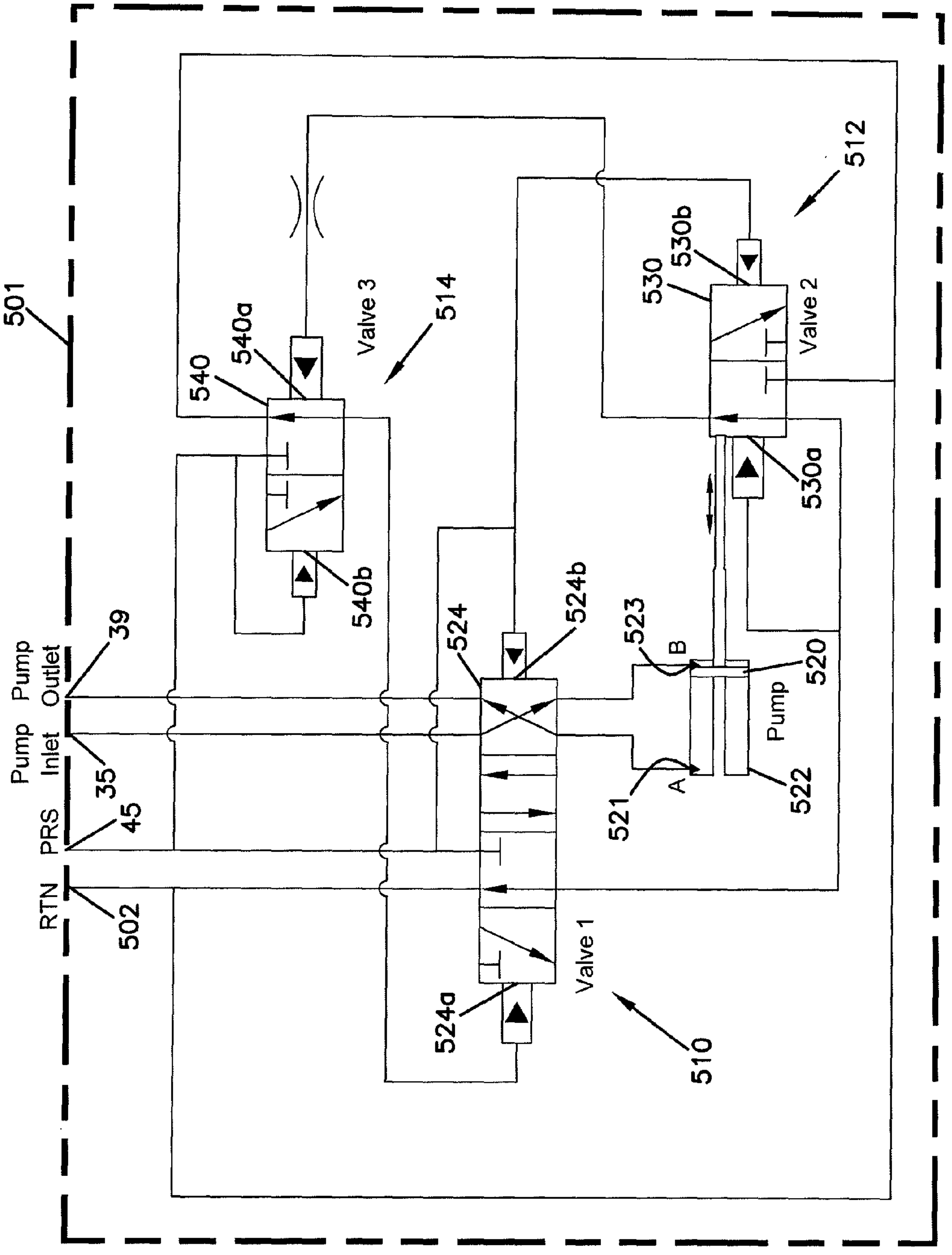
Figure 20:
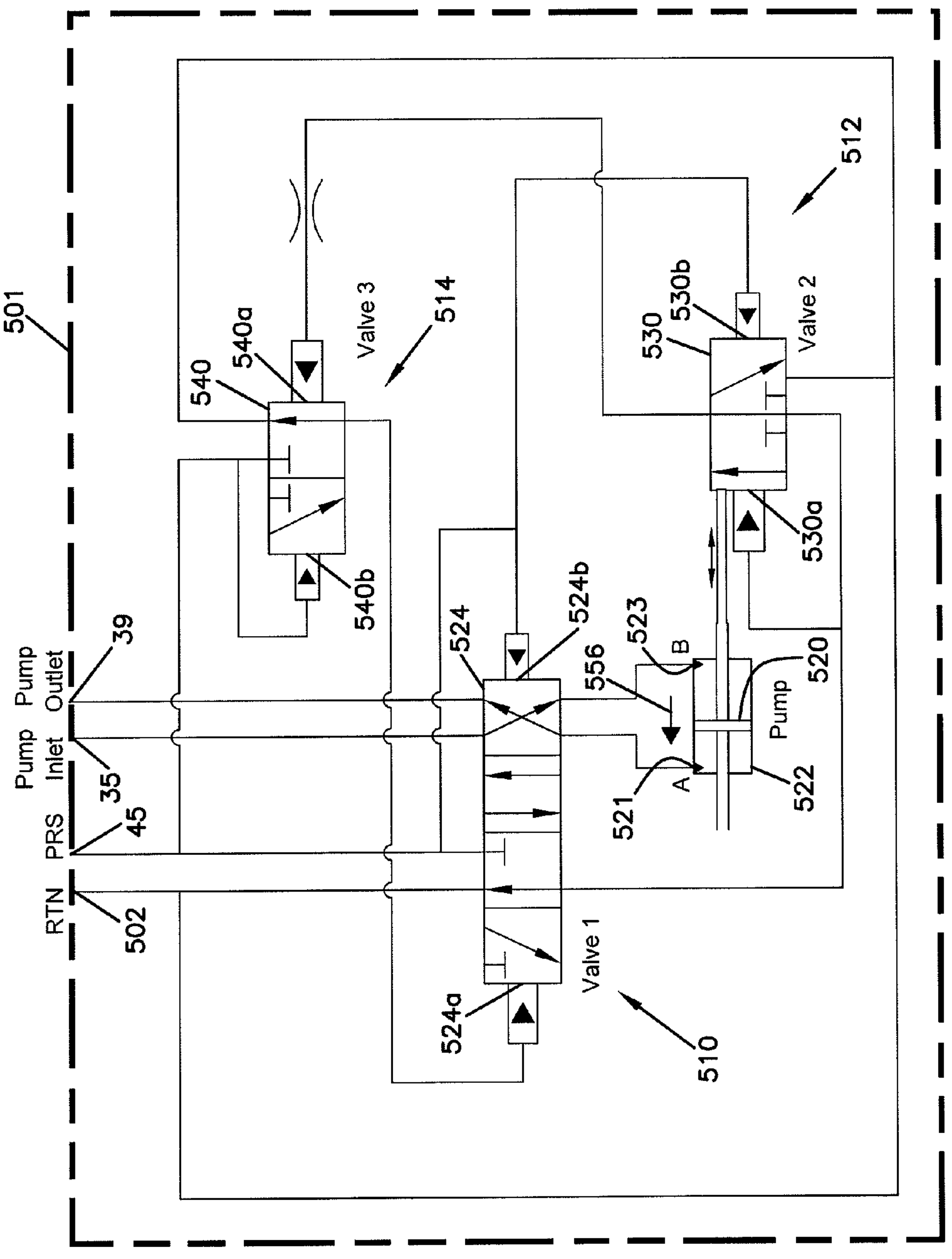

The first spool valve 510 includes a first spool 524 that is reciprocally removable along a first slide axis 526 between a first position (see FIG. 16) and a second position (see FIG. 19). The first spool 524 includes a major pilot surface 524*a* and a minor pilot surface 524*b*. The major and minor pilot surfaces 524*a*, 524*b* are positioned at opposite ends of the first spool 524 and face in opposite axial directions. The major pilot surface 524*a* has a larger pilot area as compared to the minor pilot surface 524*b* thereby providing the first spool 524 with an unbalanced configuration. The pilot area is the component of the total surface area exposed to pilot pressure that is transverse relative to the first slide axis 526.

The valve body 501 defines a minor pilot passage 528 that places the minor pilot surface 524*b* in constant fluid communication with the drive line 47 through the drive port 45. In contrast, the major pilot surface 524*a* is alternatingly placed in fluid communication with the drive port 45 and the return port 502. When the major pilot surface 524*a* is in fluid communication with the drive port 45, a larger piloting force is provided at the major pilot surface 524*a* as compared to the minor pilot surface 524*b* thereby causing the first spool 524 to move to the first position of FIG. 16. In contrast, when the major pilot surface 524*a* is in fluid communication with the return port 502, the pilot force provided at the minor pilot surface 524*b* is greater than the pilot force provided at the major pilot surface 524*a* thereby causing the spool 524 to move to the second position of FIG. 19.

The second spool valve 512 includes a second spool 530 that can reciprocate along a second slide axis 532. Movement of the second spool 530 along the second slide axis 532 causes simultaneous movement of the piston head 520 within the piston cylinder 522. The second spool 530 includes a major pilot surface 530*a* and a minor pilot surface 530*b*. The major and minor pilot surfaces 530*a*, 530*b* are positioned at opposite ends of the second spool 530 and face in opposite axial directions. The major pilot surface 530*a* has a larger pilot area as compared to the minor pilot surface 530*b*.

Figure 21:
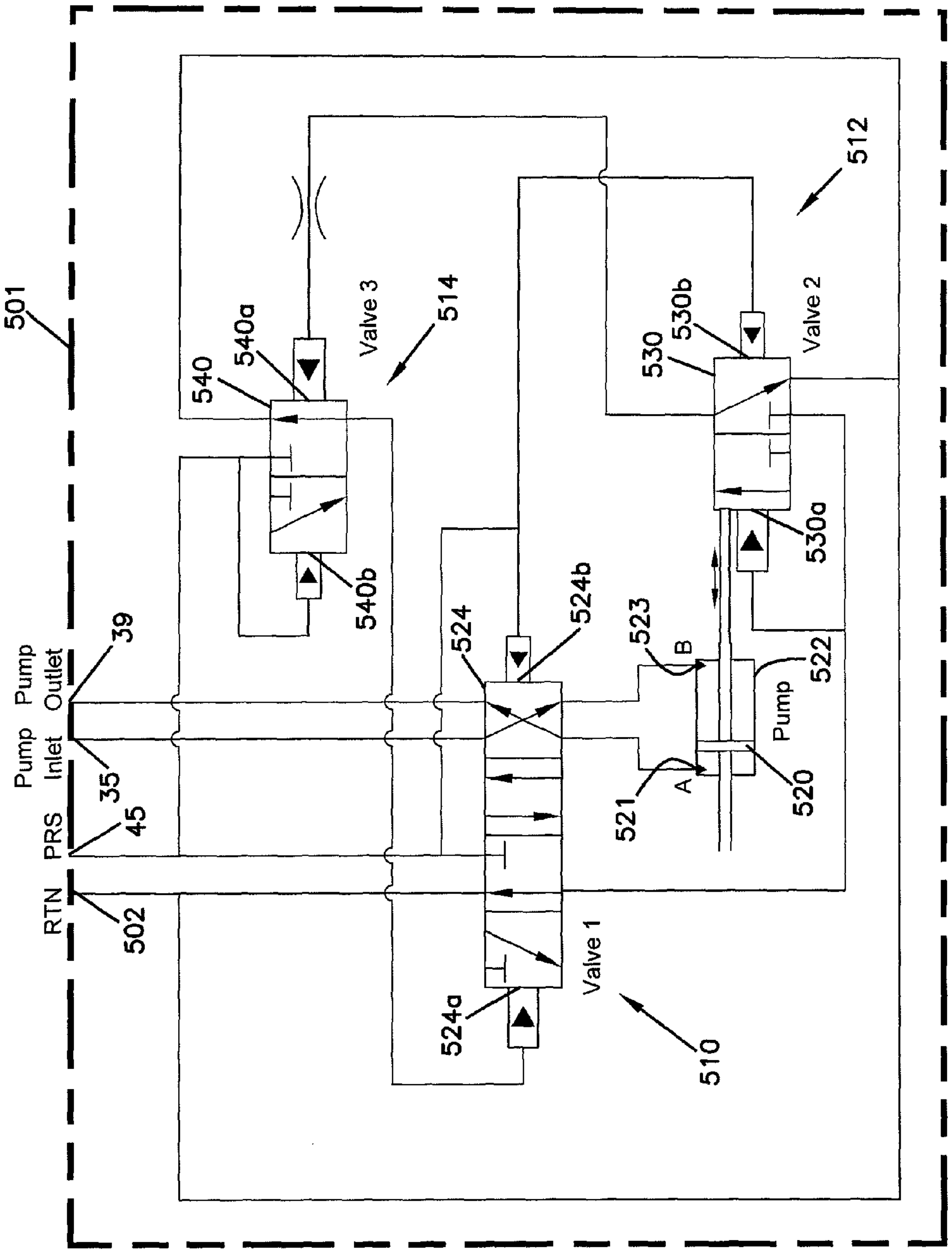

The second spool 530 is movable along the second slide axis 532 between a first position (see FIG. 17) and a second position (FIG. 21). The piston head 520 is positioned adjacent one end of the piston cylinder 522 when the second spool 530 is in the first position of FIG. 17 and the piston head 520 is positioned adjacent the opposite end of the piston cylinder 522 when the second spool 530 is in the second position of FIG. 21. The minor pilot passage 528 provides constant fluid communication between the drive port 45 and the minor pilot surface 530*b*. In contrast, the major pilot surface 530*a* is alternatingly placed in fluid communication with the drive port 45 and the return port 502. When the major pilot surface 530*a* is in fluid communication with the drive port 45, the major pilot surface 530*a* controls and the second spool 530 moves to the first position of FIG. 17. In contrast, when the major pilot surface 530*a* is in fluid communication with the return port 502, the minor pilot surface 530*b* controls and the second spool 530 slides to the second position of FIG. 21.

It will be appreciated that the diameter of the piston head 520 is designed in coordination with pilot areas of the major and minor pilot surfaces 530*a*, 530*b*. For example, by selecting a piston head 520 having larger axial end face areas as compared to the pilot areas of the major and minor pilot surfaces 530*a*, 530*b*, the fifth assembly 500 can be designed to output flow through the outlet port 39 having a higher flow rate and a lower pressure as compared to the flow provided to the fifth pump assembly 500 through the drive port 45 (see FIGS. 2 and 3).

The third spool valve 514 includes a third spool 540 that reciprocates back and forth along a third slide axis 542. The third spool 540 is movable along the third slide axis 542 between a first position (see FIG. 18) and second position (see FIG. 16). The third spool 540 includes a major pilot surface 540*a* and a minor pilot surface 540*b*. The major and minor pilot surfaces 540*a*, 540*b* are positioned at opposite ends of the third spool 540 and face in opposite axial directions. The major pilot surface 530*a* has a larger pilot area as compared to the minor pilot surface 540*b*. Drive pressure from the drive port 45 is constantly provided to the minor pilot surface 540*b* through the minor pilot passage 528. In contrast, the major pilot surface 540*a* is alternatingly exposed to drive pressure and return pressure. When the major pilot surface 540*a* is placed in fluid communication with the drive port 45 and thereby exposed to drive pressure, the major pilot surface 540*a* controls and third spool 540 slides to the first position of FIG. 18. In contrast, when the major pilot surface 540*a* is placed in fluid communication with the return port 502 and thereby exposed to return pressure, the minor pilot surface 540*b* controls and the third spool 540 moves to the second position of FIG. 16.

The first spool valve 510 controls whether the major pilot surface 530*a* of the second spool 530 is placed in fluid communication with the drive port 45 or the return port 502. The first spool valve 510 also controls the fluid connections between the first and second fluid ports 521, 523 of the piston cylinder 522 and the intake and outlet ports 35, 39 of the valve body 501. For example, when the first spool 524 of the first spool valve 510 is in the first position of FIG. 16, the major pilot surface 530*a* of the second spool 530 is placed in fluid communication with the drive port 45, the fluid port 523 of the piston cylinder 522 is placed in fluid communication with the outlet port 39, and the fluid port 521 of the piston cylinder 522 is placed in fluid communication with the intake port 35. In contrast, when the first spool 524 of the first spool valve 510 is in the second position of FIG. 19, the major pilot surface 530*a* of the second spool 530 is placed in fluid communication with the return port 502, the fluid port 523 of the piston cylinder 522 is placed in fluid communication with the intake port 35, and the fluid port 521 of the piston cylinder 522 is placed in fluid communication with the outlet port 39.

The second spool 530 is used to reciprocate the piston 516 within the piston cylinder 522. When the second spool 530 is in the first position of FIG. 17, the piston head 520 is positioned adjacent to the fluid port 523 of the piston cylinder 522. When the second spool 530 is in the second position of FIG. 21, the piston head 520 is adjacent the port 521 of the piston cylinder 522.

Figure 17:
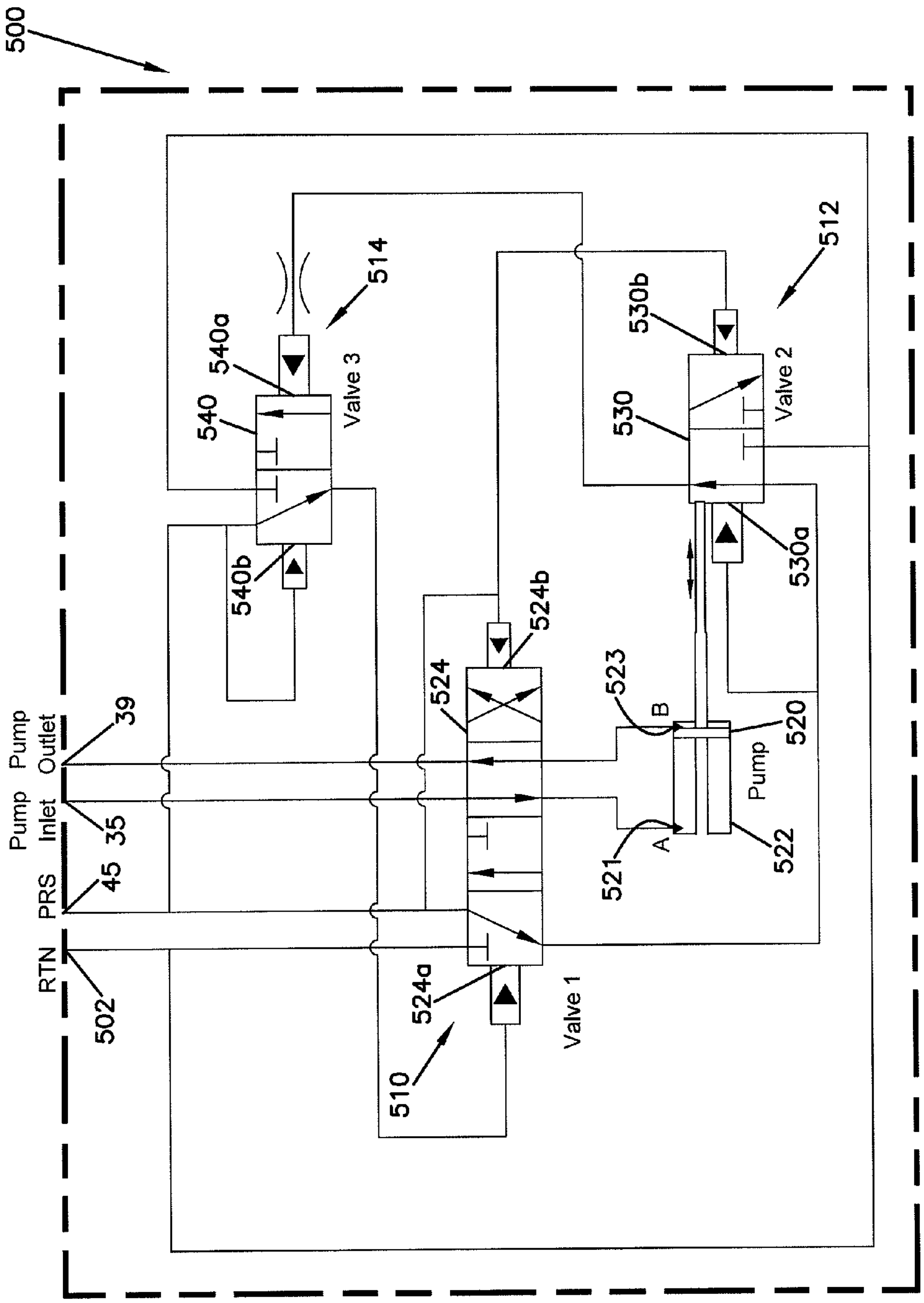

The second spool 530 also controls the pressure provided to the major pilot surface 540*a* of the third spool 540. For example, when the second spool 530 is in the first position of FIG. 17, the major pilot surface 540*a* of the third spool 540 is placed in fluid communication with the drive port 45 via a flow passage that extends through both the second spool valve 512 and the first spool valve 510. More specifically, the major pilot surface 540*a* of the third spool 540 is placed in fluid communication with the drive port 45 when both the second spool 530 and the first spool 524 are in their respective first positions as shown at FIG. 17. When the first and second spools 524, 530 are in the second positions as shown at FIG. 21, the major pilot surface 540*a* of the third spool 540 is placed in fluid communication with the return port 502. A flow restrictor 550 is provided along a flow line 552 that extends between the second and third spool valves 512, 514. The flow restrictor 550 restricts flow so as to control/slow the speed of the third spool valve 514 to give the second spool 530 time to move between the first and second positions before the third spool 540 moves between the first and second positions in a given set of valve position sequences.

The third spool valve 514 functions to control the pressure provided to the major pilot surface 524*a* of the first spool valve 510. For example, when the third spool 540 is in the first position of FIG. 18, the major pilot surface 524*a* of the first spool 524 is placed in fluid communication with the return port 502. In contrast, when the third spool 540 is in the second position of FIG. 16, the major pilot surface 524*a* of the first spool 524 is placed in fluid communication with the drive port 45.

FIGS. 16-23 show a valving sequence for actuating one stroke cycle of the piston 516 within the piston cylinder 522. Referring to FIG. 16, the piston head 520 is shown in the process of being driven in a first direction 554 toward the fluid port 523 of the piston cylinder 522 and away from the fluid port 521. The first spool 524 is shown in the first position such that the major pilot surface 530*a* of the second spool 530 is in fluid communication with the drive port 45. This causes the second spool 530 to be driven in the first direction 554 toward the first position of FIG. 17. Since the first spool 524 is in the first position, the port 523 of the piston cylinder 522 is in fluid communication with the outlet port 39 and the port 521 of the piston cylinder 522 is in fluid communication with the intake port 35. Movement of the piston head 520 in the first direction 554 within the piston cylinder 522 causes case drain fluid to be drawn into the piston cylinder 522 through the port 521 and also causes case drain fluid to be expelled from the piston cylinder 522 through the second fluid port 523. In this way, case drain fluid from the case drain fluid line 37 is pumped through the fifth assembly 500 to the cooling line 41. Referring still to FIG. 16, the third spool 540 is in its second position in which the major pilot surface 524*a* of the first spool valve 510 is in fluid communication with the drive port 45.

Figure 18:
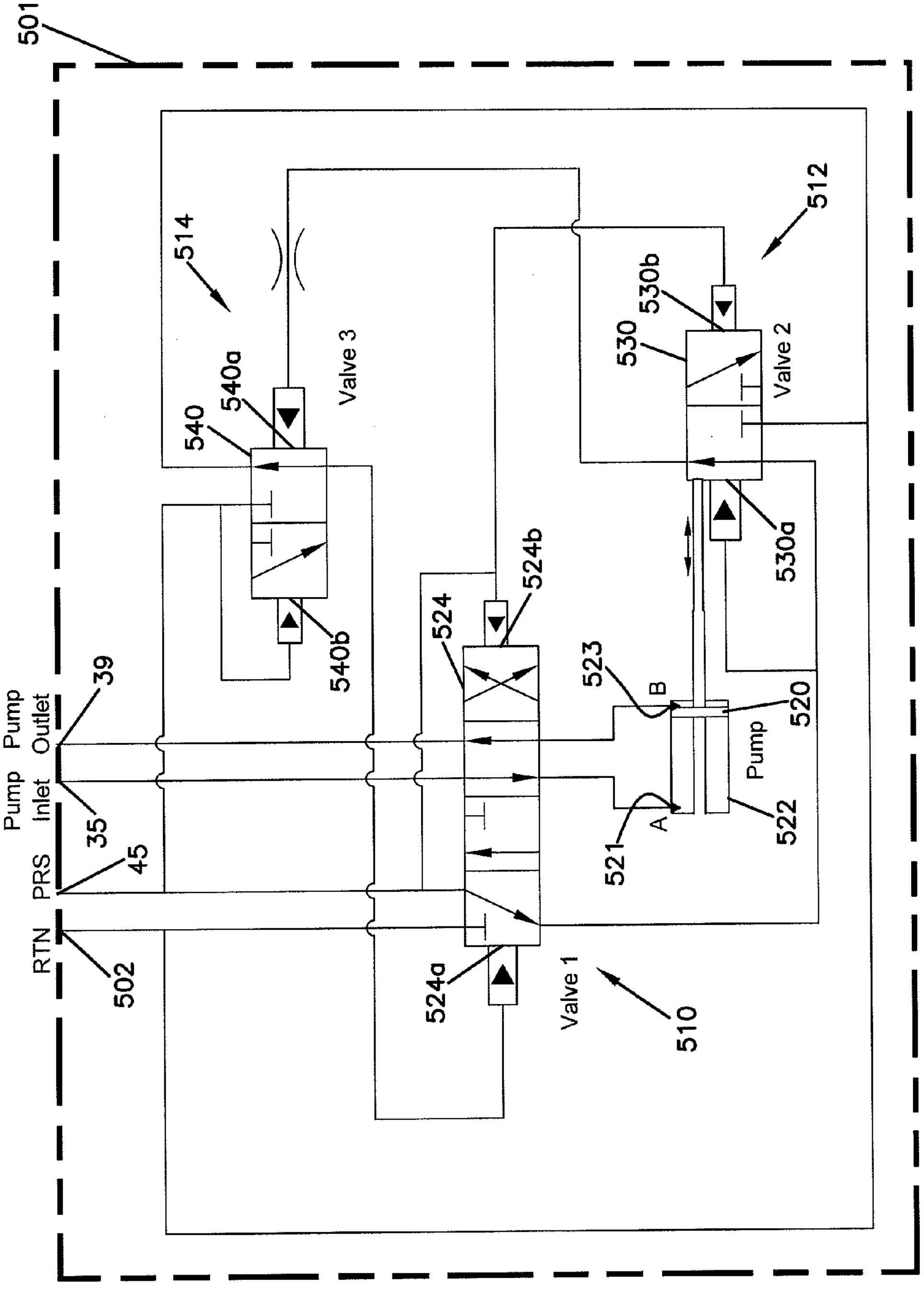

FIG. 17 shows the fifth example pump assembly 500 once the second spool 530 has reached its first position and the piston head 520 is adjacent the fluid port 523 of the piston cylinder 522. Once the second spool 530 reaches its first position, the major pilot surface 540*a* of the third spool 540 is placed in fluid communication with the drive port 45 thereby causing a drive pressure to be applied to the major pilot surface 540*a* of the third spool 540. The application of drive pressure to the major pilot surface 540*a* of the third spool 540 causes the third spool 540 to move to its first position as shown at FIG. 18. When the third spool 540 reaches the first position, the major pilot surface 524*a* of the first spool 524 is placed in fluid communication with the return port 502 thereby allowing drive pressure applied against the minor pilot surface 524*b* to move the first spool 524 to the second position as shown at FIG. 19. With the first spool 524 in the second position, the major pilot surface 530*a* of the second spool 530 is placed in fluid communication with the return port 502 thereby allowing drive pressure applied against the minor pilot surface 530*b* to drive the second spool 530 and the piston 516 in a second direction 556 opposite from the first direction 554 (see FIG. 20).

As the piston 516 moves in the second direction 556, the piston head 520 moves away from the fluid port 523 and towards the fluid port 521. This movement causes case drain fluid to be drawn into the piston cylinder 522 through the fluid port 523 and to be expelled from the piston cylinder 522 through the fluid port 521. With the first spool 524 in the second position, the port 523 is in fluid communication with the intake port 35 and the port 521 is in fluid communication with the outlet port 39. The piston 516 and the second spool 530 continue to move in the second direction 556 until the second spool 530 reaches the second position as shown at FIG. 21. When the second spool 530 reaches the second position of FIG. 21, the major pilot surface 540*a* of the third spool 540 is placed in fluid communication with the return port 502 allowing drive pressure applied to the minor pilot surface 540*b* to move the third spool 540 to the second position as shown at FIG. 22.

Figure 22:
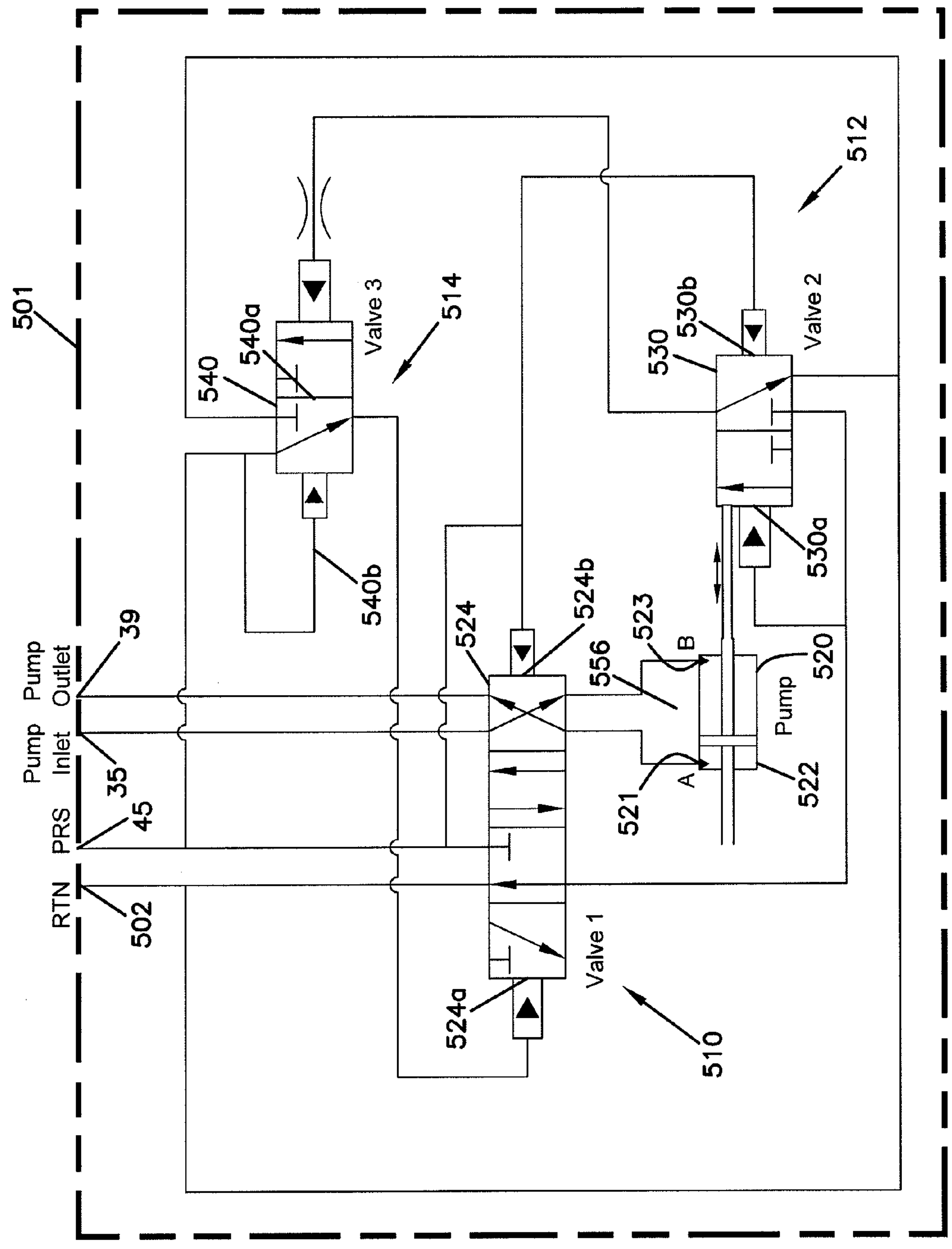
Figure 23:
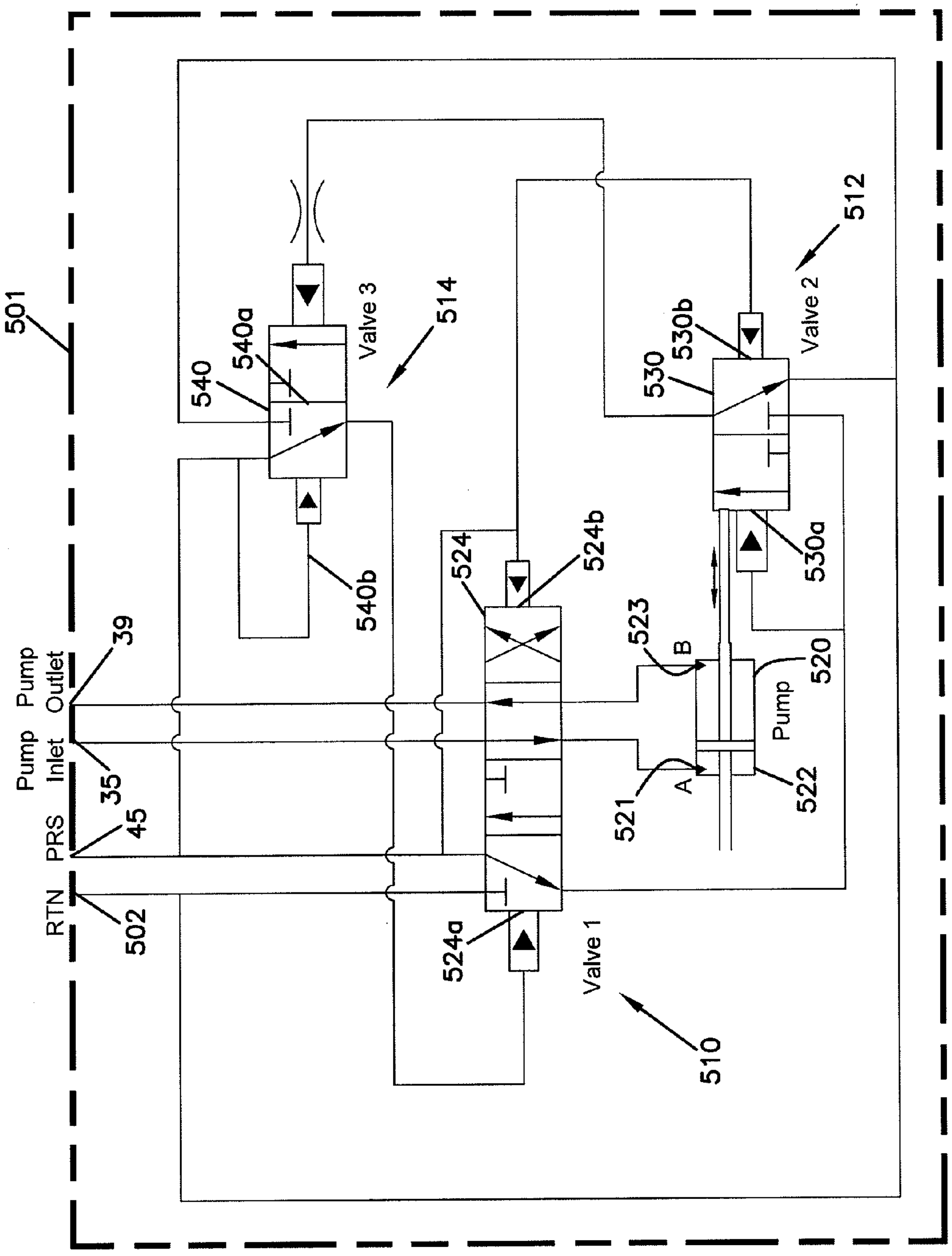

With the third spool 540 in the second position as shown at FIG. 22, the major pilot surface 524*a* of the first spool 524 is placed in fluid communication with the drive port 45 thereby causing the first spool 524 to slide back to the first position as shown at FIG. 23. Once the first spool 524 is back in the first position, the fluid port 523 of the piston cylinder 522 is in fluid communication with the outlet port 39 and the fluid port 521 of the piston cylinder 522 is in fluid communication with the intake port 35. Also, the major pilot surface 530*a* of the second spool 530 is placed in fluid communication with the drive port 45, thereby causing the second spool 530 and the piston 516 to be driven in the first direction 554 as shown at FIG. 16. Thereafter, the sequence is continuously repeated to provide continuous reciprocation of the piston 516 within the piston cylinder 522 so that the fifth example assembly 500 continuously intakes case drain fluid from the case drain fluid line 37 and pumps the case drain fluid out into the cooling line 41 (FIG. 15).

FIGS. 24-30 are cross-sectional view of an example valve configuration suitable for providing the functionality schematically shown at FIGS. 16-23. The valve configuration includes the valve body 501. The valve body 501 defines a first spool bore 590 and a second spool bore 592. The first and third spools 524, 540 are both mounted to slide within the first spool bore 590 along a common axis. The second spool 530 is mounted to slide within the second spool bore 592. The valve body 501 defines a plurality of fluid flow lines that extend to various bore ports 595 in fluid communication with the fluid spool bores 590, 592. The spools 520, 530, 540 define valve passages 594 located between lands 596. The relative positioning of the bore ports 595, the lands 596 and the valve passages 594 combined with the ability of each of the spools 524, 530, and 540 to independently move between first and second positions within their respective spool bores 590, 592 allows the valve configuration to provide the same functionality schematically depicted at FIGS. 16-23.

Figure 24:
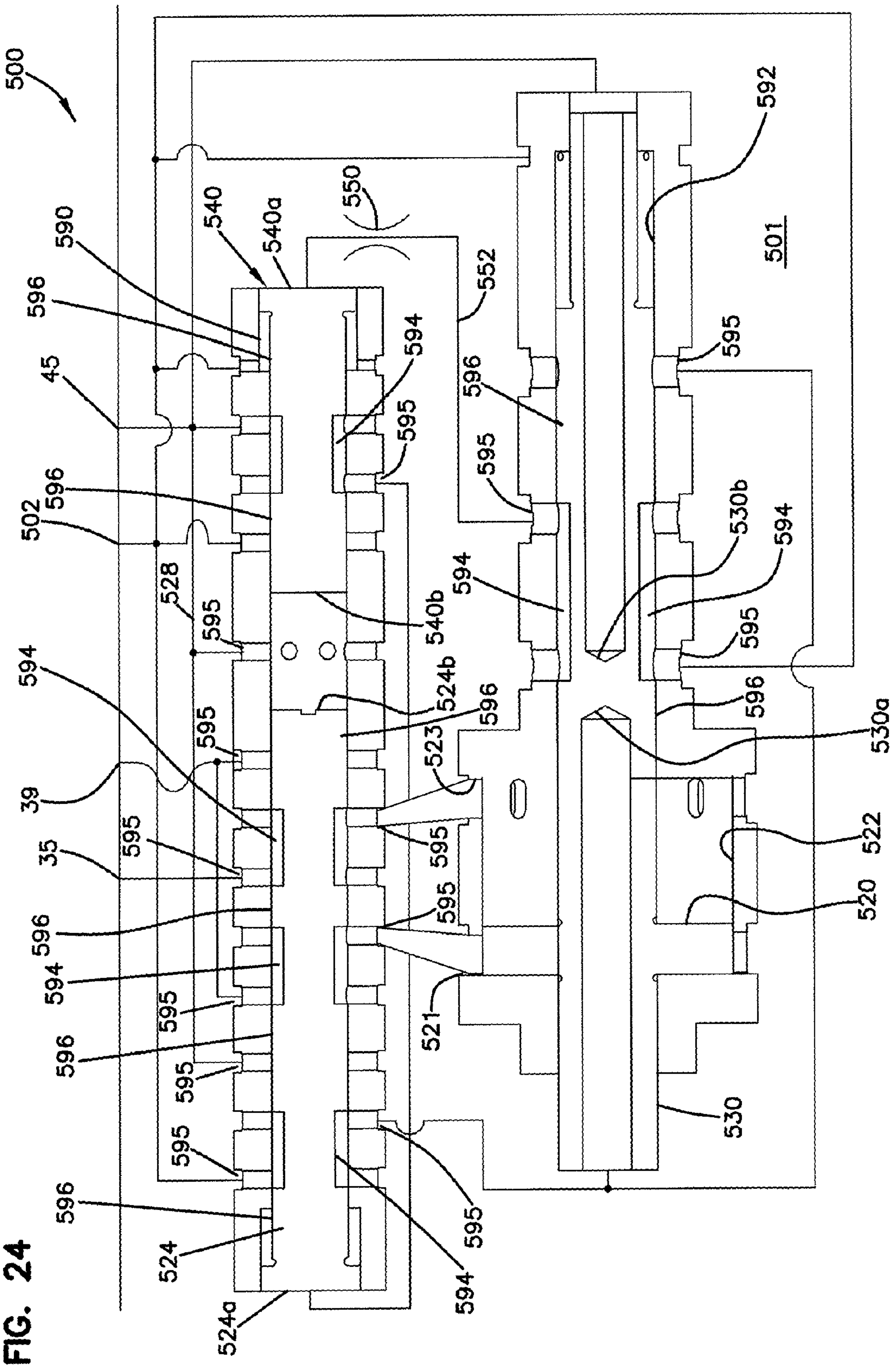
Figure 25:
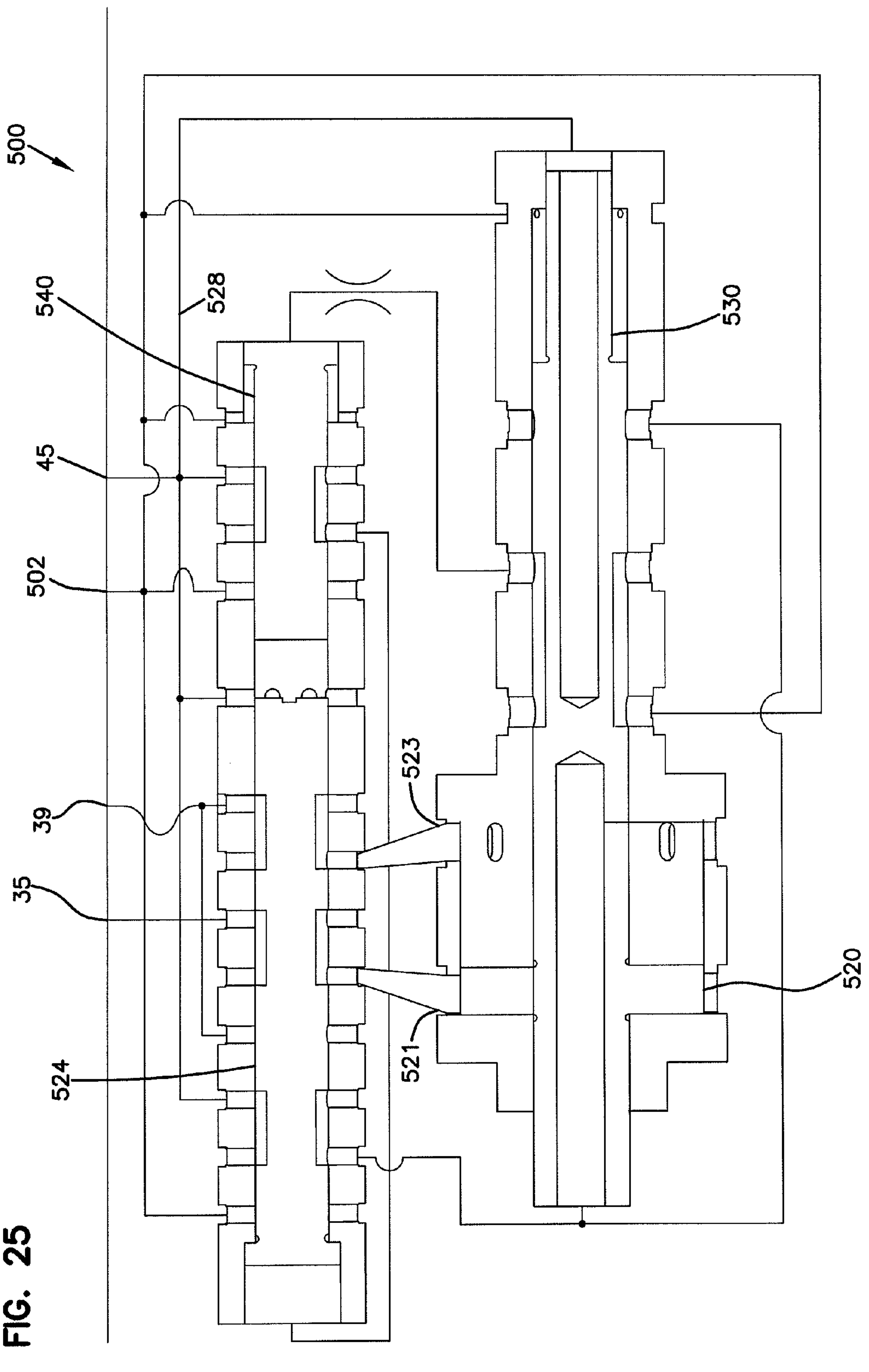
Figure 26:
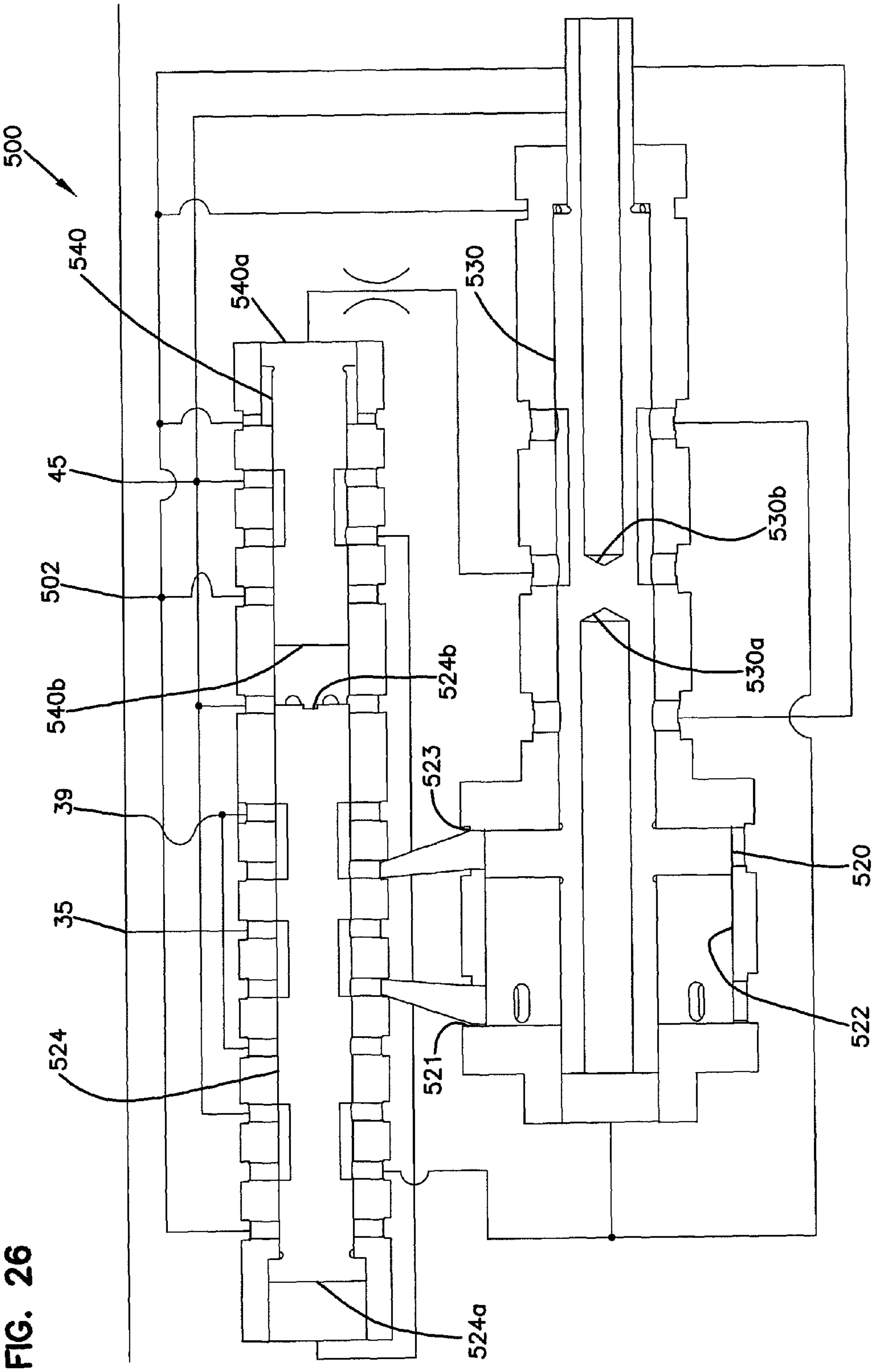
Figure 27:
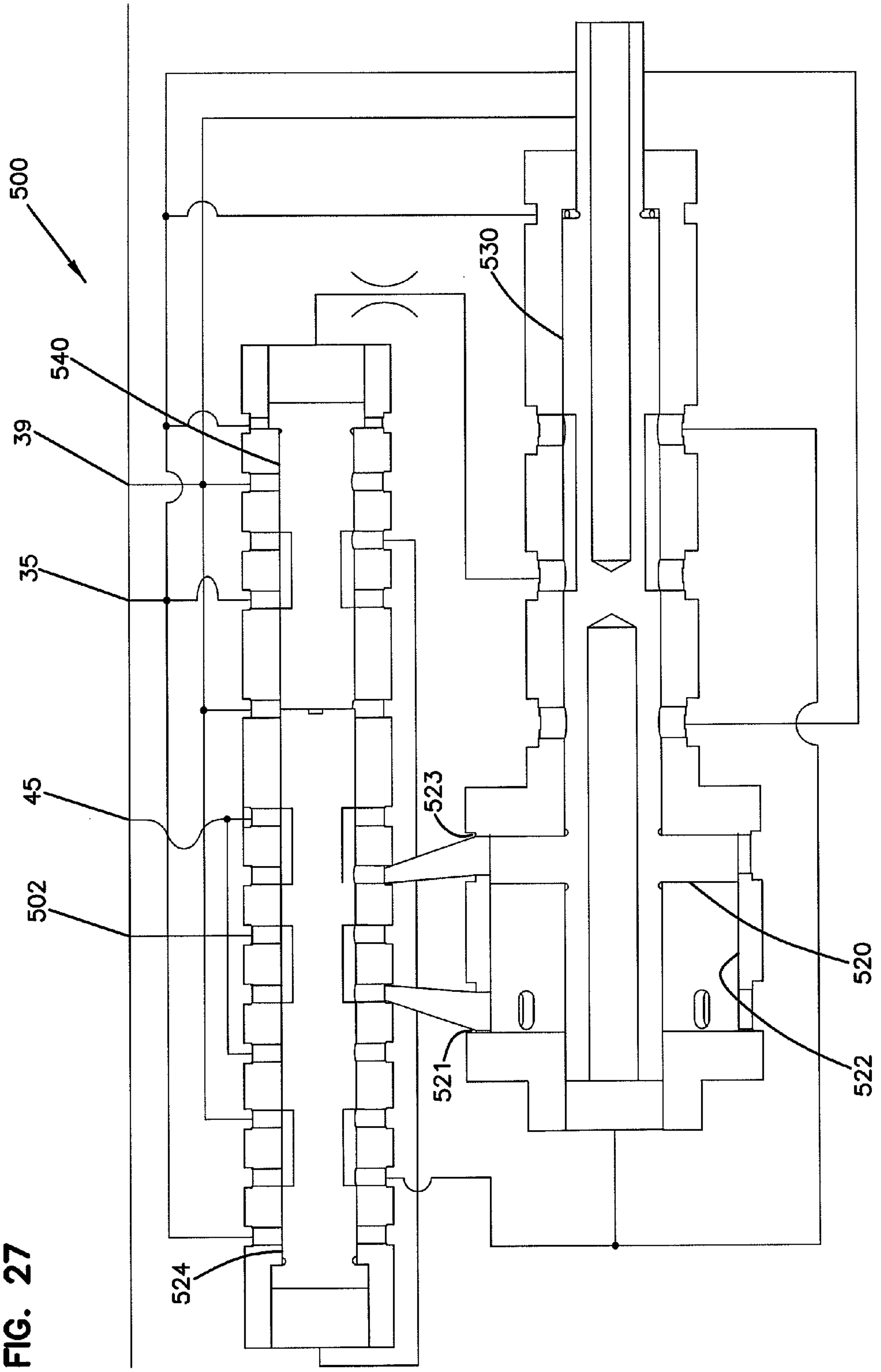
Figure 28:
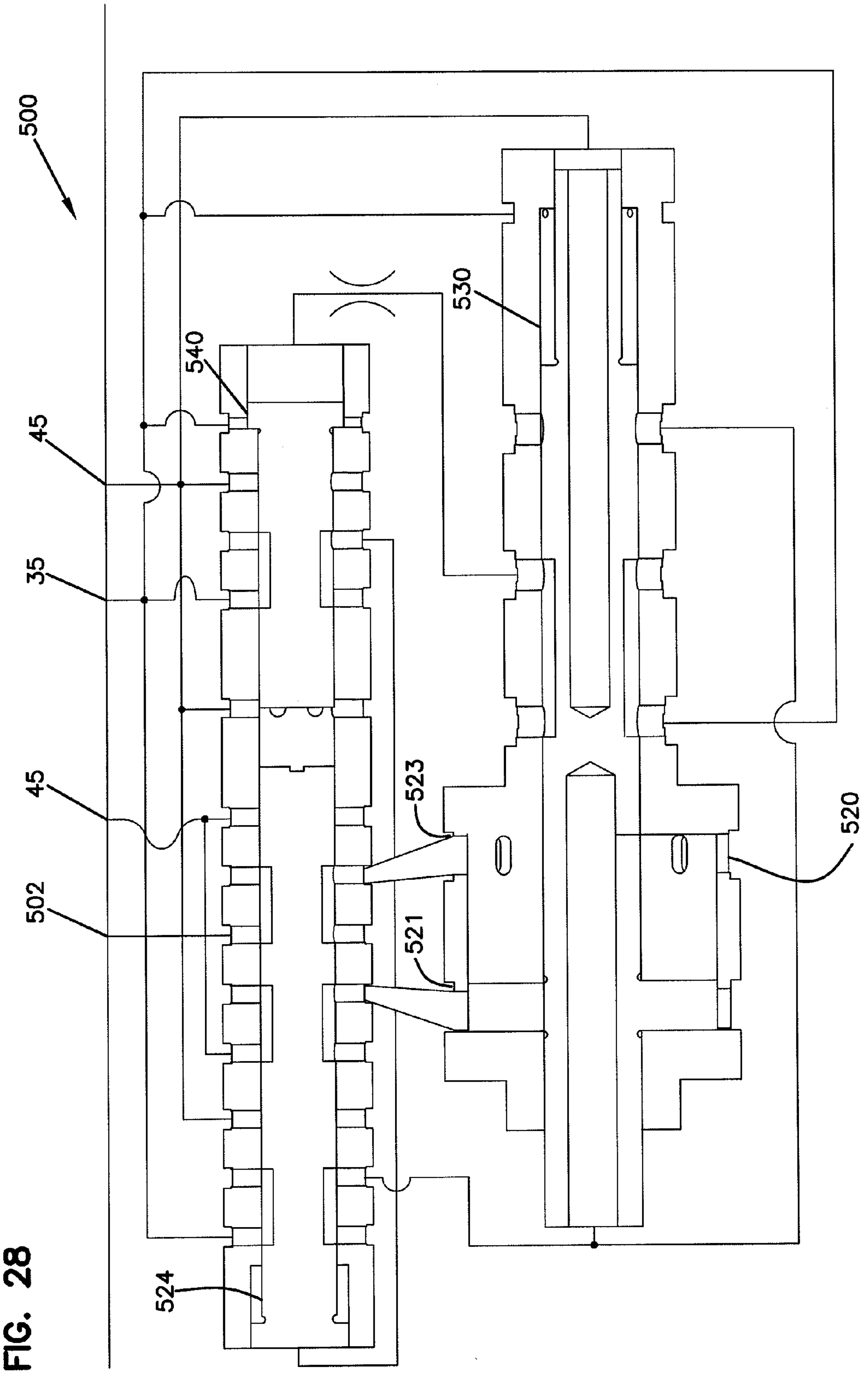
Figure 29:
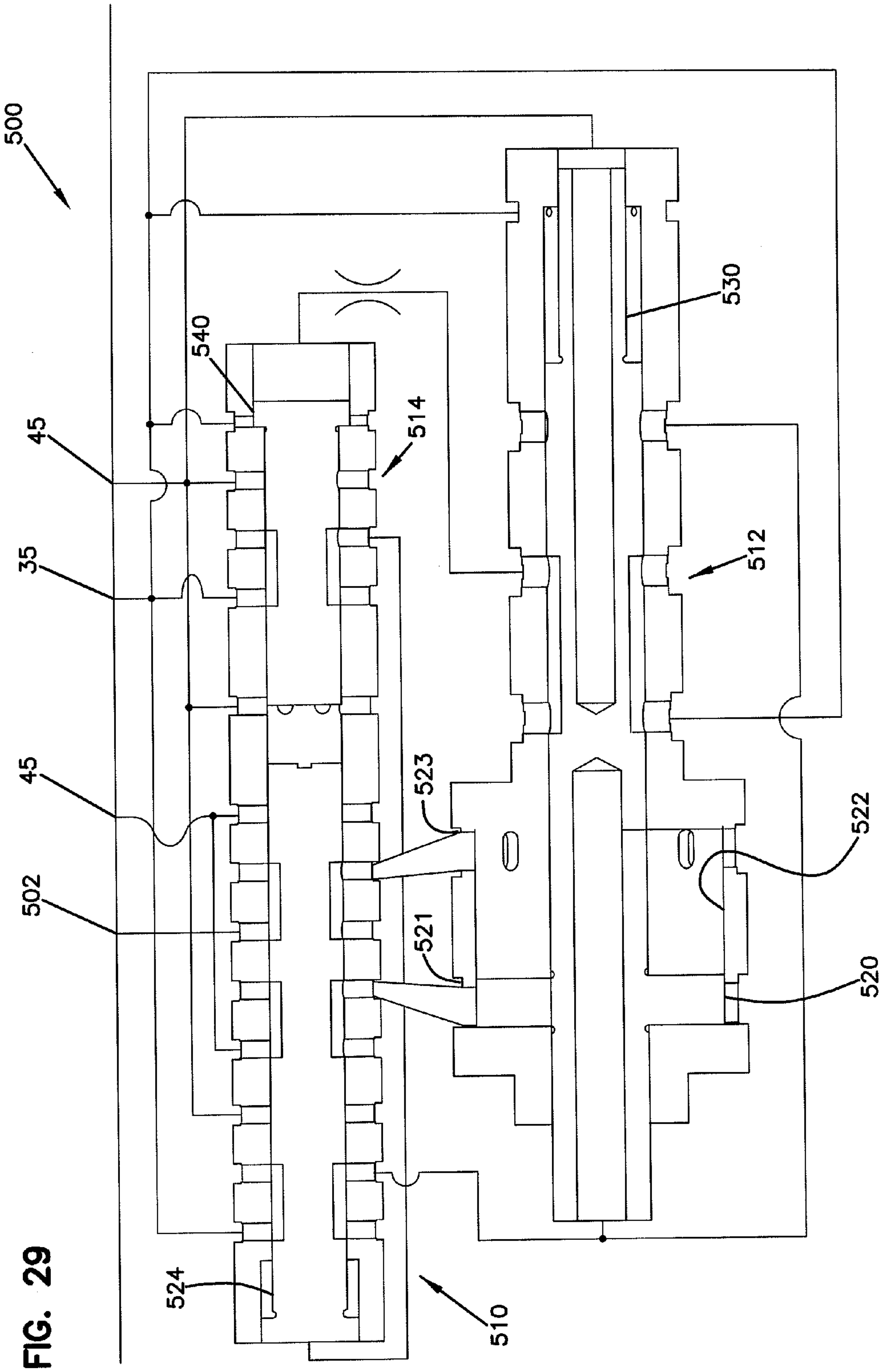
Figure 30:
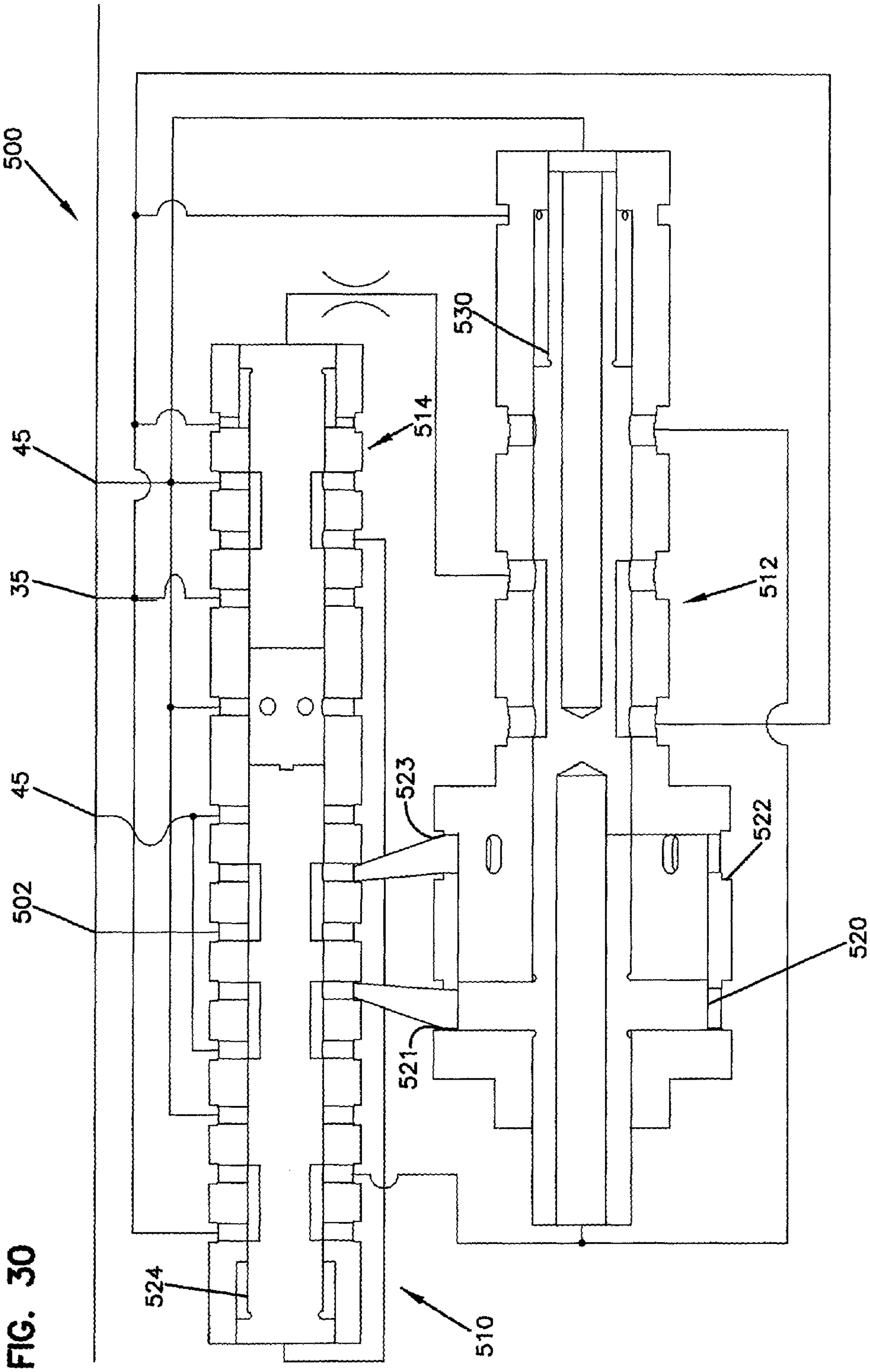

FIG. 24 shows the spools 524, 530 and 540 in the valve positions of FIG. 22. FIG. 25 shows the spools 524, 530 and 540 in the valve positions of FIG. 23. FIG. 26 shows the spools 524, 530 and 540 in the valve positions of FIG. 17. FIG. 27 shows the spools 524, 530 and 540 in the valve positions of FIG. 18. FIG. 28 shows the spools 524, 530 and 540 in the valve positions of FIG. 19. FIG. 29 shows the spools 524, 530 and 540 in the valve positions of FIG. 21. FIG. 30 shows the spools 524, 530 and 540 back in the valve positions of FIG. 22.

Figure 31:
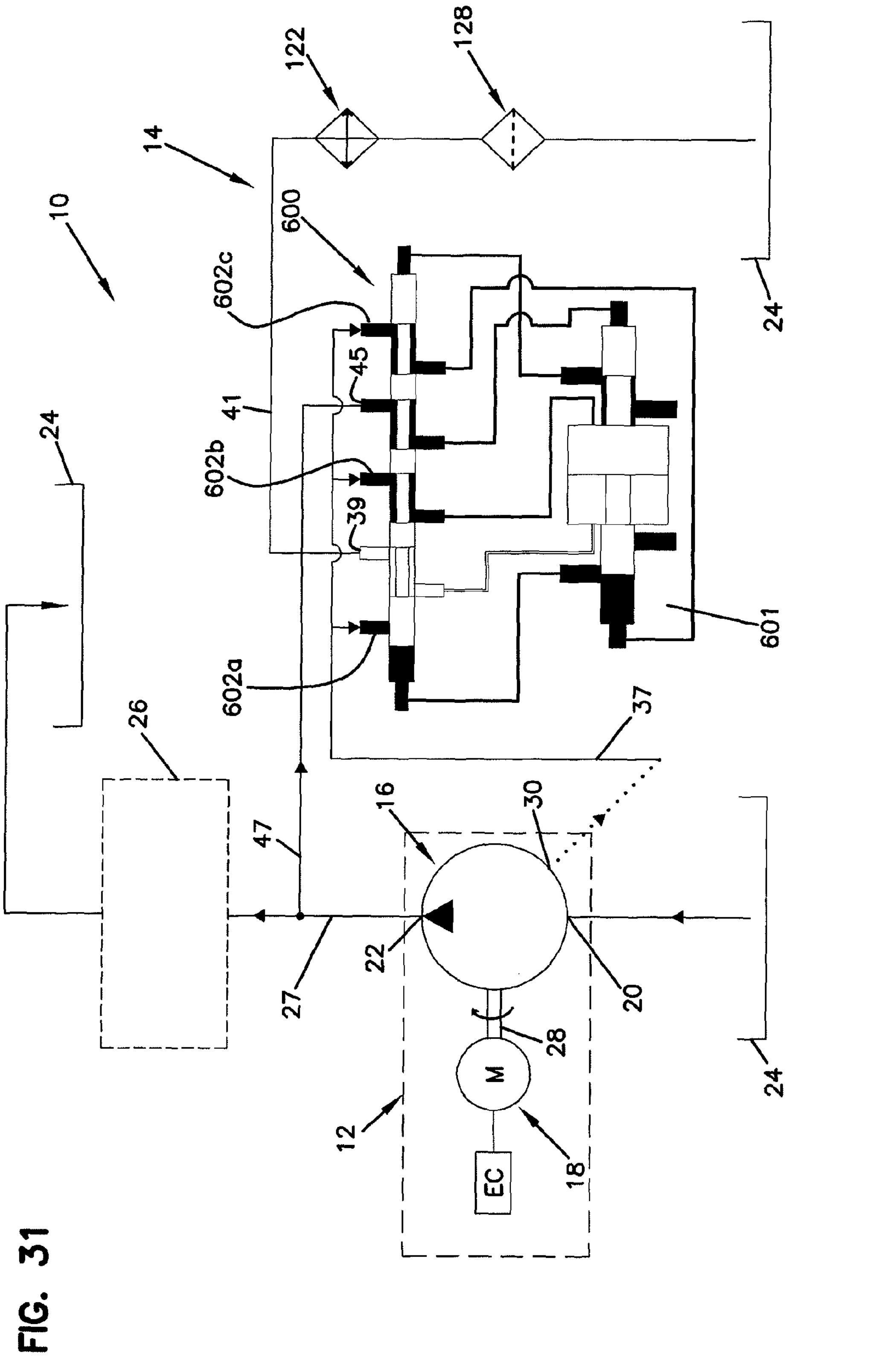
FIGS. 31-37 illustrate a sixth example implementation of a second fluid pump assembly.

Referring now to FIGS. 31-37, a sixth example implementation 600 of the second fluid pump assembly 32 suitable for use with the cooling circuit 14 of FIG. 2, the cooling circuit 14' of FIG. 3, or another cooling circuit will be described. As shown at FIG. 31, the fluid pump assembly 600 includes a valve body 601 defining the outlet port 39 and the drive port 45. The valve body 601 also defines a first inlet pressure port 602*a*, a second inlet pressure port 602*b*, and a third inlet pressure port 602*c*. The drive line 47 fluidly connects the drive port 45 of the sixth assembly 600 to the main output flow line 27 of the first fluid pump 16. The case drain fluid line 37 fluidly connects the case drain port 30 of the first fluid pump to the first, second, and third inlet pressure ports 602*a*, 602*b*, and 602*c*. The cooling circuit line 41 fluidly connects to the outlet port 39 of the sixth pump assembly 600 to the reservoir 24 of the fluid circuit. The cooling circuit line 41 transfers heat out of the system/circuit before returning flow back to the reservoir 24 of the fluid circuit. The cooling circuit line 41 also can be used to carry further heat away from control electronics of the variable speed motor-pump unit as shown at FIG. 3.

Figure 32:
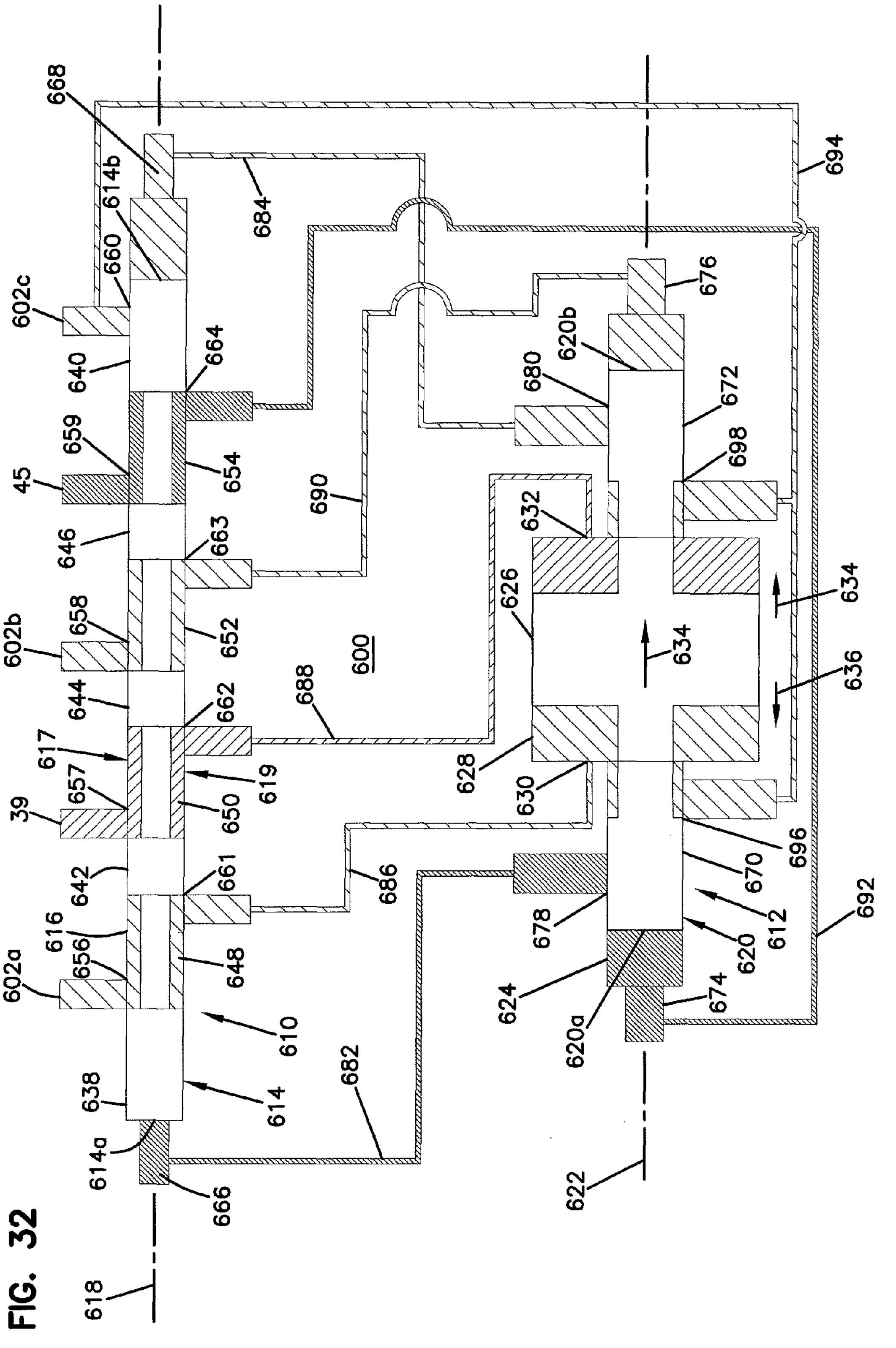

Referring to FIG. 32, the sixth example pump assembly 600 includes a sequencing valve 610 and a main valve 612 that are cycled through a sequence of positions (see FIGS. 32-37) to generate a pumping action that draws case drain fluid into the valve body 601 and subsequently pumps the case drain fluid out of the valve body 601 through the outlet port 39. The sequencing valve 610 includes a first spool 614 that reciprocates within a first spool bore 616 along a first axis 618. The first spool bore 616 is defined by the valve body 601. The main valve 612 includes a second spool 620 that reciprocates along a second axis 622 within a second spool bore 624 defined within the valve body 601. The second spool 620 functions as a reciprocating pump/reciprocating actuator and includes a piston head 626 mounted within a piston cylinder 628 defined by the second spool bore 624. Piston cylinder ports 630, 632 are positioned at opposite ends of the piston cylinder 628.

In operation, the piston head 626 is reciprocated back and forth within the piston cylinder 628 along the second axis 622. When the piston head 626 moves in a first direction 634 within the piston cylinder 628, case drain fluid is drawn into the piston cylinder 628 through the piston cylinder port 630 and case drain fluid that had been previously drawn into the piston cylinder 628 is expelled through the piston cylinder port 632. In contrast, when the piston head 628 is moved in a second direction 636 within the piston cylinder 628, case drain fluid is drawn into the piston cylinder 628 through the piston cylinder port 632 and case drain fluid that had been previously drawn into the piston cylinder 628 is expelled through the piston cylinder port 630. In this way, the piston head 626 and the piston cylinder 628 function as a reciprocating pump that continuously draws case drain fluid from the case drain fluid line 37 into the sixth assembly 600 and also continuously pumps case drain fluid out of the sixth assembly 600 into the cooling circuit line 41.

Referring to FIG. 32, the first spool 614 can be referred to as a sequencing spool. The first spool 614 includes pilot surfaces 614*a*, 614*b* defined at opposite ends of the first spool 614. The piloting surfaces 614*a*, 614*b* face in opposite axial directions. The first spool 614 also includes two end lands 638, 640 positioned at opposite ends of the first spool 614 and three intermediate lands 642, 644, and 646 positioned between the ends lands 638, 640. A first valve passage 648 is positioned between end land 638 and intermediate land 642. A second valve passage 650 is positioned between intermediate land 642 and intermediate land 644. A third valve passage 652 is positioned between intermediate land 644 and intermediate land 646. A fourth valve passage 654 is positioned between the intermediate land 646 and the end land 640. The intermediate lands 642, 644 and 646 cooperate with the first spool bore 616 to block fluid communication between the flow passages 648, 650, 652, and 654. The end land 638 cooperates with the first spool bore 616 to block fluid communication between the first valve passage 648 and the pilot surface 614*a*. The end land 640 cooperates with the first spool bore 616 to block fluid communication between the fourth valve passage 654 and the pilot surface 614*b*.

The valve body 601 defines a first set of bore ports at one side 617 of the first spool bore 616 and a second set of bore ports at an opposite side 619 of the first spool bore 616. The first set of bore ports includes five ports 656-660 and the second set of bore ports includes four bore ports 661-664. The bore ports 656-660 are spaced consecutively along the length of the first spool bore 616. Similarly, second set of spool bores 661-664 are spaced consecutively along the first spool bore 616. Bore port 656 is in constant fluid communication with the first inlet pressure bore port 602*a*, port 657 is in constant fluid communication with the outlet port 39, bore port 658 is in constant fluid communication with the second inlet pressure port 602*b*, bore port 659 is in constant fluid communication with the drive port 45, and bore port 660 is in constant fluid communication with the third inlet pressure port 602*c*. Bore port 661 is positioned generally between bore ports 656 and 657. Bore port 662 is positioned generally between bore port 657 and bore port 658. Bore port 663 is positioned generally between bore port 658 and bore port 659, and bore port 664 is positioned generally between bore port 659 and bore port 660. The first spool bore 616 also includes a pilot flow region 666 positioned adjacent the pilot surface 614*a* and a pilot flow region 668 positioned adjacent the pilot surface 614*b*.

The second spool 620 includes two end lands 670, 672 positioned at opposite ends of the second spool 620. The second spool 620 also includes pilot surfaces 620*a*, 620*b* positioned at opposite ends of the second spool 620. The pilot surfaces 620*a*, 620*b* face in opposite axial directions. The second spool bore 624 defines pilot regions 674, 676 positioned respectively adjacent to the pilot surfaces 620*a*, 620*b*. The second spool bore 624 also includes a bore port 678 positioned generally midway between the pilot region 674 and the piston cylinder 628 and a bore port 680 positioned generally midway between the pilot region 676 and the piston cylinder 628.

Various flow lines provide fluid communication between the first spool bore 616 and the second spool bore 624. For example, flow line 682 fluidly connects pilot region 666 of the first spool bore 616 to bore port 678 of the second spool bore 624. Also, flow line 684 fluidly connects pilot region 668 of the first spool bore 616 to bore port 680 of the second spool bore 624. Further, flow line 686 fluidly connects bore port 661 of the first spool bore 616 to piston cylinder port 630 and flow line 688 fluidly connects bore port 662 of the first spool bore 616 to piston cylinder port 632. Additionally, flow line 690 fluidly connects bore port 663 of the first spool bore 616 to pilot region 676 of the second spool bore 624 and flow line 692 fluidly connects bore port 664 of the first spool bore 616 to pilot region 674 of the second spool bore 624. Also, flow line 694 fluidly connects ports 696 and 698 of the second spool bore 624 to the third inlet pressure port 602*c*.

Figure 34:
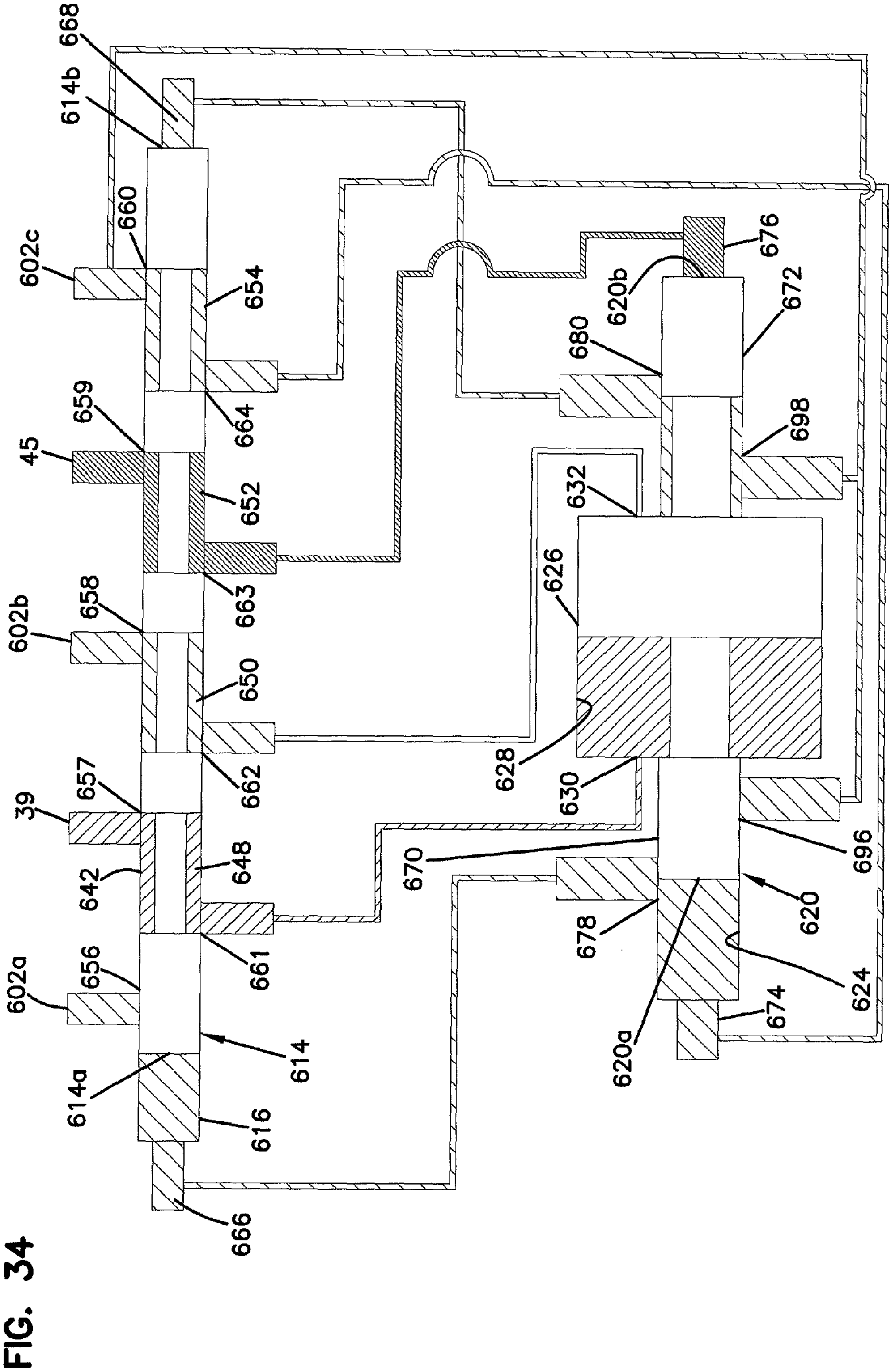

The first spool 614 is moveable within the first spool bore 616 between a first position (see FIG. 32) and a second position (see FIG. 34). When the first spool 614 is in the first position of FIG. 32, the first valve passage 648 fluidly connects bore port 656 to bore port 661, the second valve passage 650 fluidly connects bore port 657 to bore port 662, the third valve passage 652 fluidly connects bore port 658 to bore port 663, and the fourth valve passage 654 fluidly connects bore port 659 to bore port 664. In this way, the piston cylinder port 630 is fluidly connected to a first inlet pressure port 602*a*, the piston cylinder port 632 is fluidly connected to the outlet port 39, the second inlet pressure port 602*b* is fluidly connected to pilot region 676 of the second spool bore 624, and the drive port 45 is fluidly connected to pilot region 674 of the second spool bore 624.

When the first spool 614 is in the second position of FIG. 34, the first valve passage 648 fluidly connects bore port 657 to bore port 661, the second valve passage 650 fluidly connects bore port 658 to bore port 662, the third valve passage 652 fluidly connects bore port 659 to bore port 663, and the fourth valve passage 654 fluid connects bore port 660 to bore port 664. In this way, the outlet port 39 is fluidly connected to piston cylinder port 630, the second inlet pressure port 602*b* is fluidly connected to piston cylinder port 632, the drive port 45 is fluidly connected to pilot region 676 of the second spool bore 624, and the third inlet pressure port 602*c* is fluidly connected to pilot region 674 of the second spool bore 624.

The second spool 620 is also moveable within the second spool bore 624 between a first position (see FIG. 36) and a second position (see FIG. 34). When the second spool 620 is in the first position of FIG. 9, bore port 680 is in fluid communication with pilot region 676 of the second spool bore 624 such that pilot region 668 of the first spool bore 616 is also placed in fluid communication with the pilot region 676. Further, end land 672 blocks fluid communication between bore port 698 and bore port 680. Also, bore port 678 is in fluid communication with bore port 696 such that pilot region 666 of the first spool bore 616 is provided with inlet pressure. Moreover, end land 670 blocks fluid communication between pilot region 674 and bore port 678. When in the second position of FIG. 34, bore port 698 is in fluid communication with bore port 680 such that inlet pressure is provided to pilot region 668 of the first spool bore 616. Also, end land 672 blocks fluid communication between pilot region 676 and bore port 680. Moreover, bore port 678 is in fluid communication with pilot region 674 of the second spool bore 624 such that pilot region 666 of the first spool bore 616 is also placed in fluid communication with pilot region 674. Furthermore, end land 670 blocks fluid communication between bore port 696 and bore port 678.

FIG. 32 shows the sixth example pump assembly 600 with the piston head 626 moving in the first direction 634 within the piston cylinder 628. As shown at FIG. 32, pilot region 674 is provided with drive pressure from the drive port 45 and pilot region 676 is provided with inlet pressure from the second inlet pressure port 602*b*. This pressure imbalance causes the second spool 620 to move in the first direction 634. Movement of the piston head 626 in the first direction 634 within the piston cylinder 628 causes case drain fluid to be drawn from the first inlet pressure port 602*a* through the first valve passage 648 and flow line 686 and into the piston cylinder 628 through piston cylinder port 630. Concurrently, movement of the piston head 626 in the first direction 634 within the piston cylinder 628 causes case drain fluid within the piston cylinder 628 to be forced out piston cylinder port 632 through flow line 688 and the second valve passage 650 to the outlet port 39 where the fluid is output to the cooling line 41.

Figure 33:
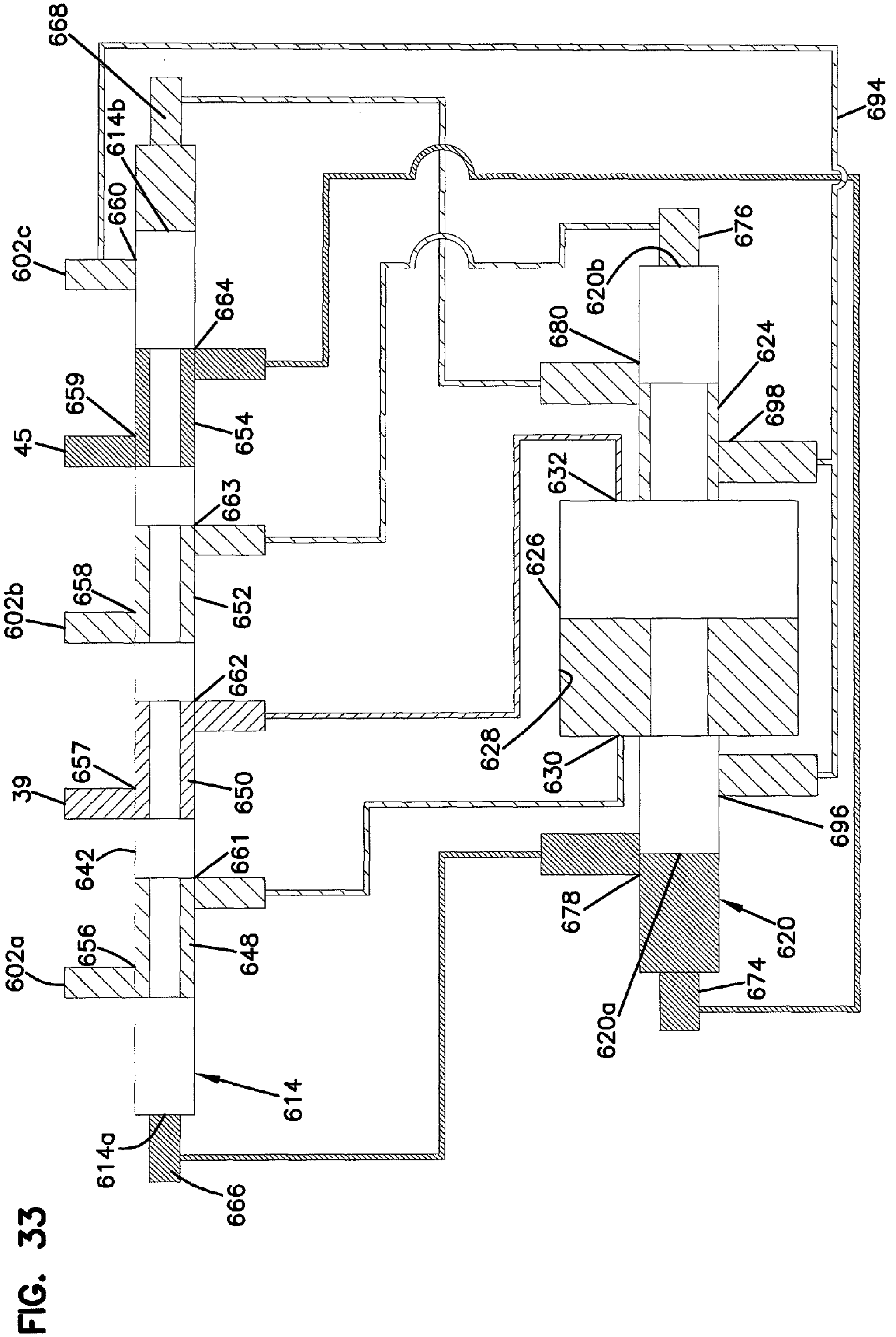

When the second spool 620 reaches the second position of FIG. 33, fluid communication is opened between pilot region 674 of the second spool bore 624 and pilot region 666 of the first spool bore 616 such that drive pressure is provided to the pilot region 666. Concurrently, fluid communication is opened between bore port 698 and pilot region 668 of the first spool bore 616 such that inlet pressure is provided to the pilot region 668. The difference in pressure caused by drive pressure being applied to pilot surface 614*a* at one end of the first spool 614 and inlet pressure being applied to pilot surface 614*b* at the other end of the first spool 614 causes the first spool to move in the first direction 634 from the first position of FIG. 32 to the second position of FIG. 34.

Figure 35:
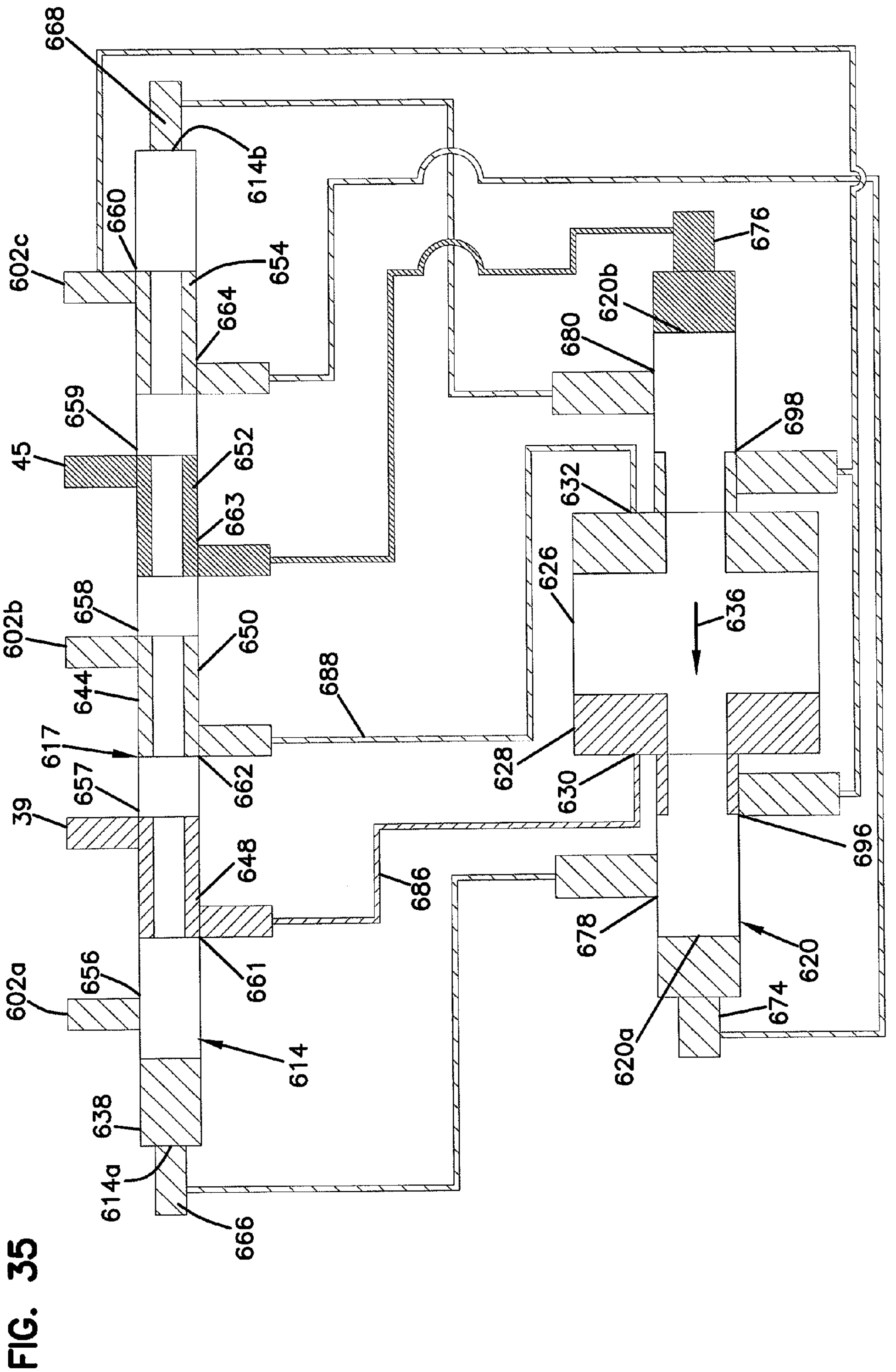

With the first spool 614 in the second position of FIG. 34, piston cylinder port 630 is placed in fluid communication with the outlet port 39, piston cylinder port 632 is placed in fluid communication with the second inlet pressure port 602*b*, pilot region 676 of the second spool bore 624 is placed in fluid communication with the drive port 45, and pilot region 674 of the second spool bore 624 is placed in fluid communication with the third inlet pressure port 602*c*. The difference in pressure caused by drive pressure being applied to the pilot surface 620*b* at one end of the second spool 620 and inlet pressure being applied to the pilot surface 620*a* at the other end of the second spool 620 causes the second spool 620 to move in the second direction 636 as shown at FIG. 35. As the second spool 620 moves in the second direction 636, case drain fluid within the piston cylinder 628 is forced out the piston cylinder port 630 through flow line 686 and the first valve passage 648 to the outlet port 39 where the case drain fluid is output to the cooling line 41. Concurrently, case drain fluid is drawn into the second inlet pressure port 602*b*, through the second valve passage 650 and flow line 688 to piston cylinder port 632 where the case cylinder fluid enters the piston cylinder 628.

Figure 36:
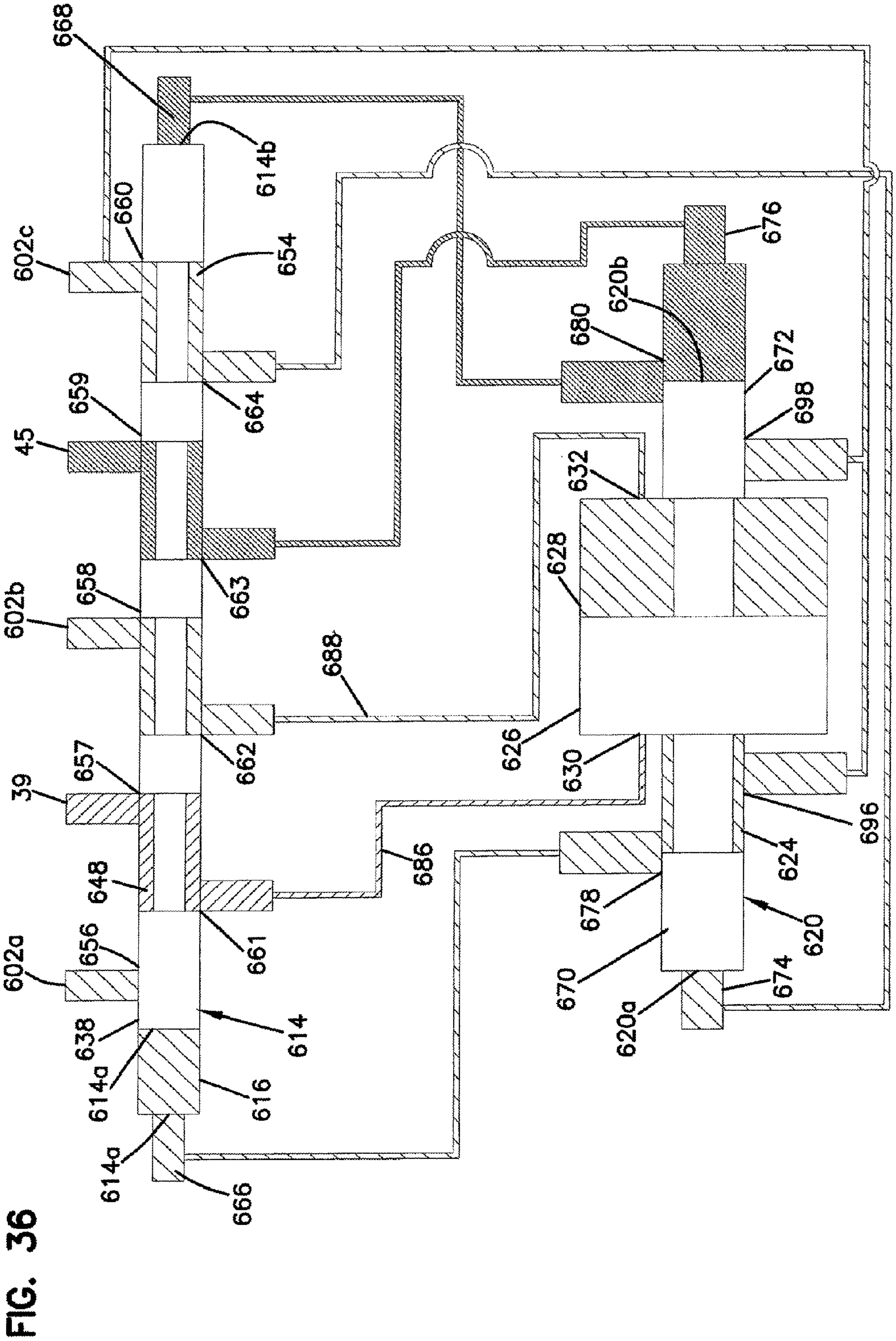
Figure 37:
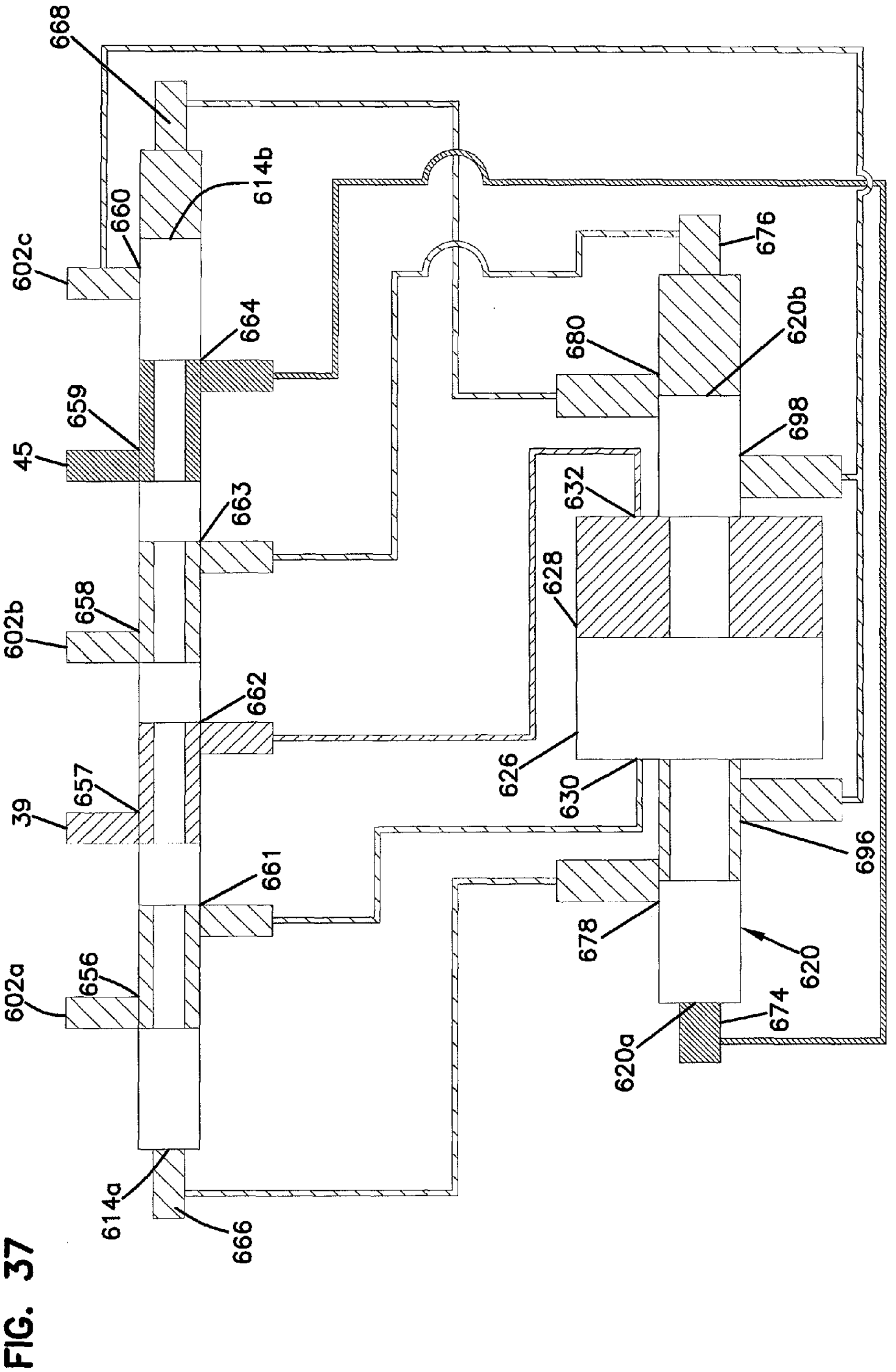

When the second spool 620 reaches the first position of FIG. 36, fluid communication is opened between the drive port 45 and pilot region 668 of the first spool bore 616. Concurrently, fluid communication is opened between the third inlet pressure port 602*c* and pilot region 666 of the first spool bore 616. In this configuration, unbalanced pressure caused by drive and inlet pressure being applied to opposite ends of the first spool 614 causes the first spool 614 to slide in the second direction 636 back to the first position as shown at FIG. 37. In this position, piston cylinder port 630 is placed in fluid communication with the first inlet pressure port 602*a*, piston cylinder port 632 is placed in fluid communication with outlet port 39, pilot region 674 of the second spool bore 624 is placed in fluid communication with the drive port 45, and pilot region 676 is placed in fluid communication with the second inlet pressure port 602*b*. The difference in pressure applied to opposite ends of the second spool 620 creates an unbalanced force that moves the second spool 620 in the first direction 634 as shown at FIG. 32. It will be appreciated that the above described cycle is continuously repeated to provide the sixth assembly 600 with a continuous pumping action.

It will be appreciated that the diameter of the piston head 626 is designed in coordination with the surface areas defined by the pilot surfaces 620*a*, 620*b*. For example, by selecting a piston head 626 having substantially larger axial end face areas as compared to the areas of the pilot surfaces 674, 676, the sixth assembly 600 outputs flow through the outlet port 39 having a higher flow rate and a lower pressure as compared to the flow provided to the sixth assembly 600 through the drive port 45.

Various modifications and alterations of this disclosure will become apparent to those skilled in the art without departing from the scope and spirit of this disclosure, and it should be understood that the scope of this disclosure is not to be unduly limited to the illustrative embodiments set forth herein.

The invention claimed is:

1. A fluid circuit comprising:

a first pump assembly including:

an electric motor; and a first fluid pump configured to be driven by the electric motor, the first fluid pump having a first fluid inlet, a first fluid outlet and a case drain port that is in fluid communication with a case drain region of the first fluid pump; and a second pump assembly in fluid communication with the first pump assembly, the second pump assembly being powered by hydraulic pressure from the first fluid outlet of the first fluid pump when the first fluid pump is driven by the electric motor, the second fluid pump assembly including:

a second fluid pump configured to augment flow through the case drain region of the first fluid pump when the second fluid pump assembly is powered by the hydraulic pressure from the first fluid outlet of the first fluid pump.

2. The fluid circuit of claim 1, wherein the second fluid pump comprises:

a fluid motor having a fluid inlet and a fluid outlet, the fluid inlet being in fluid communication with the first fluid outlet of the first fluid pump; and a second fluid pump unit coupled to the fluid motor, the second fluid pump unit having a second fluid inlet and a second fluid outlet, the second fluid inlet being in fluid communication with the case drain port of the first fluid pump so that the second fluid pump unit pumps fluid from the case drain region of the first fluid pump.

3. The fluid circuit of claim 1, wherein the second fluid pump assembly comprises:

a pilot stage valve assembly having a fluid inlet passage in fluid communication with the first fluid outlet of the first fluid pump; and a main stage valve assembly in fluid communication with the pilot stage valve assembly, the main stage valve assembly having a fluid inlet passage in fluid communication with the case drain port of the first fluid pump so that the second fluid pump assembly pumps fluid from the case drain region of the first fluid pump.

4. The fluid circuit of claim 3, wherein the pilot stage valve assembly includes a first valve housing defining a first spool bore having a first axial end and a second axial end, a first control passage, and a second control passage, the pilot stage valve assembly also including a pilot stage valve disposed in the first spool bore of the valve housing.

5. The fluid circuit of claim 4, wherein the main stage valve assembly includes a second valve housing defining a second spool bore having a first axial end and a second axial end, and a main stage valve disposed in the second spool bore, wherein the first and second control passages of the pilot stage valve assembly are in fluid communication with the second and first axial ends of the second spool bore, respectively, to actuate the main stage valve between a first position and a second position.

6. The fluid circuit of claim 1, wherein the second fluid pump comprises a vane pump.

7. The fluid circuit of claim 6, wherein the vane pump includes a drive port in fluid communication with the first fluid outlet, an intake port in fluid communication with the case drain port, and an output port in fluid communication with the heat exchanger.

8. The fluid circuit of claim 7, wherein the vane pump includes a rotor that rotates within a cam structure, wherein the vane pump includes vanes slidably mounted within radial slots defined by the rotor, wherein the radial slots have inner ends, and wherein a torque for rotating the rotor is provided by pressure from the first fluid outlet that is alternatingly placed in and out of fluid communication with the inner ends of the radial slots as the rotor rotates within the cam structure.

9. The fluid circuit of claim 1, wherein the second fluid pump comprises a spool valve arrangement including:

a valve body defining an intake port in fluid communication with the case drain port, a drive port in fluid communication with the first fluid outlet of the first fluid pump, and an outlet port in fluid communication with a cooling line;

a piston head reciprocally movable within a piston cylinder, the piston cylinder including first and second piston cylinder ports on opposite sides of the piston cylinder;

a first spool valve including a first spool;

a second spool valve including a second spool incorporating the piston head such that movement of the second spool moves the piston head within the piston cylinder;

a third spool valve including a third spool;

the first spool valve being configured to control movement of the second spool, the first spool of the first spool valve being movable between a first position where the first piston cylinder port is connected to the intake port and the second piston cylinder port is connected to the outlet port and a second position where the first piston cylinder port is connected to the outlet port and the second piston cylinder port is connected to the intake port;

the second spool valve being configured to control movement of third spool; and the third spool valve being configured to control movement of the first spool between the first and second positions.

10. The fluid circuit of claim 9, wherein the first, second and third spools each includes a major pilot surface and an opposite minor pilot surface, and wherein the minor pilot surfaces are always in fluid communication with the drive port, and wherein the major pilot surfaces are alternated between being in fluid communication with the drive port and being in fluid communication with a return port connected to a reservoir of the fluid circuit.

11. The fluid circuit of claim 1, wherein the second fluid pump comprises a spool valve arrangement including:

a main valve including a main spool for reciprocating a piston head within a piston cylinder, the piston cylinder including first and second cylinder ports positioned on opposite side of the piston head, the main spool having first and second pilot areas facing in opposite axial directions;

a sequencing valve including a spool bore defining first, second and third bore ports, the second bore port being positioned between the first and third bore ports, the second bore port being in fluid communication with a fluid outlet of the second fluid pump, the first and third bore ports being in fluid communication with the case drain port;

the sequencing valve including a sequencing spool moveable between first and second positions within the spool bore;

wherein when the sequencing valve is in the first position: a) the first cylinder port is in fluid communication with the first bore port; b) the second cylinder port is in fluid communication with the second bore port; and c) the first pilot area is exposed to hydraulic pressure from the first fluid outlet of the first fluid pump; and wherein when the sequencing valve is in the second position: a) the first cylinder port is in fluid communication with the second bore port; b) the second cylinder port is in fluid communication with the third bore port; and c) the second pilot area is exposed to hydraulic pressure from the first fluid outlet of the first fluid pump.

12. The fluid circuit of claim 1, wherein the second fluid outlet of the second fluid pump is in fluid communication with a heat exchanger.

13. The fluid circuit of claim 1, wherein the second fluid outlet of the second fluid pump is in fluid communication with a filter.

14. The fluid circuit of claim 1, wherein the second fluid pump comprises part of a cooling circuit for an aircraft.

15. A method for assembling a cooling circuit of an aircraft, the method comprising:

providing a first fluid pump having a first fluid inlet in fluid communication with a fluid reservoir, a first fluid outlet and a case drain port;

connecting a fluid inlet of a fluid motor to the first fluid outlet of the first fluid pump, wherein the fluid motor is coupled to a second fluid pump; and connecting a second fluid inlet of the second fluid pump to the case drain port of the first fluid pump so that actuation of the fluid motor causes fluid in a case drain region of the first fluid pump to be pumped out of the first fluid pump by the second fluid pump.

16. The fluid circuit of claim 1, wherein the second fluid pump has a second fluid inlet and a second fluid outlet, the second fluid inlet being in fluid communication with the case drain port of the first fluid pump so that the second fluid pump draws fluid from the case drain region of the first fluid pump when the second fluid pump assembly is powered by the hydraulic pressure from the first fluid outlet of the first fluid pump.

17. The fluid circuit of claim 16, wherein the second fluid outlet is in fluid communication with a heat exchanger for cooling the fluid pumped from the second fluid pump.

18. The fluid circuit of claim 17, wherein the fluid circuit includes a reservoir in fluid communication with the first fluid pump and the heat exchanger, the reservoir being upstream from the first fluid pump and downstream from the heat exchanger.

19. The fluid circuit of claim 1, wherein the motor is a variable speed electric motor.

20. The fluid circuit of claim 7, wherein the vane pump includes a rotor that rotates within a cam structure having a cam surface, wherein the vane pump includes a chamber defined between the cam surface and the rotor, wherein the cam surface defining the chamber includes a first ascending portion separated from a second ascending portion by a first dwell, wherein the cam surface defining the chamber includes a descending portion separated from the second ascending portion by a second dwell, wherein the chamber includes a motor region coinciding with the first ascending portion, an intake region corresponding to the second ascending portion and an output region corresponding to the descending portion, wherein the motor region is in fluid communication with the first fluid outlet, wherein the intake region is in fluid communication with the case drain port, and wherein the output region is in fluid communication with the heat exchanger.

21. The fluid circuit of claim 7, wherein the vane pump includes a rotor that rotates within a cam structure having a cam surface, wherein the vane pump includes a chamber defined between the cam surface and the rotor, wherein the cam surface defining the chamber includes an ascending portion separated from a descending portion by a dwell, wherein the chamber includes an intake region corresponding to the ascending portion and an output region corresponding to the descending portion, wherein the intake region is in fluid communication with the case drain port, wherein the output region is in fluid communication with the heat exchanger, wherein the rotor defines radial slots in which vanes are slidably mounted, wherein the radial slots have inner ends, wherein the cam structure includes a higher pressure passage structure in fluid communication with the inner ends of the radial slots at a first location corresponding to the intake region, and wherein the cam structure includes a lower pressure passage structure in fluid communication with the inner ends of the radial slots at a second location corresponding to the output region.

22. The fluid circuit of claim 21, wherein the higher pressure passage structure is in fluid communication with the first fluid outlet.

23. The fluid circuit of claim 22, wherein the lower pressure passage structure is in fluid communication with the output region of the chamber.

24. The fluid circuit of claim 7, wherein the vane pump includes a rotor that rotates within a cam structure having a cam surface, wherein the rotor carries a plurality of vanes, wherein the vane pump includes a chamber defined between the cam surface and the rotor, wherein the drive port, the intake port and the output port are all in fluid communication with the chamber, wherein pressurized fluid from the first fluid outlet provides a force for rotating the rotor within the cam structure, wherein fluid from the case drain port is drawn into the chamber and mixes with the pressurized fluid from the first fluid outlet as the rotor rotates, and wherein the mixture of the fluid from the case drain port and the fluid from the first fluid outlet are pumped out of the vane pump through the output port.

25. The fluid circuit of claim 1, further comprising a fluid motor for driving the second fluid pump, the fluid motor having an inlet in fluid communication with the first fluid outlet so as to be powered by the hydraulic pressure from the first fluid outlet of the first fluid pump.

* * * * *